(12) United States Patent
Sunaga et al.

(10) Patent No.: US 6,372,854 B1
(45) Date of Patent: Apr. 16, 2002

(54) HYDROGENATED RING-OPENING METATHESIS POLYMER AND ITS USE AND PRODUCTION

(75) Inventors: Tadahiro Sunaga; Toshiro Takao; Keiichi Ikeda; Yoshihiro Yamamoto, all of Kanagawa; Nobuo Kawahara, Hiroshima; Masumi Okita, Osaka, all of (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/339,538

(22) Filed: Jun. 24, 1999

(30) Foreign Application Priority Data

Jun. 29, 1998 (JP) ............................................ 10-182916
Aug. 5, 1998 (JP) ............................................ 10-221756

(51) Int. Cl.$^7$ ................................................ C08F 8/04

(52) U.S. Cl. ................................ 525/326.8; 525/926.9; 525/328.2; 525/328.3; 525/328.8; 525/328.9; 525/338; 525/339

(58) Field of Search ........................... 525/326.8, 326.9, 525/328.2, 328.3, 328.8, 328.9, 338, 339

(56) References Cited

FOREIGN PATENT DOCUMENTS

| JP | 4-39665 | 2/1992 |
| JP | 5-257281 | 10/1993 |
| JP | 5-257285 | 10/1993 |
| JP | 6-342212 | 12/1994 |
| JP | 7-333850 | 12/1995 |
| WO | WO97/33198 | 9/1997 |

*Primary Examiner*—Bernard Lipman
(74) *Attorney, Agent, or Firm*—Burns, Doane, Swecker & Mathis, L.L.P.

(57) ABSTRACT

The present invention discloses a hydrogenated ring-opening metathesis polymer comprising at least unit (A) of formula (1), unit (B) of formula (2) and unit (c) of formula (3):

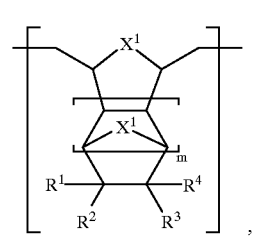

(1)

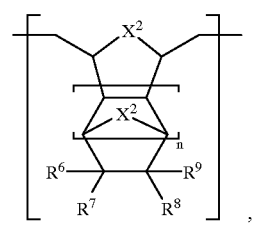

(2)

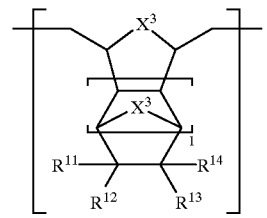

(3)

wherein a constituent molar ratio of the structural unit (A)/(B) is from 1/99 to 99/1 and a constituent molar ratio of the structural unit (B)/(C) is from 30/70 to 100/0 and, furthermore, a ratio of a weight-average molecular weight Mw to a number-average molecular weight Mn, that is Mw/Mn is from 1.0 to 2.0.

22 Claims, 4 Drawing Sheets

HYDROGENATED RING-OPENING METATHESIS POLYMER AND ITS USE AND PRODUCTION

BACKGROUND OF THE INVENTION

1. Field of the Invention

The present invention relates to a novel hydrogenated ring-opening metathesis polymer and, more particularly, to a hydrogenated ring-opening metathesis polymer, which is superior in heat resistance, pyrolysis resistance and light transmission properties and which is suited for use as a photoresist polymer for microlithography by ultraviolet and far ultraviolet lights (including excimer lasers) in the production of semiconductor devices, and a method of producing the hydrogenated polymer.

2. Description of the Related Art

With the recent increase of integration level in integrated circuits on semiconductor devices, a large-scale integrated circuit (LSI) and a very-large-scale integrated circuit (VLSI) have been put to practical use and, at the same time, a minimum lithographic pattern in the integrated circuits would be reaching in sub-micron features, in future, it tends to be more microlithographic. In the formation of the microlithographic pattern, there is essentially required to use a lithography technique of coating a surface of a substrate with a resist material to form a thin film, selectively exposing the resulting resist film to light thereby to form a latent image of a desired pattern, developing the latent image to form a resist pattern, performing dry etching using this resist pattern as a mask, and removing the resist to obtain a desired pattern.

As an exposure light source used in this lithographic technique, for example, ultraviolet lights of g-lines (wavelength: 436 nm) or i-lines (wavelength: 365 nm) have been used. With the progress of the fine lithographic pattern, it has become popular to use an exposure light having a shorter wavelength such as far ultraviolet lights, vacuum ultraviolet lights, electron beams (EB) and X-rays as the light source. As the exposure light source, excimer laser (e.g. KrF laser having a wavelength of 248 nm, ArF laser having a wavelength of 193 nm, etc.) has attracted special interest recently and it is expected that the excimer laser is effective for formation of the fine lithographic pattern.

As a polymer or copolymer used as a resist material for formation of a sub-micron pattern using exposure light having a shorter wavelength within a vacuum ultraviolet region, for example, there have been suggested various polymers and copolymers, such as polymer or copolymer of an acrylic or α-substituted acrylic ester having an adamantane skeleton and an acid cleavable protecting group at an ester portion (see Japanese Patent Kokai Publication No. 39665/1992), polymer or copolymer of an acrylic or α-substituted acrylic ester having a norbornane skeleton and an acid cleavable protecting group at an ester portion (see Japanese Patent Kokai Publication No. 257281/1993), polymer or copolymer of cyclohexylmaleimide (see Japanese Patent Kokai Publication No. 257285/1993), polymer compound containing a cellulose skeleton in a principal chain, said principal chain being cleaved by an acid (see Japanese Patent Kokai Publication No. 342212/1994), polyvinyl alcohol or its derivative (see Japanese Patent Kokai Publication No. 333850/1995) and the like.

However, there have still not been obtained polymers and copolymers, which satisfy all of various properties required to be used as the polymer for the resist material, such as dry etching resistance, transparency to far ultraviolet lights, solubility in resist solvent, wettability by developer, adhesion to substrate such as silicon, solubility in releasant and the like, and a further development thereof is required.

On the other hand, a cyclic polymer in a photoresist composition (WO97/33198) comprising a polymer compound having an aliphatic cyclic hydrocarbon as a principal chain and containing pendant acid cleavable groups is superior in dry etching resistance and also superior in transparency to far ultraviolet lights. However, it had a problem that the solubility in resist solvent in high concentration, wettability by developer and adhesion to silicon substrate are inferior.

SUMMARY OF THE INVENTION

An object of the present invention is to provide a hydrogenated ring-opening metathesis polymer, which satisfy all of the above various properties required to be used as a polymer for the resist material and also has a narrow molecular weight distribution, and to provide a method of producing the hydrogenated polymer.

Another object of the present invention to provide a resist material using the hydrogenated polymer, which is superior in dry etching resistance, transparency to far ultraviolet lights, solubility in resist solvent, wettability by developer, adhesion to substrate such as silicon, and solubility in releasant.

To solve the above problems, the present inventors have studied intensively about a possibility of using a hydrogenated ring-opening metathesis polymer obtained from a cyclic olefinic monomer or monomers as a polymer for resist material having excellent optical characteristics, electrical characteristics, high rigidity, heat resistance, adhesion to substrate and weathering resistance. As a result, they have found that a novel hydrogenated ring-opening metathesis polymer satisfies various performances as the resist material, thus completing the present invention.

That is, the present invention provides:

(i) A hydrogenated ring-opening metathesis polymer comprising at least a structural unit (A) represented by the following general formula (1):

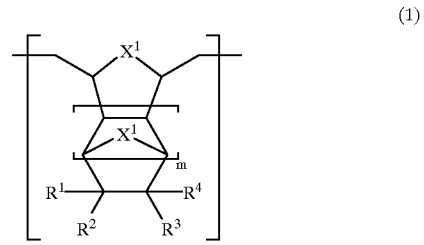

(1)

wherein at least one of $R^1$ to $R^4$ is a substituent containing an acid cleavable group, and others are selected from hydrogen, an alkyl group having 1 to 20 carbon atoms, a halogen, a halogenated alkyl group having 1 to 20 carbon atoms, an alkoxy group having 1 to 20 carbon atoms, an alkoxyalkyl group having 2 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, an arylsulfonyloxy group having 6 to 20 carbon atoms, a carboxy group, a hydroxy group, a carboxyalkyl group having 2 to 20 carbon atoms, or a hydroxyalkyl group having 1 to 20 carbon atoms; $X^1$ is selected from —O—, —S—, —NR$^5$—, —PR$^5$— or —CR$^5{}_2$— (R$^5$ represents hydrogen or an alkyl group having 1 to 20 carbon atoms) and may be the same or different; and m represents 0 or an integer of 1 to 3; a structural unit (B) represented by the following general formula (2):

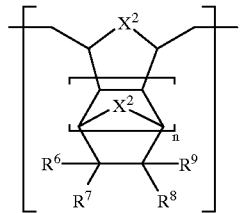

(2)

wherein at least one of $R^6$ to $R^9$ is a substituent containing carboxy or hydroxy, and others are selected from hydrogen, an alkoxy group having 1 to 20 carbon atoms, an alkoxyalkyl group having 2 to 20 carbon atoms, an alkyl group having 1 to 20 carbon atoms, a halogen, a halogenated alkyl group having 1 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, or an arylsulfonyloxy group having 6 to 20 carbon atoms; $X^2$ is selected from —O—, —S—, —NR$^{10}$—, —PR$^{10}$— or —CR$^{10}{}_2$— ($R^{10}$ represents hydrogen or an alkyl group having 1 to 20 carbon atoms) and may be the same or different; and n represents 0 or an integer of 1 to 3; and a structural unit (C) represented by the following general formula (3):

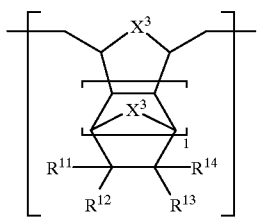

(3)

wherein at least one of $R^{11}$ to $R^{14}$ is a substituent containing cyano or lactonyloxycarbonyl, and others are selected from hydrogen, a carboxy group, a hydroxy group, a carboxyalkyl group having 2 to 20 carbon atoms, a hydroxyalkyl group having 1 to 20 carbon atoms, an alkoxycarbonyl group having 2 to 20 carbon atoms, an alkoxycarbonylalkyl group having 3 to 20 carbon atoms, an alkoxy group having 1 to 20 carbon atoms, an alkoxyalkyl group having 2 to 20 carbon atoms, an alkyl group having 1 to 20 carbon atoms, a halogen, or a halogenated alkyl group having 1 to 20 carbon atoms; $X^3$ is selected from —O—, —S—, —NR$^{15}$—, —PR$^{15}$— or —CR$^{15}{}_2$— ($R^{15}$ represents hydrogen or an alkyl group having 1 to 20 carbon atoms) and may be the same or different; and l represents 0 or an integer of 1 to 3, wherein a constituent molar ratio of the structural unit (A)/(B) is from 1/99 to 99/1 and a constituent molar ratio of the structural unit (B)/(C) is from 30/70 to 100/0 and, furthermore, a ratio of a weight-average molecular weight Mw to a number-average molecular weight Mn, that is Mw/Mn is from 1.0 to 2.0.

The present invention also provides:

(ii) A method of producing a hydrogenated ring-opening metathesis polymer, which comprises polymerizing at least one cyclic olefinic monomer represented by the general formula (4), or at least two cyclic olefinic monomers represented by the general formulas (4) and (5), or at least three cyclic olefinic monomers represented by the general formulas (4), (5) and (6) using a living ring-opening metathesis catalyst, and hydrogenating the polymer in the presence of a hydrogenation catalyst.

General formula (4) being:

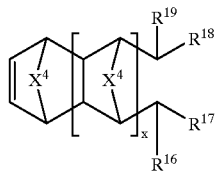

(4)

wherein at least one of $R^{16}$ to $R^{19}$ is a substituent containing an acid cleavable group, and others are selected from hydrogen, an alkyl group having 1 to 20 carbon atoms, a halogen, a halogenated alkyl group having 1 to 20 carbon atoms, an alkoxy group having 1 to 20 carbon atoms, an alkoxyalkyl group having 2 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, or an arylsulfonyloxy group having 6 to 20 carbon atoms; $X^4$ is selected from —O—, —S—, —NR$^{20}$—, —PR$^{20}$— or —CR$^{20}{}_2$— ($R^{20}$ represents hydrogen or an alkyl group having 1 to 20 carbon atoms) and may be the same or different; and x represents 0 or an integer of 1 to 3.

General formula (5) being:

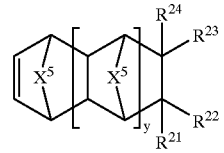

(5)

wherein at least one of $R^{21}$ to $R^{24}$ is a carboxy group, a hydroxy group, a carboxyalkyl group having 2 to 20 carbon atoms, a hydroxyalkyl group having 1 to 20 carbon atoms, an alkoxy group having 1 to 20 carbon atoms, an alkoxyalkyl group having 2 to 20 carbon atoms, an alkylcarbonyloxy group having 2 to 20 carbon atoms, an ma arylcarbonyloxy group having 7 to 20 carbon atoms, an alkylsulfonyloxy group having 1 to 20 carbon atoms, an arylsulfonyloxy group having 6 to 20 carbon atoms, or a carboxylic anhydride formed from $R^{21}$ and $R^{23}$ of $R^{21}$ to $R^{24}$, and others are selected from hydrogen, an alkyl group having 1 to 20 carbon atoms, a halogen or a halogenated alkyl group having 1 to 20 carbon atoms; $X^5$ is selected from —O—, —S—, —NR$^{25}$—, —PR$^{25}$— or —CR$^{25}{}_2$— ($R^{25}$ represents hydrogen or an alkyl group having 1 to 20 carbon atoms) and may be the same or different; and y represents 0 or an integer of 1 to 3.

General formula (6) being:

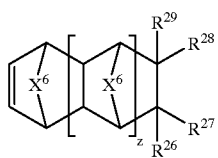

(6)

wherein at least one of $R^{26}$ to $R^{29}$ is a substituent containing cyano or lactonyloxycarbonyl, and others are selected from hydrogen, an alkoxycarbonyl group having 2 to 20 carbon atoms, an alkoxycarbonylalkyl group having 3 to 20 carbon atoms, an alkoxy group having 1 to 20 carbon atoms, an alkoxyalkyl group having 2 to 20 carbon atoms, an alkyl group having 1 to 20 carbon atoms, a halogen, or a halogenated alkyl group having 1 to 20 carbon atoms; $X^6$ is selected from —O—, —S—, —$NR^{30}$—, —$PR^{30}$— or —$CR^{30}{}_2$— ($R^{30}$ represents hydrogen or an alkyl group having 1 to 20 carbon atoms) and may be the same or different; and z represents 0 or an integer of 1 to 3.

(iii) A method of producing a hydrogenated ring-opening metathesis polymer of (ii), wherein the substituent is further converted into a new substituent containing an acid cleavable group after hydrogenation.

(iv) A method of producing a hydrogenated ring-opening metathesis polymer of (ii), wherein hydrolysis is further conducted after hydrogenation.

(v) A method of producing a hydrogenated ring-opening metathesis polymer of (ii), wherein hydrolysis is conducted after hydrogenation and the substituent is further converted into a new substituent containing an acid cleavable group after hydrogenation.

(vi) A method of producing a hydrogenated ring-opening metathesis polymer, wherein at least one cyclic olefinic monomer represented by the general formula (4), or at least two cyclic olefinic monomers represented by the general formulas (4) and (5), or at least three cyclic olefinic monomers represented by the general formulas (4), (5) and (6) is/are polymerized by using a living ring-opening metathesis catalyst in the presence of an olefin or diene.

The present invention also provides (vii) a base polymer for photoresist, comprising a hydrogenated ring-opening metathesis polymer of (i).

The hydrogenated ring-opening metathesis polymer for photoresist according to the present invention is a polymer, which is superior in adhesion, heat resistance, pyrolysis resistance and light transmission properties and which is suited for use as a photoresist polymer for microlithography by ultraviolet and far ultraviolet lights in the production of semiconductor devices, and is of a great value from an industrial point of view. According to the present invention, there can be provided a method of producing such a useful hydrogenated ring-opening metathesis polymer, efficiently and easily.

DETAILED DESCRIPTION OF THE PREFERRED EMBODIMENTS

Figure 1:
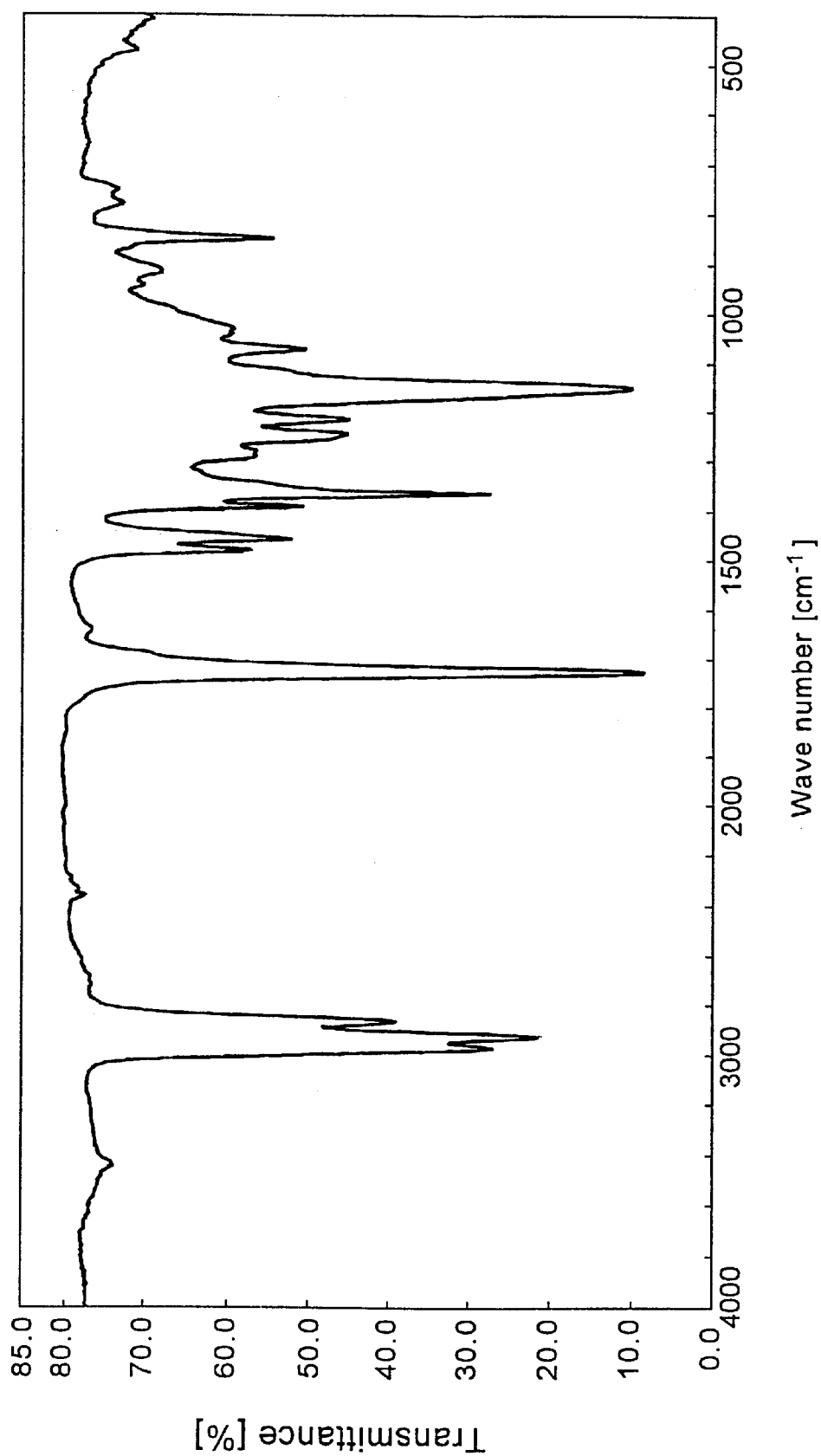
FIG. 1 shows an IR spectrum of a hydrogenated ring-opening metathesis polymer of Example 1 wherein a composition ratio of the structural unit (A)/(B) is 90/10.
Figure 2:
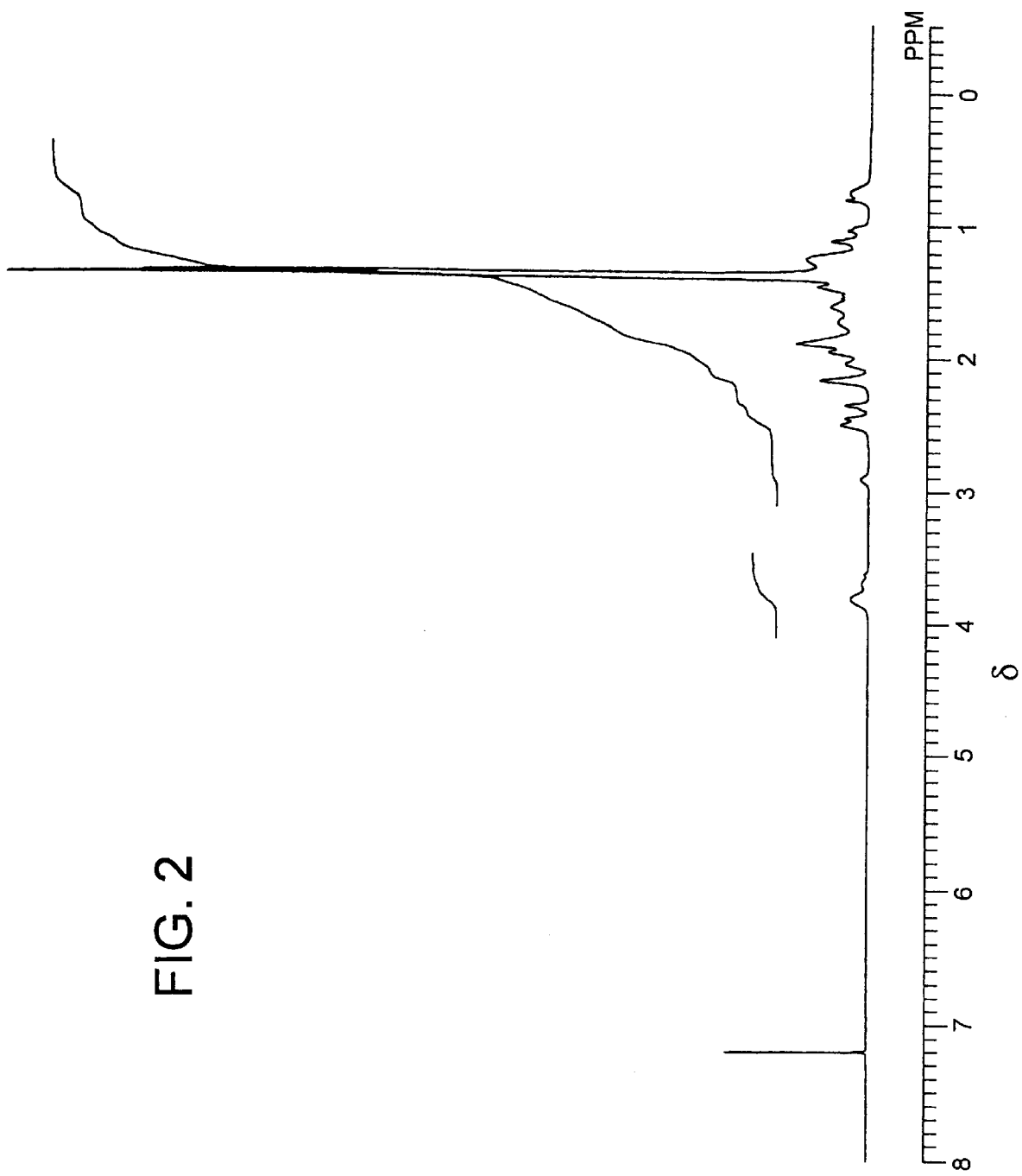
FIG. 2 shows a $^1$H-NMR spectrum of a hydrogenated ring-opening metathesis polymer of Example 1 wherein a composition ratio of the structural unit (A)/(B) is 90/10.
Figure 3:
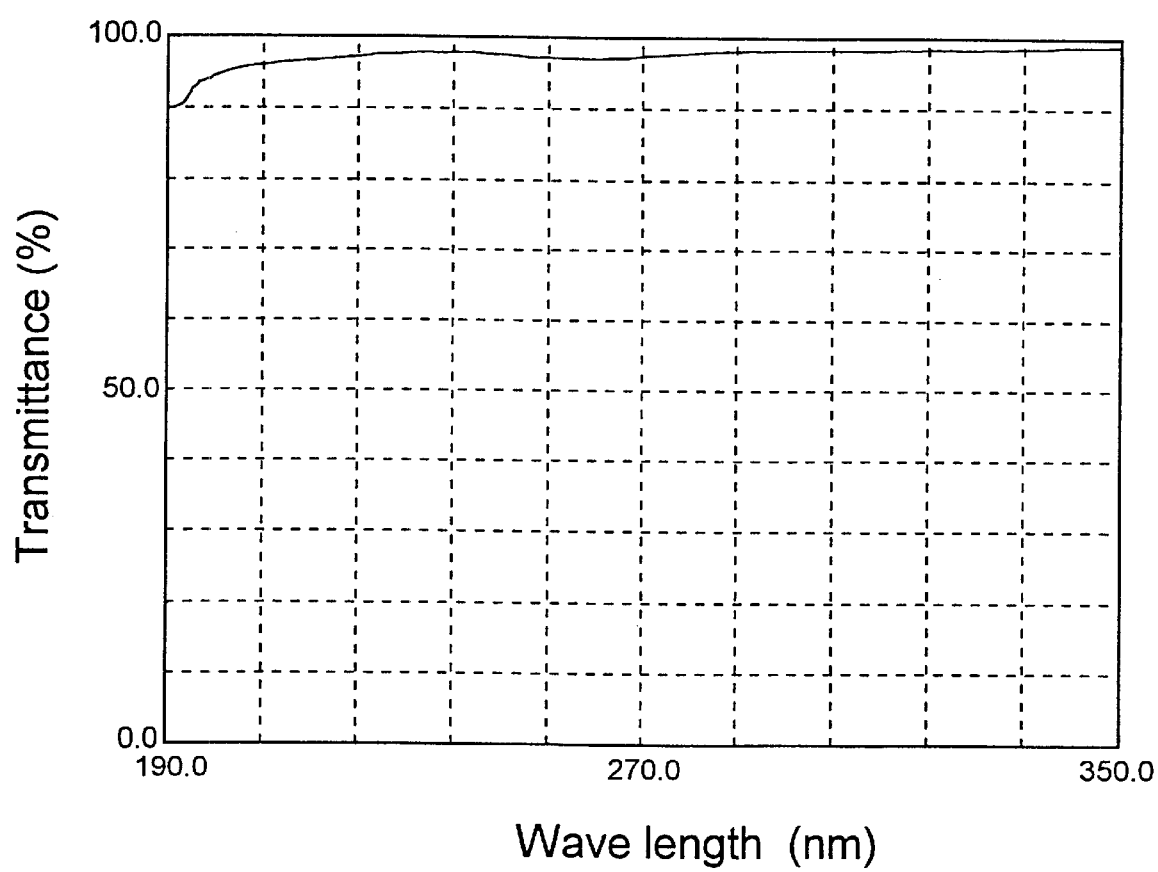
FIG. 3 shows an UV spectrum of a hydrogenated ring-opening metathesis polymer of Example 1 wherein a composition ratio of the structural unit (A)/(B) is 90/10.
Figure 4:
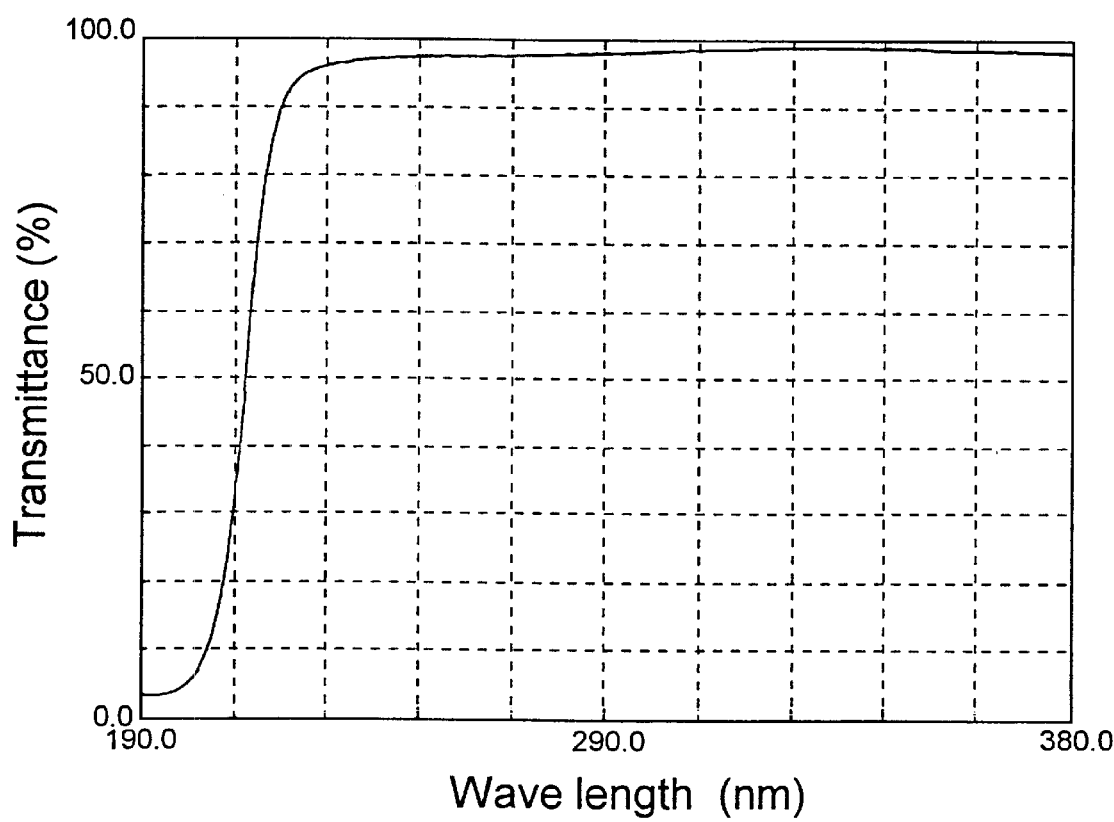
FIG. 4 shows an UV spectrum of a hydrogenated ring-opening metathesis polymer of Comparative Example 1 wherein a composition ratio of the structural unit (A)/(B) is 90/10.

In at least one of $R^1$ to $R^4$ of the general formula (1) of the present invention, the acid cleavable substituent is a substituent wherein a functional group is cleaved by an acid generated from a photosensitive agent on light exposure to form a carboxyl group, and examples thereof include alkoxycarbonyl group having 2 to 20 carbon atoms, alkoxycarbonyloxy group having 2 to 20 carbon atoms, alkoxycarbonylalkyl group having 3 to 20 carbon atoms, alkylcarboxycarbonyl group having 3 to 20 carbon atoms, and alkoxycarbonyloxyalkyl group having 3 to 20 carbon atoms.

Specifically, the alkoxycarbonyl group having 2 to 20 carbon atoms includes, for example, methoxycarbonyl, ethoxycarbonyl, n-propoxycarbonyl, isopropoxycarbonyl, n-butoxycarbonyl, tert-butoxycarbonyl, cyclohexyloxycarbonyl, tetrahydropyran-2-yloxycarbonyl, tetrahydrofuran-2-yloxycarbonyl, 1-ethoxyethoxycarbonyl and 1-butoxyethoxycarbonyl. The alkoxycarbonyloxy group having 2 to 20 carbon atoms includes, for example, methoxycarbonyloxy, ethoxycarbonyloxy, n-propoxycarbonyloxy, isopropoxycarbonyloxy, n-butoxycarbonyloxy, tert-butoxycarbonyloxy, cyclohexyloxycarbonyloxy, tetrahydropyran-2-yloxycarbonyloxy, tetrahydrofuran-2-yloxycarbonyloxy, 1-ethoxyethoxycarbonyloxy and 1-butoxyethoxycarbonyloxy. The alkoxycarbonylalkyl group having 3 to 20 carbon atoms includes, for example, methoxycarbonylmethyl, ethoxycarbonylmethyl, isopropoxycarbonylmethyl, tert-butoxycarbonylmethyl, tert-butoxycarbonylethyl, tert-butoxycarbonylmenthyl, cyclohexyloxycarbonylmethyl, tetrahydropyran-2-yloxycarbonylmethyl, tetrahydropyran-2-yloxycarbonylmenthyl, tetrahydrofuran-2-yloxycarbonylmethyl, 1-ethoxyethoxycarbonylmethyl and 1-butoxyethoxycarbonylmethyl. The alkylcarboxycarbonyl group having 3 to 20 carbon atoms includes, for example, methylcarboxycarbonyl, ethylcarboxycarbonyl, isopropylcarboxycarbonyl and tert-butylcarboxycarbonyl, cyclohexylcarboxycarbonyl. The alkoxycarbonyloxyalkyl group having 3 to 20 carbon atoms includes, for example, methoxycarbonyloxymethyl, ethoxycarbonyloxymethyl, isopropoxycarbonyloxymethyl, tert-butoxycarbonyloxymethyl, tert-butoxycarbonyloxyethyl, tert-butoxycarbonyloxymenthyl, cyclohexyloxycarbonyloxymethyl, tetrahydropyran-2-yloxycarbonyloxymethyl, tetrahydropyran-2-yloxycarbonyloxymenthyl, tetrahydrofuran-2-yloxycarbonyloxymethyl, 1-ethoxyethoxycarbonyloxymethyl and 1-butoxyethoxycarbonyloxymethyl.

Among them, alkoxycarbonyl group, alkoxycarbonyloxy group, alkoxycarbonylalkyl group, or alkoxycarbonyloxyalkyl group having a secondary or tertiary alkoxy is preferably used. Particularly, tert-butoxycarbonyl group, tert-butoxycarbonylalkyl group, tert-butoxycarbonyloxy group, tert-butylcarboxycarbonyl group, tert-butoxycarbonyloxyalkyl group, tetrahydropyran-2-yloxycarbonyl group, tetrahydropyran-2-yloxycarbonylalkyl group, tetrahydropyran-2-yloxycarbonyloxy group and tetrahydropyran-2-yloxycarbonyloxyalkyl group are preferably used.

Specific examples further include hydrogen; alkyl group having 1 to 20 carbon atoms, such as methyl, ethyl, propyl, isopropyl, n-butyl, tert-butyl, cyclohexyl and menthyl; alkoxy group having 1 to 20 carbon atoms, such as methoxy, ethoxy, isopropoxy, n-butoxy, tert-butoxy and menthoxy; alkoxyalkyl group having 2 to 20 carbon atoms, such as methoxymethyl, methoxyethyl, tert-butoxymethyl, tert-butoxyethyl, methoxymenthol, or alkoxy saccharides such as methylglucose; halogen such as chlorine atom, bromine atom, iodine atom and fluorine atom; halogenated alkyl group having 1 to 20 carbon atoms, such as fluoromethyl, chloromethyl, bromomethyl, difluoromethyl, dichloromethyl, dibromomethyl, trifluoromethyl, trichloromethyl and tribromomethyl; alkylcarbonyloxy group having 2 to 20 carbon atoms, such as acetoxy; arylcarbonyloxy group having 7 to 20 carbon atoms, such as naphthoyloxy; alkylsulfonyloxy group having 1 to 20 carbon atoms, such as mesyloxy; arylsulfonyloxy group having 6 to 20 carbon atoms, such as tosyloxy; carboxy group or hydroxy group; carboxyalkyl group having 2 to 20 carbon atoms, such as carboxymethyl, carboxyethyl, carboxypropyl, carboxybutyl, carboxyisobutyl and carboxycyclohexyl; hydroxyalkyl group having 1 to 20 carbon atoms, such as hydroxymethyl, hydroxyethyl, hydroxypropyl, hydroxybutyl, hydroxyhexyl, menthol, or saccharides such as glucose.

$X^1$ is selected from —O—, —S—, —NR$^5$—, —PR$^5$—, or —CR$^5_2$— (R$^5$ represents hydrogen or an alkyl group having 1 to 20 carbon atoms) and, when m is any of 1 to 3, $X^1$ may be the same or different. The alkyl group having 1 to 20 carbon atoms represented by R$^5$ includes, for example, methyl, ethyl, n-propyl, isopropyl, n-butyl, tert-butyl, cyclohexyl and menthyl. Particularly, —O— or —CH$_2$— is preferred as $X^1$.

In at least one of R$^6$ to R$^9$ of the general formula (2) of the present invention, the substituent containing carboxy or hydroxy includes, for example, carboxy group; hydroxy group; carboxyalkyl group having 2 to 20 carbon atoms, such as carboxymethyl, carboxyethyl, carboxypropyl, carboxybutyl, carboxyisobutyl and carboxycyclohexyl; hydroxyalkyl group having 1 to 20 carbon atoms, such as hydroxymethyl, hydroxyethyl, hydroxypropyl, hydroxybutyl, hydroxyhexyl, menthol, or saccharides such as glucose.

Specific examples further include hydrogen; alkoxy group having 1 to 20 carbon atoms, such as methoxy, ethoxy, isopropoxy, n-butoxy, tert-butoxy and menthoxy; alkoxyalkyl group having 2 to 20 carbon atoms, such as methoxymethyl, methoxyethyl, tert-butoxymethyl, tert-butoxyethyl, methoxymenthol, or alkoxy saccharides such as methylglucose; alkyl group having 1 to 20 carbon atoms, such as methyl, ethyl, n-propyl, isopropyl, n-butyl, tert-butyl, cyclohexyl and menthyl; halogen such as chlorine atom, bromine atom, iodine atom and fluorine atom; halogenated alkyl group having 1 to 20 carbon atoms, such as fluoromethyl, chloromethyl, bromomethyl, difluoromethyl, dichloromethyl, dibromomethyl, trifluoromethyl, trichloromethyl and tribromomethyl; alkylcarbonyloxy group having 2 to 20 carbon atoms, such as acetoxy; arylcarbonyloxy group having 7 to 20 carbon atoms, such as naphthoyloxy; alkylsulfonyloxy group having 1 to 20 carbon atoms, such as mesyloxy; arylsulfonyloxy group having 6 to 20 carbon atoms, such as tosyloxy.

$X^2$ is selected from —O—, —S—, —NR$^{10}$—, —PR$^{10}$—, or —CR$^{10}_2$— (R$^{10}$ represents hydrogen or an alkyl group having 1 to 20 carbon atoms) and, when n is any of 1 to 3, $X^2$ may be the same or different. The alkyl group having 1 to 20 carbon atoms represented by R$^{10}$ includes, for example, methyl, ethyl, n-propyl, isopropyl, n-butyl, tert-butyl, cyclohexyl and menthyl. Particularly, —O— or —CH$_2$— is preferred as $X^2$.

In at least one of R$^{11}$ to R$^{14}$ of the general formula (3), the substituent containing cyano includes, for example, cyano group, and cyanoalkyl group having 2 to 20 carbon atoms, such as cyanomethyl and cyanoethyl. The substituent containing lactonyloxycarbonyl includes, for example, lactonyloxycarbonyl group having 5 to 20 carbon atoms, such as γ-butyrolactonyl-2-oxycarbonyl, γ-butyrolactonyl-3-oxycarbonyl, γ-valerolactonyl-2-oxycarbonyl, γ-valerolactonyl-3-oxycarbonyl, α-methyl-γ-butyrolactonyl-2-oxycarbonyl, (2-dihydrofuranone-5-yl) methoxycarbonyl, δ-valerolactonyl-2-oxycarboxyl, δ-valerolactonyl-3-oxycarboxyl, δ-valerolactonyl-4-oxycarboxyl, 2-methyl-δ-valerolactonyl-2-oxycarboxyl and 5,5-dimethylcyclopentanecarbolactonyl-1-oxycarbonyl.

Specific examples further include hydrogen; carboxy group; hydroxy group; carboxyalkyl group having 2 to 20 carbon atoms, such as carboxymethyl, carboxyethyl, carboxypropyl, carboxybutyl, carboxyisobutyl and carboxycyclohexyl; hydroxyalkyl group having 1 to 20 carbon atoms, such as hydroxymethyl, hydroxyethyl, hydroxypropyl, hydroxybutyl, hydroxyhexyl, menthol, or saccharides such as glucose; alkoxycarbonyl group having 2 to 20 carbon atoms, such as methoxycarbonyl, ethoxycarbonyl, n-propoxycarbonyl, isopropoxycarbonyl, n-butoxycarbonyl, tert-butoxycarbonyl, cyclohexyloxycarbonyl, tetrahydropyran-2-yloxycarbonyl, tetrahydrofuran-2-yloxycarbonyl, 1-ethoxyethoxycarbonyl and 1-butoxyethoxycarbonyl; alkoxycarbonylalkyl group having 3 to 20 carbon atoms, such as methoxycarbonylmethyl, ethoxycarbonylmethyl, isopropoxycarbonylmethyl, tert-butoxycarbonylmethyl, tert-butoxycarbonylethyl, tert-butoxycarbonylmenthyl, cyclohexyloxycarbonylmethyl, tetrahydropyran-2-yloxycarbonylmethyl, tetrahydropyran-2-yloxycarbonylmenthyl, tetrahydrofuran-2-yloxycarbonylmethyl, 1-ethoxyethoxycarbonylmethyl and 1-butoxyethoxycarbonylmethyl; alkoxy group having 1 to 20 carbon atoms, such as methoxy, ethoxy, isopropoxy, n-butoxy, tert-butoxy and menthoxy; alkoxyalkyl group having 2 to 20 carbon atoms, such as methoxymethyl, methoxyethyl, tert-butoxymethyl, tert-butoxyethyl, methoxymenthol, alkoxy saccharides such as methylglucose; alkyl group having 1 to 20 carbon atoms, such as methyl, ethyl, n-propyl, isopropyl, n-butyl, tert-butyl, cyclohexyl and menthyl; halogen such as chlorine atom, bromine atom, iodine atom and fluorine atom; halogenated alkyl group having 1 to 20 carbon atoms, such as fluoromethyl, chloromethyl, bromomethyl, difluoromethyl, dichloromethyl, dibromomethyl, trifluoromethyl, trichloromethyl and tribromomethyl.

$X^3$ is selected from —O—, —S—, —NR$^{15}$—, —PR$^{15}$—, or —CR$^{15}_2$— (R$^{15}$ represents hydrogen or an alkyl group having 1 to 20 carbon atoms) and, when l is any of 1 to 3, $X^3$ may be the same or different. The alkyl group having 1 to 20 carbon atoms represented by R$^{15}$ includes, for example, methyl, ethyl, n-propyl, isopropyl, n-butyl, tert-butyl, cyclohexyl and menthyl. Particularly, —O— or —CH$_2$— is preferred as $X^3$.

The cyclic olefinic monomer represented by the general formula (4), (5) or (6) to be polymerized using a living ring-opening metathesis catalyst in the present invention includes, for example, derivative of bicycloheptene wherein x, y or z is 0, derivative of tetracyclodocosene wherein x, y or z is 1, derivative of hexacycloheptadecene wherein x, y or z is 2, and derivative of octacyclodocosene wherein x, y or z is 3.

In the general formula (4) of the present invention, the acid cleavable substituent represented by at least one of $R^{16}$ to $R^{19}$ is a substituent wherein a functional group is cleaved by an acid generated from a photosensitive agent on light exposure to form a carboxyl group, and examples thereof include alkoxycarbonyl group having 2 to 20 carbon atoms, alkoxycarbonyloxy group having 2 to 20 carbon atoms, alkoxycarbonylalkyl group having 3 to 20 carbon atoms, alkylcarboxycarbonyl group having 3 to 20 carbon atoms, and alkoxycarbonyloxyalkyl group having 3 to 20 carbon atoms.

Specifically, the alkoxycarbonyl group having 2 to 20 carbon atoms includes, for example, methoxycarbonyl, ethoxycarbonyl, n-propoxycarbonyl, isopropoxycarbonyl, n-butoxycarbonyl, tert-butoxycarbonyl, cyclohexyloxycarbonyl, tetrahydropyran-2-yloxycarbonyl, tetrahydrofuran-2-yloxycarbonyl, 1-ethoxyethoxycarbonyl and 1-butoxyethoxycarbonyl. The alkoxycarbonyloxy group having 2 to 20 carbon atoms includes, for example, methoxycarbonyloxy, ethoxycarbonyloxy, n-propoxycarbonyloxy, isopropoxycarbonyloxy, n-butoxycarbonyloxy, tert-butoxycarbonyloxy, cyclohexyloxycarbonyloxy, tetrahydropyran-2-yloxycarbonyloxy, tetrahydrofuran-2-yloxycarbonyloxy, 1-ethoxyethoxycarbonyloxy and 1-butoxyethoxycarbonyloxy. The alkoxycarbonylalkyl group having 3 to 20 carbon atoms includes, for example, methoxycarbonylmethyl, ethoxycarbonylmethyl, isopropoxycarbonylmethyl, tert-butoxycarbonylmethyl, tert-butoxycarbonylethyl, tert-butoxycarbonylmenthyl, cyclohexyloxycarbonylmethyl, tetrahydropyran-2-yloxycarbonylmethyl, tetrahydropyran-2-yloxycarbonylmenthyl, tetrahydrofuran-2-yloxycarbonylmethyl, 1-ethoxyethoxycarbonylmethyl and 1-butoxyethoxycarbonylmethyl. The alkylcarboxycarbonyl group having 3 to 20 carbon atoms includes, for example, methylcarboxycarbonyl, ethylcarboxycarbonyl, isopropylcarboxycarbonyl and tert-butylcarboxycarbonyl, cyclohexylcarboxycarbonyl. The alkoxycarbonyloxyalkyl group having 3 to 20 carbon atoms includes, for example, methoxycarbonyloxymethyl, ethoxycarbonyloxymethyl, isopropoxycarbonyloxymethyl, tert-butoxycarbonyloxymethyl, tert-butoxycarbonyloxyethyl, tert-butoxycarbonyloxymenthyl, cyclohexyloxycarbonyloxymethyl, tetrahydropyran-2-yloxycarbonyloxymethyl, tetrahydropyran-2-yloxycarbonyloxymenthyl, tetrahydrofuran-2-yloxycarbonyloxymethyl, 1-ethoxyethoxycarbonyloxymethyl and 1-butoxyethoxycarbonyloxymethyl.

Among them, alkoxycarbonyl group, alkoxycarbonyloxy group, alkoxycarbonylalkyl group, or alkoxycarbonyloxyalkyl group having a secondary or tertiary alkoxy is preferably used. Particularly, tert-butoxycarbonyl group, tert-butoxycarbonylalkyl group, tert-butoxycarbonyloxy group, tert-butylcarboxycarbonyl group, tert-butoxycarbonyloxyalkyl group, tetrahydropyran-2-yloxycarbonyl group, tetrahydropyran-2-yloxycarbonylalkyl group, tetrahydropyran-2-yloxycarbonyloxy group and tetrahydropyran-2-yloxycarbonyloxyalkyl group are preferably used.

Specific examples further include hydrogen; alkyl group having 1 to 20 carbon atoms, such as methyl, ethyl, propyl, isopropyl, n-butyl, tert-butyl, cyclohexyl and menthyl; alkoxy group having 1 to 20 carbon atoms, such as methoxy, ethoxy, isopropoxy, n-butoxy, tert-butoxy and menthoxy; alkoxyalkyl group having 2 to 20 carbon atoms, such as methoxymethyl, methoxyethyl, tert-butoxymethyl, tert-butoxyethyl, methoxymenthol, or alkoxy saccharides such as methylglucose; halogen such as chlorine atom, bromine atom, iodine atom and fluorine atom; halogenated alkyl group having 1 to 20 carbon atoms, such as fluoromethyl, chloromethyl, bromomethyl, difluoromethyl, dichloromethyl, dibromomethyl, trifluoromethyl, trichloromethyl and tribromomethyl; alkylcarbonyloxy group having 2 to 20 carbon atoms, such as acetoxy; arylcarbonyloxy group having 7 to 20 carbon atoms, such as naphthoyloxy; alkylsulfonyloxy group having 1 to 20 carbon atoms, such as mesyloxy; arylsulfonyloxy group having 6 to 20 carbon atoms, such as tosyloxy; carboxy group or hydroxy group; carboxyalkyl group having 2 to 20 carbon atoms, such as carboxymethyl, carboxyethyl, carboxypropyl, carboxybutyl, carboxyisobutyl and carboxycyclohexyl; hydroxyalkyl group having 1 to 20 carbon atoms, such as hydroxymethyl, hydroxyethyl, hydroxypropyl, hydroxybutyl, hydroxyhexyl, menthol, or saccharides such as glucose.

$X^4$ is selected from —O—, —S—, —$NR^{20}$—, —$PR^{20}$—, or —$CR^{20}_2$— ($R^{20}$ represents hydrogen or an alkyl group having 1 to 20 carbon atoms) and, when x is any of 1 to 3, $X^4$ may be the same or different. The alkyl group having 1 to 20 carbon atoms represented by $R^{20}$ includes, for example, methyl, ethyl, n-propyl, isopropyl, n-butyl, tert-butyl, cyclohexyl and menthyl. Particularly, at least one of $X^4$ is preferably —O— or —$CH_2$—.

In at least one of $R^{21}$ to $R^{24}$ of the general formula (5) of the present invention, the carboxyalkyl group having 2 to 20 carbon atoms includes, for example, carboxymethyl, carboxyethyl, carboxypropyl, carboxybutyl, carboxyisobutyl and carboxycyclohexyl. The hydroxyalkyl group having 1 to 20 carbon atoms includes, for example, hydroxymethyl, hydroxyethyl, hydroxypropyl, hydroxybutyl, hydroxyhexyl, menthol, or saccharides such as glucose. The alkoxy group having 1 to 20 carbon atoms includes, for example, methoxy, ethoxy, isopropoxy, n-butoxy, tert-butoxy and menthoxy. The alkoxyalkyl group having 2 to 20 carbon atoms includes, for example, methoxymethyl, methoxyethyl, tert-butoxymethyl, tert-butoxyethyl, methoxymenthol, or alkoxy saccharides such as methylglucose. The alkylcarbonyloxy group having 2 to 20 carbon atoms includes, for example, acetoxy; the arylcarbonyloxy group having 7 to 20 carbon atoms includes, for example, naphthoyloxy. The alkylsulfonyloxy group having 1 to 20 carbon atoms includes, for example, mesyloxy; the arylsulfonyloxy group having 6 to 20 carbon atoms includes, for example, tosyloxy. Specific examples further include carboxylic anhydride formed from $R^{21}$ and $R^{23}$ among $R^{21}$ to $R^{24}$. Among them, alkoxy group, alkoxyalkyl group, alkylcarbonyloxy group, arylcarbonyloxy group, alkylsulfonyloxy group, arylsulfonyloxy group or carboxylic anhydride is preferred. Particularly, carboxylic anhydride is more preferred.

Specific examples further include hydrogen; alkyl group having 1 to 20 carbon atoms, such as methyl, ethyl, n-propyl, isopropyl, n-butyl, t-butyl, cyclohexyl and menthyl; halogen such as chlorine atom, bromine atom, iodine atom and fluorine atom; halogenated alkyl group having 1 to 20 carbon atoms, such as fluoromethyl, chloromethyl, bromomethyl, difluoromethyl, dichloromethyl, dibromomethyl, trifluoromethyl, trichloromethyl and tribromomethyl.

$X^5$ is selected from —O—, —S—, —$NR^{25}$—, —$PR^{25}$—, or —$CR^{25}_2$— ($R^{25}$ represents hydrogen or an alkyl group having 1 to 20 carbon atoms) and, when y is any of 1 to 3, $X^5$ may be the same or different. The alkyl group having 1 to 20 carbon atoms represented by $R^{25}$ includes, for example, methyl, ethyl, n-propyl, isopropyl, n-butyl, tert-butyl, cyclohexyl and menthyl. Particularly, at least one of $X^5$ is preferably —O— or —CH$_2$—.

In at least one of $R^{26}$ to $R^{29}$ of the general formula (6) of the present invention, the substituent containing cyano includes, for example, cyano group, or cyanoalkyl group having 2 to 20 carbon atoms, such as cyanomethyl, cyanoethyl or the like. The substituent containing lactonyloxycarbonyl include, lactonyloxycarbonyl group having 5 to 20 carbon atoms, such as γ-butyrolactonyl-2-oxycarbonyl, γ-butyrolactonyl-3-oxycarbonyl, γ-valerlactonyl-2-oxycarbonyl, γ-valerlactonyl-3-oxycarbonyl, α-methyl-γ-butyrolactonyl-2-oxycarbonyl, (2-dihydrofuranone-5-yl)methoxycarbonyl, δ-valerlactonyl-2-oxycarboxyl, δ-valerlactonyl-3-oxycarboxyl, δ-valerlactonyl-4-oxycarboxyl, 2-methyl-δ-valerlactonyl-2-oxycarboxyl and 5,5-dimethylcyclopentanecarbolactonyl-1-oxycarbonyl.

Specific examples further include hydrogen; alkoxycarbonyl group having 2 to 20 carbon atoms, such as methoxycarbonyl, ethoxycarbonyl, n-propoxycarbonyl, isopropoxycarbonyl, n-butoxycarbonyl, tert-butoxycarbonyl, cyclohexyloxycarbonyl, tetrahydropyran-2-yloxycarbonyl, tetrahydrofuran-2-yloxycarbonyl, 1-ethoxyethoxycarbonyl and 1-butoxyethoxycarbonyl; alkoxycarbonylalkyl group having 3 to 20 carbon atoms, such as methoxycarbonylmethyl, ethoxycarbonylmethyl, isopropoxycarbonylmethyl, tert-butoxycarbonylmethyl, tert-butoxycarbonylethyl, tert-butoxycarbonylmenthyl, cyclohexyloxycarbonylmethyl, tetrahydropyran-2-yloxycarbonylmethyl, tetrahydropyran-2-yloxycarbonylmenthyl, tetrahydrofuran-2-yloxycarbonylmethyl, 1-ethoxyethoxycarbonylmethyl and 1-butoxyethoxycarbonylmethyl; alkoxy group having 1 to 20 carbon atoms, such as methoxy, ethoxy, isopropoxy, n-butoxy, tert-butoxy and menthoxy; alkoxyalkyl group having 2 to 20 carbon atoms, such as methoxymethyl, methoxyethyl, tert-butoxymethyl, tert-butoxyethyl, methoxymenthol, or alkoxy saccharides such as methylglucose; alkyl group having 1 to 20 carbon atoms, such as methyl, ethyl, propyl, isopropyl, n-butyl, t-butyl, cyclohexyl and menthyl; halogen such as chlorine atom, bromine atom, iodine atom and fluorine atom; halogenated alkyl group having 1 to 20 carbon atoms, such as fluoromethyl, chloromethyl, bromomethyl, difluoromethyl, dichloromethyl, dibromomethyl, trifluoromethyl, trichloromethyl and tribromomethyl.

$X^6$ is selected from —O—, —S—, —NR$^{30}$—, —PR$^{30}$—, or —CR$^{30}_2$— (R$^{30}$ represents hydrogen or an alkyl group having 1 to 20 carbon atoms) and, when z is any of 1 to 3, $X^6$ may be the same or different. The alkyl group having 1 to 20 carbon atoms represented by R$^{30}$ includes, for example, methyl, ethyl, n-propyl, isopropyl, n-butyl, tert-butyl, cyclohexyl and menthyl. Particularly, at least one of $X^6$ is preferably —O— or —CH$_2$—.

Specific examples of the general formula (4) in the present invention include 7-oxabicycloheptenes such as 5-tert-butoxycarbonyl-7-oxabicyclo[2.2.1]hept-2-ene, 5-methoxycarbonyl-7-oxabicyclo[2.2.1]hept-2-ene, 5-(tetrahydropyran-2'-yl)oxycarbonyl-7-oxabicyclo-[2.2.1]hept-2-ene, 5-tert-butoxycarbonyloxy-7-oxabicyclo[2.2.1]hept-2-ene, 5-(tetrahydropyran-2'-yl)oxycarbonyloxy-7-oxabicyclo[2.2.1]hept-2-ene, 5-tert-butoxycarbonyl-5-methyl-7-oxabicyclo[2.2.1]hept-2-ene, 5-tert-butoxycarbonyloxy-5-methyl-7-oxabicyclo[2.2.1]hept-2-ene, 5-(tetrahydropyran-2'-yl)oxycarbonyl-5-methyl-7-oxabicyclo[2.2.1]hept-2-ene, 5-(tetrahydropyran-2'-yl)oxycarbonyloxy-5-methyl-7-oxabicyclo[2.2.1]hept-2-ene, 5,6-di-tert-butoxycarbonyl-7-oxabicyclo[2.2.1]hept-2-ene, 5,6-di(tetrahydropyran-2'-yl)oxycarbonyl-7-oxabicyclo[2.2.1]hept-2-ene, 5-tert-butoxycarbonyl-6-methyl-7-oxabicyclo[2.2.1]hept-2-ene, 5-tert-butoxycarbonyloxy-6-methyl-7-oxabicyclo[2.2.1]hept-2-ene, 5-(tetrahydropyran-2'-yl)oxycarbonyl-6-methyl-7-oxabicyclo[2.2.1]hept-2-ene, 5-(tetrahydropyran-2'-yl)oxycarbonyloxy-6-methyl-7-oxabicyclo[2.2.1]hept-2-ene, 5-tert-butoxycarbonyl-6-methoxycarbonyl-7-oxabicyclo[2.2.1]hept-2-ene, 5-tert-butoxycarbonyloxy-6-methoxycarbonyl-7-oxabicyclo[2.2.1]hept-2-ene, 5-(tetrahydropyran-2'-yl)oxycarbonyl-6-methoxycarbonyl-7-oxabicyclo[2.2.1]hept-2-ene, 5-(tetrahydropyran-2'-yl)oxycarbonyloxy-6-methoxycarbonyl-7-oxabicyclo[2.2.1]hept-2-ene, 5-tert-butoxycarbonyl-6-tert-butoxycarbonylmethyl-7-oxabicyclo[2.2.1]hept-2-ene, 5-tert-butoxycarbonyloxy-6-tert-butoxycarbonylmethyl-7-oxabicyclo[2.2.1]hept-2-ene, 5-(tetrahydropyran-2'-yl)oxycarbonyl-6-tert-butoxycarbonylmethyl-7-oxabicyclo[2.2.1]hept-2-ene, 5-(tetrahydropyran-2'-yl)oxycarbonyloxy-6-tert-butoxycarbonylmethyl-7-oxabicyclo[2.2.1]hept-2-ene, 5-tert-butoxycarbonyl-6trifluoromethyl-7-oxabicyclo[2.2.1]hept-2-ene, 5-tert-butoxycarbonyloxy-6-trifluoromethyl-7-oxabicyclo-[2.2.1]hept-2-ene, 5-(tetrahydropyran-2'-yl)oxycarbonyl-6-trifluoromethyl-7-oxabicyclo[2.2.1]hept-2-ene, 5-(tetrahydropyran-2'-yl)oxycarbonyloxy-6-trifluoromethyl-7-oxabicyclo[2.2.1]hept-2-ene, 5-(tetrahydropyran-2'-yl)oxycarbonylmethyl-7-oxabicyclo[2.2.1]hept-2-ene, 5-(tetrahydropyran-2'-yl)oxycarbonyloxymethyl-7-oxa-bicyclo[2.2.1]hept-2-ene, 5-tert-butoxycarbonylmethyl-7-oxabicyclo[2.2.1]hept-2-ene, 5-tert-butoxycarbonyloxymethyl-7-oxabicyclo[2.2.1]hept-2-ene, 5-tert-butoxycarbonyloxycyclohexyl-7-oxabicyclo[2.2.1]hept-2-ene, 5-tert-butoxycarbonylcyclohexyl-7-oxabicyclo[2.2.1]hept-2-ene, 5-tert-butoxycarbonyl-6-acetoxy-7-oxabicyclo[2.2.1]hept-2-ene, 5-tert-butoxycarbonyloxy-6-acetoxy-7-oxabicyclo[2.2.1]hept-2-ene, 5-(tetrahydropyran-2'-yl)oxycarbonyl-6-acetoxy-7-oxabicyclo[2.2.1]hept-2-ene, 5-(tetrahydropyran-2'-yl)oxycarbonyloxy-6-acetoxy-7-oxabicyclo[2.2.1]hept-2-ene, 5-tert-butoxycarbonyl-6-naphthoyloxy-7-oxabicyclo[2.2.1]hept-2-ene, 5-tert-butoxycarbonyloxy-6-naphthoyloxy-7-oxabicyclo[2.2.1]hept-2-ene, 5-(tetrahydropyran-2'-yl)oxycarbonyl-6-naphthoyloxy-7-oxabicyclo[2.2.1]hept-2-ene, 5-(tetrahydropyran-2'-yl)oxycarbonyloxy-5-naphthoyloxy-7-oxabicyclo[2.2.1]hept-2-ene, 5-tert-butoxycarbonyl-6-mesyloxy-7-oxabicyclo[2.2.1]hept-2-ene, 5-tert-butoxycarbonyloxy-6-mesyloxy-7-oxabicyclo[2.2.1]hept-2-ene, 5-(tetrahydropyran-2'-yl)oxycarbonyl-6-mesyloxy-7-oxabicyclo[2.2.1]hept-2-ene, 5-(tetrahydropyran-2'-yl)oxycarbonyloxy-6-mesyloxy-7-oxabicyclo[2.2.1]hept-2-ene, 5-tert-butoxycarbonyl-6-tosyloxy-7-oxabicyclo[2.2.1]hept-2-ene, 5-tert-butoxycarbonyloxy-6-tosyloxy-7-oxabicyclo[2.2.1]hept-2-ene, 5-(tetrahydropyran-2'-yl)oxycarbonyl-6-tosyloxy-7-oxabicyclo[2.2.1]hept-2-ene and 5-(tetrahydropyran-2'-yl)oxycarbonyloxy-6-tosyloxy-7-oxabicyclo[2.2.1]hept-2-ene; 7-thiabicycloheptenes wherein oxa(—O—) of 7-oxabicycloheptenes described above is replaced with thia (—S—); 7-azabicycloheptenes or 7-methyl-7-azabicycloheptenes wherein oxa(—O—) of 7-oxabicycloheptenes is replaced with aza(—NH—) or methylaza(—N(methyl)-); 7-phosphabicycloheptenes or 7-methyl-7-phosphabicycloheptenes wherein oxa(—O—) of 7-oxabicycloheptenes is replaced with phospha(—PH—) or methylphospha(—P(methyl)-); bicycloheptenes or 7-methylbicycloheptenes wherein oxa(—O—) of 7-oxabicycloheptenes is replaced with methylene(—$CH_2$—) or methylmethylene(—$CH(CH_3)$—).

Specific examples further include 11-oxatetracyclododecenes such as 8-tert-butoxycarbonyl-11-oxatetracyclo[$4.4.0.1^{2,5}.1^{7,10}$]-3-dodecene, 8-(tetrahydropyran-2'-yl)oxycarbonyl-11-oxatetracyclo[$4.4.0.1^{2,5}.1^{7,10}$]-3-dodecene, 8-tert-butoxycarbonyloxy-11-oxatetracyclo[$4.4.0.1^{2,5}.1^{7,10}$]-3-dodecene, 8-(tetrahydropyran-2'-yl)oxycarbonyloxy-11-oxatetracyclo[$4.4.0.1^{2,5}.1^{7,10}$]-3-dodecene, 8-tert-butoxycarbonyl-8-methyl-11-oxatetracyclo[$4.4.0.1^{2,5}.1^{7,10}$]-3-dodecene, 8-tert-butoxycarbonyloxy-8-methyl-11-oxatetracyclo[$4.4.0.1^{2,5}.1^{7,10}$]-3-dodecene, 8-(tetrahydropyran-2'-yl)oxycarbonyl-8-methyl-11-oxatetracyclo[$4.4.0.1^{2,5}.1^{7,10}$]-3-dodecene, 8-(tetrahydropyran-2'-yl)oxycarbonyloxy-8-methyl-11-oxatetracyclo[$4.4.0.1^{2,5}.1^{7,10}$]-3-dodecene, 8,9-di-tert-butoxycarbonyl-11-oxatetracyclo[$4.4.0.1^{2,5}.1^{7,10}$]-3-dodecene, 8,9-di(tetrahydropyran-2'-yl)oxycarbonyl-11-oxatetracyclo[$4.4.0.1^{2,5}.1^{7,10}$]-3-dodecene, 8-tert-butoxycarbonyl-9-methyl-11-oxatetracyclo[$4.4.0.1^{2,5}.1^{7,10}$]-3-dodecene, 8-tert-butoxycarbonyloxy-9-methyl-11-oxatetracyclo[$4.4.0.1^{2,5}.1^{7,10}$]-3-dodecene, 8-(tetrahydropyran-2'-yl)oxycarbonyl-9-methyl-11-oxatetracyclo[$4.4.0.1^{2,5}.1^{7,10}$]-3-dodecene, 8-(tetrahydropyran-2'-yl)oxycarbonyloxy-9-methyl-11-oxatetracyclo[$4.4.0.1^{2,5}.1^{7,10}$]-3-dodecene, 8-tert-butoxycarbonyl-9-methoxycarbonyl-11-oxatetracyclo[$4.4.0.1^{2,5}.1^{7,10}$]-3-dodecene, 8-tert-butoxycarbonyloxy-9-methoxycarbonyl-11-oxatetracyclo[$4.4.0.1^{2,5}.1^{7,10}$]-3-dodecene, 8-(tetrahydropyran-2'-yl)oxycarbonyl-9-methoxycarbonyl-11-oxatetracyclo[$4.4.0.1^{2,5}.1^{7,10}$]-3-dodecene, 8-(tetrahydropyran-2'-yl)oxycarbonyloxy-9-methoxycarbonyl-11-oxatetracyclo[$4.4.0.1^{2,5}.1^{7,10}$]-3-dodecene, 8-tert-butoxycarbonyl-9-tert-butoxycarbonylmethyl-11-oxatetracyclo[$4.4.0.1^{2,5}.1^{7,10}$]-3-dodecene, 8-tert-butoxycarbonyloxy-9-tert-butoxycarbonylmethyl-11-oxatetracyclo[$4.4.0.1^{2,5}.1^{7,10}$]-3-dodecene, 8-(tetrahydropyran-2'-yl)oxycarbonyl-9-tert-butoxycarbonylmethyl-11-oxatetracyclo[$4.4.0.1^{2,5}.1^{7,10}$]-3-dodecene, 8-(tetrahydropyran-2'-yl)oxycarbonyloxy-9-tert-butoxycarbonylmethyl-11-oxatetracyclo[$4.4.0.1^{2,5}.1^{7,10}$]-3-dodecene, 8-tert-butoxycarbonyl-9-trifluoromethyl-11-oxatetracyclo[$4.4.0.1^{2,5}.1^{7,10}$]-3-dodecene, 8-tert-butoxycarbonyloxy-9-trifluoromethyl-11-oxatetracyclo[$4.4.0.1^{2,5}.1^{7,10}$]-3-dodecene, 8-(tetrahydropyran-2'-yl)oxycarbonyl-9-trifluoromethyl-11-oxatetracyclo[$4.4.0.1^{2,5}.1^{7,10}$]-3-dodecene, 8-(tetrahydropyran-2'-yl)oxycarbonyloxy-9-trifluoromethyl-11-oxatetracyclo[$4.4.0.1^{2,5}.1^{7,10}$]-3-dodecene, 8-(tetrahydropyran-2'-yl)oxycarbonylmethyl-11-oxatetracyclo[$4.4.0.1^{2,5}.1^{7,10}$]-3-dodecene, 8-(tetrahydropyran-2'-yl)oxycarbonyloxymethyl-11-oxatetracyclo[$4.4.0.1^{2,5}.1^{7,10}$]-3-dodecene, 8-tert-butoxycarbonylmethyl-11-oxatetracyclo[$4.4.0.1^{2,5}.1^{7,10}$]-3-dodecene, 8-tert-butoxycarbonyloxymethyl-11-oxatetracyclo[$4.4.0.1^{2,5}.1^{7,10}$]-3-dodecene, 8-tert-butoxycarbonyloxycyclohexyl-11-oxatetracyclo[$4.4.0.1^{2,5}.1^{7,10}$]-3-dodecene, 8-tert-butoxycarbonylcyclohexyl-11-oxatetracyclo[$4.4.0.1^{2,5}.1^{7,10}$]-3-dodecene, 8-tert-butoxycarbonyl-9-acetoxy-11-oxatetracyclo[$4.4.0.1^{2,5}.1^{7,10}$]-3-dodecene, 8-tert-butoxycarbonyloxy-9-acetoxy-11-oxatetracyclo[$4.4.0.1^{2,5}.1^{7,10}$]-3-dodecene, 8-(tetrahydropyran-2'-yl)oxycarbonyl-9-acetoxy-11-oxatetracyclo[$4.4.0.1^{2,5}.1^{7,10}$]-3-dodecene, 8-(tetrahydropyran-2'-yl)oxycarbonyloxy-9-acetoxy-11-oxatetracyclo[$4.4.0.1^{2,5}.1^{7,10}$]-3-dodecene, 8-tert-butoxycarbonyl-9-naphthoyloxy-11-oxatetracyclo[$4.4.0.1^{2,5}.1^{7,10}$]-3-dodecene, 8-tert-butoxycarbonyloxy-9-naphthoyloxy-11-oxatetracyclo[$4.4.0.1^{2,5}.1^{7,10}$]-3-dodecene, 8-(tetrahydropyran-2'-yl)oxycarbonyl-9-naphthoyloxy-11-oxatetracyclo[$4.4.0.1^{2,5}.1^{7,10}$]-3-dodecene, 8-(tetrahydropyran-2'-yl)oxycarbonyloxy-9-naphthoyloxy-11-oxatetracyclo[$4.4.0.1^{2,5}.1^{7,10}$]-3-dodecene, 8-tert-butoxycarbonyl-9-mesyloxy-11-oxatetracyclo[$4.4.0.1^{2,5}.1^{7,10}$]-3-dodecene, 8-tert-butoxycarbonyloxy-9-mesyloxy-11-oxatetracyclo[$4.4.0.1^{2,5}.1^{7,10}$]-3-dodecene, 8-(tetrahydropyran-2'-yl)oxycarbonyl-9-mesyloxy-11-oxatetracyclo[$4.4.0.1^{2,5}.1^{7,10}$]-3-dodecene, 8-(tetrahydropyran-2'-yl)oxycarbonyloxy-9-mesyloxy-11-oxatetracyclo[$4.4.0.1^{2,5}.1^{7,10}$]-3-dodecene, 8-tert-butoxycarbonyl-9-tosyloxy-11-oxatetracyclo[$4.4.0.1^{2,5}.1^{7,10}$]-3-dodecene, 8-tert-butoxycarbonyloxy-9-tosyloxy-11-oxatetracyclo[$4.4.0.1^{2,5}.1^{7,10}$]-3-dodecene, 8-(tetrahydropyran-2'-yl)oxycarbonyl-9-tosyloxy-11-oxatetracyclo[$4.4.0.1^{2,5}.1^{7,10}$]-3-dodecene and 8-(tetrahydropyran-2'-yl)oxycarbonyloxy-9-tosyloxy-11-oxatetracyclo[$4.4.0.1^{2,5}.1^{7,10}$]-3-dodecene; 11-thiatetracyclododecenes wherein oxa(—O—) of 11-oxatetracyclododecenes is replaced with thia(—S—); 11-azatetracyclododecenes or 11-methyl-11-azatetracyclododecenes wherein oxa(—O—) of 11-oxatetracyclododecenes is replaced with aza(—NH—) or methylaza(—N(methyl)-); 11-phosphatetracyclododecenes or 11-methyl-11-phosphatetracyclododecenes wherein oxa(—O—) of 11-oxatetracyclododecenes is replaced with phospha(—PH—) or methylphospha(—P(methyl)-); tetracyclododecenes or 11-methyltetracyclododecenes wherein oxa(—O—) of 11-oxatetracyclododecenes is replaced with methylene(—$CH_2$—) or methylmethylene(—CH(methyl)-).

Specific examples further include 15-oxahexacycloheptadecenes such as 11-tert-butoxycarbonyl-15-oxahexacyclo[$6.6.1.1^{3,6}.1^{10,13}.0^{2,7}.0^{9,14}$]-4-heptadecene, 11-(tetrahydropyran-2'-yl)oxycarbonyl-15-oxahexacyclo[$6.6.1.1^{3,6}.1^{10,13}.0^{2,7}.0^{9,14}$]-4-heptadecene, 11-tert-butoxycarbonyloxy-15-oxahexacyclo[$6.6.1.1^{3,6}.1^{10,13}.0^{2,7}.0^{9,14}$]-4-heptadecene, 11-(tetrahydropyran-2'-yl)oxycarbonyloxy-15-oxahexacyclo[$6.6.1.1^{3,6}.1^{10,13}.0^{2,7}.0^{9,14}$]-4-heptadecene, 11-tert-butoxycarbonyl-11-methyl-15-oxahexacyclo[$6.6.1.1^{3,6}.1^{10,13}.0^{2,7}.0^{9,14}$]-4-heptadecene, 11-tert-butoxycarbonyloxy-11-methyl-15-oxahexacyclo[$6.6.1.1^{3,6}.1^{10,13}.0^{2,7}.0^{9,14}$]-4-heptadecene, 11-(tetrahydropyran-2'-yl)oxycarbonyl-11-methyl-15-oxahexacyclo[$6.6.1.1^{3,6}.1^{10,13}.0^{2,7}.0^{9,14}$]-4-heptadecene, 11-(tetrahydropyran-2'-yl)oxycarbonyloxy-11-methyl-15-oxahexacyclo[$6.6.1.1^{3,6}.1^{10,13}.0^{2,7}.0^{9,14}$]-4-heptadecene, 11,12-di-tert-butoxycarbonyl-15-oxahexacyclo[$6.6.1.1^{3,6}.1^{10,13}.0^{2,7}.0^{9,14}$]-4-heptadecene, 11,12-di(tetrahydropyran-2'-yl)oxycarbonyl-15-oxahexacyclo[$6.6.1.1^{3,6}.1^{10,13}.0^{2,7}.0^{9,14}$]-4-heptadecene, 11-tert-butoxycarbonyl-12-methyl-15-oxahexacyclo[$6.6.1.1^{3,6}.1^{10,13}.0^{2,7}.0^{9,14}$]-4-heptadecene, 11-tert-butoxycarbonyloxy-12-methyl-15-oxahexacyclo[$6.6.1.1^{3,6}.1^{10,13}.0^{2,7}.0^{9,14}$]-4-heptadecene, 11-(tetrahydropyran-2'-yl)oxycarbonyl-12-methyl-15-oxahexacyclo[$6.6.1.1^{3,6}.1^{10,13}.0^{2,7}.0^{9,14}$]-4-heptadecene, 11-(tetrahydropyran-2'-yl)oxycarbonyloxy-12-methyl-15-oxahexacyclo[$6.6.1.1^{3,6}.1^{10,13}.0^{2,7}.0^{9,14}$]-4-heptadecene, 11-tert-butoxycarbonyl-12-methoxycarbonyl-15-oxahexacyclo[$6.6.1.1^{3,6}.1^{10,13}.0^{2,7}.0^{9,14}$]-4-heptadecene, 11-tert-butoxycarbonyloxy-12-methoxycarbonyl-15-oxahexacyclo[$6.6.1.1^{3,6}.1^{10,13}.0^{2,7}.0^{9,14}$]-4-heptadecene, 11-(tetrahydropyran-2'-yl)oxycarbonyl-12-methoxycarbonyl-15-oxahexacyclo[$6.6.1.1^{3,6}.1^{10,13}.0^{2,7}.0^{9,14}$]-4-heptadecene, 11-(tetrahydropyran-2'-yl)oxycarbonyloxy-12-methoxycarbonyl-15-oxahexacyclo[$6.6.1.1^{3,6}.1^{10,13}.0^{2,7}.0^{9,14}$]-4-heptadecene, 11-tertbutoxycarbonyl-12-tert-butoxycarbonylmethyl-15-oxahexacyclo[6.6.1.1$^{3,6}$.1$^{10,13}$.0$^{2,7}$.0$^{9,14}$]-4-heptadecene, 11-tert-butoxycarbonyloxy-12-tert-butoxycarbonylmethyl-15oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyl-12-tert-butoxycarbonylmethyl-15-oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyloxy-12-tert-butoxycarbonylmethyl-15-oxahexacyclo[6.6.1.1$^{3,6}$.1$^{10,13}$.0$^{2,7}$.0$^{9,14}$]-4-heptadecene, 11-tert-butoxycarbonyl-12-trifluoromethyl-15-oxahexacyclo[6.6.1.1$^{3,6}$.1$^{10,13}$.0$^{2,7}$.0$^{9,14}$]-4-heptadecene, 11-tert-butoxycarbonyloxy-12-trifluoromethyl-15-oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyl-12-trifluoromethyl-15-oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyloxy-12-trifluoromethyl-15-oxahexacyclo[6.6.1.1$^{3,6}$.1$^{10,13}$.0$^{2,7}$.0$^{9,14}$]-4-heptadecene, 11-(tetrahydropyran-2'-yl)oxycarbonylmethyl-15oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyloxymethyl-15oxahexacyclo[6.6.1.1$^{3,6}$.1$^{10,13}$.0$^{2,7}$.0$^{9,14}$]-4-heptadecene, 11-tert-butoxycarbonylmethyl-15-oxahexacyclo[6.6.1.1$^{3,6}$.1$^{10,13}$.0$^{2,7}$.0$^{9,14}$]-4-heptadecene, 11-tert-butoxycarbonyloxymethyl-15oxahexacyclo[6.6.1.1$^{3,6}$.1$^{10,13}$.0$^{2,7}$.0$^{9,14}$]-4-heptadecene, 11-tert-butoxycarbonyloxycyclohexyl-15-oxahexacyclo[6.6.1.1$^{3,6}$.1$^{10,13}$.0$^{2,7}$.0$^{9,14}$]-4-heptadecene, 11-tert-butoxycarbonylcyclohexyl-15-oxahexacyclo[6.6.1.1$^{3,6}$.1$^{10,13}$.0$^{2,7}$.0$^{9,14}$]-4-heptadecene, 11-tert-butoxycarbonyl-12-acetoxy-15-oxahexacyclo[6.6.1.1$^{3,6}$.1$^{10,13}$.0$^{2,7}$.0$^{9,14}$]-4-heptadecene, 11-tert-butoxycarbonyloxy-12-acetoxy-15-oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyl-12-acetoxy-15-oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyloxy-12-acetoxy-15-oxahexacyclo[6.6.1.1$^{3,6}$.1$^{10,13}$.0$^{2,7}$.0$^{9,14}$]-4-heptadecene, 11-tert-butoxycarbonyl-12-naphthoyloxy-15-oxahexacyclo[6.6.1.1$^{3,6}$.1$^{10,13}$.0$^{2,7}$.0$^{9,14}$]-4-heptadecene, 11-tert-butoxycarbonyloxy-12-naphthoyloxy-15-oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyl-12-naphthoyloxy-15-oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyloxy-12-naphthoyloxy-15-oxahexacyclo[6.6.1.1$^{3,6}$.1$^{10,13}$.0$^{2,7}$.0$^{9,14}$]-4-heptadecene, 11-tert-butoxycarbonyl-12-mesyloxy-15-oxahexacyclo[6.6.1.1$^{3,6}$.1$^{10,13}$.0$^{2,7}$.0$^{9,14}$]-4-heptadecene, 11-tert-butoxycarbonyloxy-12-mesyloxy-15-oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyl-12-mesyloxy-15-oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyloxy-12-mesyloxy-15-oxahexacyclo[6.6.1.1$^{3,6}$.1$^{10,13}$.0$^{2,7}$.0$^{9,14}$]-4-heptadecene, 11-tert-butoxycarbonyl-12-tosyloxy-15-oxahexacyclo[6.6.1.1$^{3,6}$.1$^{10,13}$.0$^{2,7}$.0$^{9,14}$]-4-heptadecene, 11-tert-butoxycarbonyloxy-12-tosyloxy-15-oxahexacyclo[6.6.1.1$^{3,6}$.1$^{10,13}$.0$^{2,7}$.0$^{9,14}$]-4-heptadecene, 11-(tetrahydropyran-2'-yl)oxycarbonyl-12-tosyloxy-15-oxahexacyclo[6.6.1.1$^{3,6}$.1$^{10,13}$.0$^{2,7}$.0$^{9,14}$]-4-heptadecene and 11-(tetrahydropyran-2'-yl)oxycarbonyloxy-12-tosyloxy-15oxahexacyclo[6.6.1.1$^{3,6}$.1$^{10,13}$.0$^{2,7}$.0$^{9,14}$]-4-heptadecene; 15-thiahexacycloheptadecenes wherein oxa(—O—) of 15-oxahexacycloheptadecenes is replaced with thia(—S—); 15-azahexacycloheptadecenes or 15-methyl-15-azahexacycloheptadecenes wherein oxa(—O—) of 15-oxahexacycloheptadecenes is replaced with aza(—NH—) or methylaza(—N(methyl)-); 15-phosphahexacycloheptadecenes or 15-methyl-15-phosphahexacycloheptadecenes wherein oxa(—O—) of 15-oxahexacycloheptadecenes is replaced with phospha(—PH—) or methylphospha(—P(methyl)-); hexacycloheptadecenes or 15-methylhexacycloheptadecenes wherein oxa (—O—) of 15-oxahexacycloheptadecenes is replaced with methylene(—CH$_2$—) or methylmethylene(—CH(methyl)-).

Specific examples further include 19-oxaoctacyclodocosenes such as 14-tert-butoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyclohexyloxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyl-11-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyloxy-14-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, -14-(tetrahydropyran-2'-yl)oxycarbonyl-14-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyloxy-14-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-ditert-butoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-di(tetrahydropyran-2'-yl)oxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyl-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyloxy-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyclohexyloxycarbonyl-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyclohexyloxycarbonyloxy-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyl-15-methoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyloxy-15-methoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyl-15-methoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyloxy-15-methoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyl-15-tert-butoxycarbonylmethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyloxy-15-tert-butoxycarbonylmethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyl-15-tert-butoxycarbonylmethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyloxy-15-tert-butoxycarbonylmethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyl-15-trifluoromethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyloxy-15-trifluoromethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyl-15-trifluoromethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyloxy-15-trifluoromethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonylmethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyloxymethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonylmethyl-19-oxaoctacyclo[8.8.0.1$^{2,9}$.1$^{4,7}$.

$1^{11,18}.1^{13,16}.0^{3,8}.0^{12,17}$]-5-docosene, 14-tert-butoxycarbonyloxymethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyloxycyclohexyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonylcyclohexyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyl-15-acetoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyloxy-15-acetoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyl-15-acetoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyloxy-15-acetoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyl-15-naphthoyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyloxy-15-naphthoyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyl-15-naphthoyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyloxy-15-naphthoyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyl-15-mesyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyloxy-15-mesyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyl-15-mesyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyloxy-15-mesyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyl-15-tosyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyloxy-15-tosyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyl-15-tosyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, and 14-(tetrahydropyran-2'-yl)oxycarbonyloxy-15-tosyloxy-19-oxaoctacyclo[8.8.0.1$^{2,9}$.1$^{4,7}$.1$^{11,18}$.1$^{13,16}$.0$^{3,8}$.0$^{12,17}$]-5-docosene; 19-thiaoctacyclodocosenes wherein oxa(—O—) of 19-oxaoctacyclodocosenes is replaced with thia(—S—); 19-azaoctacyclodocosenes or 19-methyl-19-azaoctacyclodocosenes wherein oxa(—O—) of 19-oxaoctacyclodocosenes is replaced with aza(—NH—) or methylaza(—N(methyl)-); 19-phosphaoctacyclodocosenes or 19-methyl-19-phosphaoctacyclodocosenes wherein oxa(—O—) of 19-oxaoctacyclodocosenes is replaced with phospha(—PH—) or methylphospha(—P(methyl)-); octacyclodocosenes or 19-methyloctacyclodocosenes wherein oxa(—O—) of 19-oxaoctacyclodocosenes is replaced with methylene(—CH$_2$—) or methylmethylene(—CH(methyl)-).

Specific examples of the general formula (5) in the present invention include 7-oxabicycloheptenes such as 5-carboxy-7-oxabicyclo[2.2.1]hept-2-ene, 5-hydroxy-7-oxabicyclo[2.2.1]hept-2-ene, 5-carboxymethyl-7-oxabicyclo[2.2.1]hept-2-ene, 5-carboxycyclohexyl-7-oxabicyclo[2.2.1]hept-2-ene, 5-hydroxymethyl-7-oxabicyclo[2.2.1]hept-2-ene, 5-hydroxycyclohexyl-7-oxabicyclo[2.2.1]hept-2-ene, 5-methoxy-7-oxabicyclo[2.2.1]hept-2-ene, 5-tert-butoxy-7-oxabicyclo[2.2.1]hept-2-ene, 5-menthoxy-7-oxabicyclo[2.2.1]hept-2-ene, 5-tert-butoxymethyl-7-oxabicyclo[2.2.1]hept-2-ene, 5-menthoxymethyl-7-oxabicyclo[2.2.1]hept-2-ene, 5-acetoxy-7-oxabicyclo[2.2.1]hept-2-ene, 5-naphthoyloxy-7-oxabicyclo[2.2.1]hept-2-ene, 5-mesyloxy-7-oxabicyclo[2.2.1]hept-2-ene, 5-carboxy-6-methyl-7-oxabicyclo[2.2.1]hept-2-ene, 5-hydroxy-6-methyl-7-oxabicyclo[2.2.1]hept-2-ene, 5-carboxymethyl-6-methyl-7-oxabicyclo[2.2.1]hept-2-ene, 5-carboxycyclohexyl-6-ethyl-7-oxabicyclo(2.2.1)hept-2-ene, 5-hydroxymethyl-6-ethyl-7-oxabicyclo[2.2.1]hept-2-ene, 5-hydroxycyclohexyl-6-methyl-7-oxabicyclo[2.2.1]hept-2-ene, 5-methoxy-6-methyl-7-oxabicyclo[2.2.1]hept-2-ene, 5-tert-butoxy-6-methyl-7-oxabicyclo[2.2.1]hept-2-ene, 5-menthoxy-6-methyl-7-oxabicyclo[2.2.1]hept-2-ene, 5-tert-butoxymethyl-6-methyl-7-oxabicyclo[2.2.1]hept-2-ene, 5-menthoxymethyl-6-methyl-7-oxabicyclo[2.2.1]hept-2-ene, 5-acetoxy-6-methyl-7-oxabicyclo[2.2.1]hept-2-ene, 5-naphthoyloxy-6-methyl-7-oxabicyclo[2.2.1]hept-2-ene, 5-mesyloxy-6-methyl-7-oxabicyclo[2.2.1]hept-2-ene, 7-oxabicyclo[2.2.1]hept-5-ene-2,3-dicarboxylic anhydride, 7-oxabicyclo[2.2.1]hept-5-ene-2,3-dicarboxylic acid, 5,6-dihydroxy-7-oxabicyclo[2.2.1]hept-2-ene, 5-carboxymethyl-7-oxabicyclo[2.2.1]hept-2-ene, 5,6-dicarboxycyclohexyl-7-oxabicyclo[2.2.1]hept-2-ene, 5,6-dihydroxymethyl-7-oxabicyclo[2.2.1]hept-2-ene, 5,6-dihydroxycyclohexyl-7-oxabicyclo[2.2.1]hept-2-ene, 5,6-dimethoxy-7-oxabicyclo[2.2.1]hept-2-ene, 5,6-di-tert-butoxy-7-oxabicyclo[2.2.1]hept-2-ene, 5,6-dimenthoxy-7-oxabicyclo[2.2.1]hept-2-ene, 5,6-di-tert-butoxymethyl-7-oxabicyclo[2.2.1]hept-2-ene, 5,6-dimenthoxymethyl-7-oxabicyclo[2.2.1]hept-2-ene, 5,6-diacetoxy-7-oxabicyclo[2.2.1]hept-2-ene, 5,6-dinaphthoyloxy-7-oxabicyclo[2.2.1]hept-2-ene and 5,6-dimesyloxy-7-oxabicyclo[2.2.1]hept-2-ene; 7-thiabicycloheptenes wherein oxa(—O—) of 7-oxabicycloheptenes is replaced with thia(—S—), such as 5-carboxy-7-thiabicyclo[2.2.1]hept-2-ene, 5-hydroxy-7-thiabicyclo[2.2.1]hept-2-ene and 5-methoxy-7-thibicyclo[2.2.1]hept-2-ene; 7-azabicycloheptenes or 7-methyl-7-azabicycloheptenes wherein oxa(—O—) of 7-oxabicycloheptenes is replaced with aza(—NH—) or methylaza(—N(methyl)-); 7-phosphabicycloheptenes and 7-methyl-7-phosphabicycloheptenes wherein oxa(—O—) of 7-oxabicycloheptenes is replaced with phospha(—PH—) or methylphospha(—P(methyl)-); bicycloheptenes or 7-methylbicycloheptenes wherein oxa(—O—) of 7-oxabicycloheptenes is replaced with methylene(—CH$_2$—) or methylmethylene(—CH(methyl)-).

Specific examples further include 11-oxatetraclododecenes such as 8-carboxy-11-oxatetracyclo[4.4.0.1$^{2,5}$.1$^{7,10}$]-3-dodecene, 8-hydroxy-11-oxatetracyclo[4.4.0.1$^{2,5}$.1$^{7,10}$]-3-dodecene, 8-carboxymethyl-11-oxatetracyclo[4.4.0.1$^{2,5}$.1$^{7,10}$]-3-dodecene, 8-carboxycyclohexyl-11-oxatetracyclo[4.4.0.1$^{2,5}$.1$^{7,10}$]-3-dodecene, 8-hydroxymethyl-11-oxatetracyclo[4.4.0.1$^{2,5}$.1$^{7,10}$]-3-dodecene, 8-hydroxycyclohexyl-11-oxatetracyclo[4.4.0.1$^{2,5}$.1$^{7,10}$]-3-dodecene, 8-methoxy-11-oxatetracyclo[4.4.0.1$^{2,5}$.1$^{7,10}$]-3-dodecene, 8-tert-butoxy-11-oxatetracyclo[4.4.0.1$^{2,5}$.1$^{7,10}$]-3-dodecene, 8-menthoxy-11-oxatetracyclo[4.4.0.1$^{2,5}$.1$^{7,10}$]-3-dodecene, 8-tert-butoxymethyl-11-oxatetracyclo[4.4.0.1$^{2,5}$.1$^{7,10}$]-3-dodecene, 8-menthoxymethyl-11-oxatetracyclo[4.4.0.1$^{2,5}$.1$^{7,10}$]-3-dodecene, 8-acetoxy-11-oxatetracyclo[4.4.0.1$^{2,5}$.1$^{7,10}$]-3-dodecene, 8-naphthoyloxy-11-oxatetracyclo[4.4.0.1$^{2,5}$.1$^{7,10}$]-3-dodecene, 8-mesyloxy-11-oxatetracyclo[4.4.0.1$^{2,5}$.1$^{7,10}$]-3-dodecene, 8-carboxy-9-methyl-11-oxatetracyclo[4.4.0.1$^{2,5}$.1$^{7,10}$]-3-dodecene, 8-hydroxy-9-methyl-11-oxatetracyclo[4.4.0.1$^{2,5}$.1$^{7,10}$]-3-dodecene, 8-carboxymethyl-9-methyl-11-oxatetracyclo[4.4.0.1$^{2,5}$.1$^{7,10}$]-3-dodecene, 8-carboxycyclohexyl-9-methyl-11-oxatetracyclo[4.4.0.1$^{2,5}$.1$^{7,10}$]-3-dodecene, 8-hydroxymethyl-9-methyl-11-oxatetracyclo[4.4.0.1$^{2,5}$.1$^{7,10}$]-3-dodecene, 8-hydroxycyclohexyl-9-methyl-11- oxatetracyclo[4.4.0.1$^{2,5}$.1$^{7,10}$]-3-dodecene, 8-methoxy-9-methyl-11-oxatetracyclo[4.4.0.1$^{2,5}$.1$^{7,10}$]-3-dodecene, 8-tert-butoxy-9-methyl-11-oxatetracyclo[4.4.0.1$^{2,5}$.1$^{7,10}$]-3-dodecene, 8-menthoxy-9-methyl-11-oxatetracyclo[4.4.0.1$^{2,5}$.1$^{7,10}$]-3-dodecene, 8-tert-butoxymethyl-9-methyl-11-oxatetracyclo[4.4.0.1$^{2,5}$.1$^{7,10}$]-3-dodecene, 8-menthoxymethyl-9-methyl-11-oxatetracyclo[4.4.0.1$^{2,5}$.1$^{7,10}$]-3-dodecene, 8-acetoxy-9-methyl-11-oxatetracyclo[4.4.0.1$^{2,5}$.1$^{7,10}$]-3-dodecene, 8-naphthoyloxy-9-methyl-11-oxatetracyclo[4.4.0.1$^{2,5}$.1$^{7,10}$]-3-dodecene, 8-mesyloxy-9-methyl-11-oxatetracyclo[4.4.0.1$^{2,5}$.1$^{7,10}$]-3-dodecene, 11-oxatetracyclo[4.4.0.1$^{2,5}$.1$^{7,10}$]-8-dodecene-3,4-dicarboxylic anhydride, 11-oxatetracyclo[4.4.0.1$^{2,5}$.1$^{7,10}$]-8-dodecene-3,4-dicarboxylic acid, 8,9-dihydroxy-11-oxatetracyclo[4.4.0.1$^{2,5}$.1$^{7,10}$]-3-dodecene, 8,9-dicarboxymethyl-11-oxatetracyclo[4.4.0.1$^{2,5}$.1$^{7,10}$]-3-dodecene, 8,9-dicarboxycyclohexyl-11-oxatetracyclo[4.4.0.1$^{2,5}$.1$^{7,10}$]-3-dodecene, 8,9-dihydroxymethyl-11-oxatetracyclo[4.4.0.1$^{2,5}$.1$^{7,10}$]-3-dodecene, 8,9-dihydroxycyclohexyl-11-oxatetracyclo[4.4.0.1$^{2,5}$.1$^{7,10}$]-3-dodecene, 8,9-dimethoxy-11-oxatetracyclo[4.4.0.1$^{2,5}$.1$^{7,10}$]-3-dodecene, 8,9-di-tert-butoxy-11-oxatetracyclo[4.4.0.1$^{2,5}$.1$^{7,10}$]-3-dodecene, 8,9-dimenthoxy-11-oxatetracyclo[4.4.0.1$^{2,5}$.1$^{7,10}$]-3-dodecene, 8,9-di-tert-butoxymethyl-11-oxatetracyclo[4.4.0.1$^{2,5}$.1$^{7,10}$]-3-dodecene, 8,9-dimenthoxymethyl-11-oxatetracyclo[4.4.0.1$^{2,5}$.1$^{7,10}$]-3-dodecene, 8,9-diacetoxy-11-oxatetracyclo[4.4.0.1$^{2,5}$.1$^{7,10}$]-3-dodecene, 8,9-dinaphthoyloxy-11-oxatetracyclo[4.4.0.1$^{2,5}$.1$^{7,10}$]-3-dodecene and 8,9-dimesyloxy-11-oxatetracyclo[4.4.0.1$^{2,5}$.1$^{7,10}$]-3-dodecene; 11-thiatetracyclododecenes wherein oxa(—O—) of 11-oxatetracyclododecene is replaced with thia(—S—); 11-azatetracyclododecenes or 11-methyl-11-azatetracyclododecenes wherein oxa(—O—) of 11-oxatetracyclododecene is replaced with aza(—NH—) or methylaza(—N(methyl)-); 11-phosphatetracyclododecenes or 11-methyl-11-phosphatetracyclododecenes wherein oxa(—O—) of 11-oxatetracyclododecene is replaced with phospha(—PH—) or methylphospha(—P(methyl)-); tetracyclododecenes or 11-methyltetracyclododecenes wherein oxa(—O—) of 11-oxatetracyclododecene is replaced with methylene(—CH$_2$—) or methylmethylene(—CH(methyl)-).

Specific examples further include 15-oxahexacycloheptadecenes such as 11-carboxy-15-oxahexacyclo[6.6.1.1$^{3,6}$.1$^{10,13}$.0$^{2,7}$.0$^{9,14}$]-4-heptadecene, 11-hydroxy-15-oxahexacyclo[6.6.1.1$^{3,6}$.1$^{10,13}$.0$^{2,7}$.0$^{9,14}$]-4-heptadecene, 11-carboxymethyl-15-oxahexacyclo[6.6.1.1$^{3,6}$.1$^{10,13}$.0$^{2,7}$.0$^{9,14}$]-4-heptadecene, 11-carboxycyclohexyl-15-oxahexacyclo[6.6.1.1$^{3,6}$.1$^{10,13}$.0$^{2,7}$.0$^{9,14}$]-4-heptadecene, 11-hydroxymethyl-15-oxahexacyclo[6.6.1.1$^{3,6}$.1$^{10,13}$.0$^{2,7}$.0$^{9,14}$]-4-heptadecene, 11-hydroxycyclohexyl-15-oxahexacyclo[6.6.1.1$^{3,6}$.1$^{10,13}$.0$^{2,7}$.0$^{9,14}$]-4-heptadecene, 11-methoxy-15-oxahexacyclo[6.6.1.1$^{3,6}$.1$^{10,13}$.0$^{2,7}$.0$^{9,14}$]-4-heptadecene, 11-tert-butoxy-15-oxahexacyclo[6.6.1.1$^{3,6}$.1$^{10,13}$.0$^{2,7}$.0$^{9,14}$]-4-heptadecene, 11-menthoxy-15-oxahexacyclo[6.6.1.1$^{3,6}$.1$^{10,13}$.0$^{2,7}$.0$^{9,14}$]-4-heptadecene, 11-tert-butoxymethyl-15oxahexacyclo[6.6.1.1$^{3,6}$.1$^{10,13}$.0$^{2,7}$.0$^{9,14}$]-4-heptadecene, 11-menthoxymethyl-15-oxahexacyclo[6.6.1.1$^{3,6}$.1$^{10,13}$.0$^{2,7}$.0$^{9,14}$]-4-heptadecene, 11-acetoxy-15-oxahexacyclo[6.6.1.1$^{3,6}$.1$^{10,13}$.0$^{2,7}$.0$^{9,14}$]-4-heptadecene, 11-naphthoyloxy-15-oxahexacyclo[6.6.1.1$^{3,6}$.1$^{10,13}$.0$^{2,7}$.0$^{9,14}$]-4-heptadecene, 11-mesyloxy-15-oxahexacyclo[6.6.1.1$^{3,6}$.1$^{10,13}$.0$^{2,7}$.0$^{9,14}$]-4-heptadecene, 11-carboxy-12-methyl-15-oxahexacyclo[6.6.1.1$^{3,6}$.1$^{10,13}$.0$^{2,7}$.0$^{9,14}$]-4-heptadecene, 11-hydroxy-12-methyl-15-oxahexacyclo[6.6.1.1$^{3,6}$.1$^{10,13}$.0$^{2,7}$.0$^{9,14}$]-4-heptadecene, 11-carboxymethyl-12-methyl-15-oxahexacyclo[6.6.1.1$^{3,6}$.1$^{10,13}$.0$^{2,7}$.0$^{9,14}$]-4-heptadecene, 11-carboxycyclohexyl-12-methyl-15-oxahexacyclo[6.6.1.1$^{3,6}$.1$^{10,13}$.0$^{2,7}$.0$^{9,14}$]-4-heptadecene, 11-hydroxymethyl-12-methyl-15-oxahexacyclo[6.6.1.1$^{3,6}$.1$^{10,13}$.0$^{2,7}$.0$^{9,14}$]-4-heptadecene, 11-hydroxycyclohexyl-12-methyl-15-oxahexacyclo[6.6.1.1$^{3,6}$.1$^{10,13}$.0$^{2,7}$.0$^{9,14}$]-4-heptadecene, 11-methoxy-12-methyl-15-oxahexacyclo[6.6.1.1$^{3,6}$.1$^{10,13}$.0$^{2,7}$.0$^{9,14}$]-4-heptadecene, 11tert-butoxy-12-methyl-15-oxahexacyclo[6.6.1.1$^{3,6}$.1$^{10,13}$.0$^{2,7}$.0$^{9,14}$]-4-heptadecene, 11-menthoxy-12-methyl-15-oxahexacyclo[6.6.1.1$^{3,6}$.1$^{10,13}$.0$^{2,7}$.0$^{9,14}$]-4-heptadecene, 11-tert-butoxymethyl-12-methyl-15-oxahexacyclo[6.6.1.1$^{3,6}$.1$^{10,13}$.0$^{2,7}$.0$^{9,14}$]-4-heptadecene, 11-menthoxymethyl-12-methyl-15-oxahexacyclo[6.6.1.1$^{3,6}$.1$^{10,13}$.0$^{2,7}$.0$^{9,14}$]-4-heptadecene, 11-acetoxy-12-methyl-15-oxahexacyclo[6.6.1.1$^{3,6}$.1$^{10,13}$.0$^{2,7}$.0$^{9,14}$]-4-heptadecene, 11-naphthoyloxy-12-methyl-15-oxahexacyclo[6.6.1.1$^{3,6}$.1$^{10,13}$.0$^{2,7}$.0$^{9,14}$]-4-heptadecene, 11-mesyloxy-12-methyl-15-oxahexacyclo[6.6.1.1$^{3,6}$.1$^{10,13}$.0$^{2,7}$.0$^{9,14}$]-4-heptadecene, 15-oxahexacyclo[6.6.1.1$^{3,6}$.1$^{10,13}$.0$^{2,7}$.0$^{9,14}$]-11-heptadecene-4,5-dicarboxylic anhydride, 15-oxahexacyclo[6.6.1.1$^{3,6}$.1$^{10,13}$.0$^{2,7}$.0$^{9,14}$]-11-heptadecene-4,5-dicarboxylic acid, 11,12-dihydroxy-15-oxahexacyclo[6.6.1.1$^{3,6}$.1$^{10,13}$.0$^{2,7}$.0$^{9,14}$]-4-heptadecene, 11,12-dicarboxymethyl-15-oxahexacyclo[6.6.1.1$^{3,6}$.1$^{10,13}$.0$^{2,7}$.0$^{9,14}$]-4-heptadecene, 11,12-dicarboxycyclohexyl-15-oxahexacyclo[6.6.1.1$^{3,6}$.1$^{10,13}$.0$^{2,7}$.0$^{9,14}$]-4-heptadecene, 11,12-dihydroxymethyl-15-oxahexacyclo[6.6.1.1$^{3,6}$.1$^{10,13}$.0$^{2,7}$.0$^{9,14}$]-4-heptadecene, 11,12-dihydroxycyclohexyl-15-oxacyclohexylhexacyclo[6.6.6.1.1$^{3,6}$.1$^{10,13}$.0$^{2,7}$.0$^{9,14}$]-4-heptadecene, 11,12-dimethoxy-15-oxahexacyclo[6.6.1.1$^{3,6}$.1$^{10,13}$.0$^{2,7}$.0$^{9,14}$]-4-heptadecene, 11,12-di-tert-butoxy-15-oxahexacyclo[6.6.1.1$^{3,6}$.1$^{10,13}$.0$^{2,7}$.0$^{9,14}$]-4-heptadecene, 11,12-dimenthoxy-15-oxahexacyclo[6.6.1.1$^{3,6}$.1$^{10,13}$.0$^{2,7}$.0$^{9,14}$]-4-heptadecene, 11,12-di-tert-butoxymethyl-15-oxahexacyclo[6.6.1.1$^{3,6}$.1$^{10,13}$.0$^{2,7}$.0$^{9,14}$]-4-heptadecene, 11,12-dimenthoxymethyl-15-oxahexacyclo[6.6.1.1$^{3,6}$.1$^{10,13}$.0$^{2,7}$.0$^{9,14}$]-4-heptadecene, 11,12-diacetoxy-15-oxahexacyclo[6.6.1.1$^{3,6}$.1$^{10,13}$.0$^{2,7}$.0$^{9,14}$]-4-heptadecene, 11,12-dinaphthoyloxy-15-oxahexacyclo[6,6,1.1$^{3,6}$.1$^{10,13}$.0$^{2,7}$.0$^{9,14}$]-4-heptadecene and 11,12-dimesyloxy-15-oxahexacyclo[6.6.1.1$^{3,6}$.1$^{10,13}$.0$^{2,7}$.0$^{9,14}$]-4-heptadecene; 15-thiahexacycloheptadecenes wherein oxa(—O—) of 15-oxahexacycloheptadecenes is replaced with thia(—S—); 15-azahexacycloheptadecenes or 15-methyl-15-azahexacycloheptadecenes wherein oxa(—O—) of 15-oxahexacycloheptadecenes is replaced with aza(—NH—) or methylaza(—N(methyl)-); 15-phosphahexacycloheptadecenes or 15-methyl-15-phosphahexacycloheptadecenes wherein oxa(—O—) of 15-oxahexacycloheptadecenes is replaced with phospha(—PH—) or methylphospha(—P(methyl)-); hexacycloheptadecenes or 15-methylhexacycloheptadecenes wherein oxa(—O—) of 15-oxahexacycloheptadecenes is replaced with methylene(—CH$_2$—) or methylmethylene(-CH(methyl)-).

Specific examples further include 19-oxaoctacyclodocosenes such as 14-carboxy-19oxaoctacyclo[8.8.0.1$^{2,9}$.1$^{4,7}$.1$^{11,18}$.1$^{13,16}$.0$^{3,8}$.0$^{12,17}$]-5-docosene, -14-hydroxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-carboxymethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-carboxycyclohexyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-hydroxymethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-hydroxycyclohexyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-methoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxy-19- oxaoctacyclo[8.8.0.1$^{2,9}$.1$^{4,7}$.1$^{11,18}$.1$^{13,16}$.0$^{3,8}$.0$^{12,17}$]-5-docosene, 14-menthoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxymethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-menthoxymethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-acetoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-naphthoyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-mesyloxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-carboxy-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-hydroxy-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-carboxymethyl-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-carboxycyclohexyl-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-hydroxymethyl15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-hydroxycyclohexyl-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-methoxy-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxy-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-menthoxy-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxymethyl-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-menthoxymethyl-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-acetoxy-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-naphthoyloxy-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-mesyloxy-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 19-oxaoctacyclo[8.8.0.1$^{2,9}$.1$^{4,7}$.1$^{11,18}$.1$^{13,16}$.0$^{3,8}$.0$^{12,17}$]-14-docosene-5,6-dicarboxylic anhydride, 19-oxaoctacyclo[8.8.0.1$^{2,9}$.1$^{4,7}$.1$^{11,18}$.1$^{13,16}$.0$^{3,8}$.0$^{12,17}$]-11-docosene-5,6-dicarboxylic acid, 14,15-dihydroxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-dicarboxymethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-dicarboxycyclohexyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-dihydroxymethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-dihydroxycyclohexyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-dimethoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-di-tert-butoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-dimenthoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-di-tert-butoxymethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-dimenthoxymethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-diacetoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-dinaphthoyloxy-19-oxaoctacyclo[8.8.0.1$^{2,9}$.1$^{4,7}$.1$^{11,18}$.1$^{13,16}$.0$^{3,8}$.0$^{12,17}$]-5-docosene and 14,15-dimesyloxy-19-oxaoctacyclo[8.8.0.1$^{2,9}$.1$^{4,7}$.1$^{11,18}$.1$^{13,16}$.0$^{3,8}$.0$^{12,17}$]-5-docosene; 19-thiaoctacyclodocosenes wherein oxa(—O—) of 19-oxaoctacyclodocosenes is replaced with thia(—S—); 19-azaoctacyclodocosenes or 19-methyl-19-azaoctacyclodocosenes wherein oxa(—O—) of 19-oxaoctacyclodocosenes is replaced with aza(—NH—) or methylaza(—N(methyl)-); 19-phosphaoctacyclodocosenes or 19-methyl-19-phosphaoctacyclodocosenes wherein oxa(—O—) of 19-oxaoctacyclodocosenes is replaced with phospha(—PH—) or methylphospha(—P(methyl)-); octacyclodocosenes or 19-methyloctacyclodocosenes wherein oxa(—O—) of 19-oxaoctacyclodocosenes is replaced with methylene(—CH$_2$—) or methylmethylene(—CH(methyl)-).

Specific examples of the general formula (6) in the present invention include 7-oxabicycloheptenes such as 5-cyano-7-oxabicyclo[2.2.1]hept-2-ene, 5,6-dicyano-7-oxabicyclo[2.2.1]hept-2-ene, 5-cyanomethyl-7-oxabicyclo[2.2.1]hept-2-ene, 5-cyanoethyl-7-oxabicyclo[2.2.1]hept-2-ene, 5-cyano-6-methoxycarbonyl-7-oxabicyclo[2.2.1]hept-2-ene, 5-cyano-6-ethoxycarbonyl-7-oxabicyclo[2.2.1]hept-2-ene, 5-tert-butoxycarbonyl-6-cyano-7-oxabicyclo[2.2.1]hept-2-ene, 5-(tetrahydropyran-2'-yl)oxycarbonyl-6-cyano-7-oxabicyclo[2.2.1]hept-2-ene, 5-cyano-6-methoxy-7-oxabicyclo[2.2.1]hept-2-ene, 5-cyano-6-ethoxy-7-oxabicyclo[2.2.1]hept-2-ene, 5-tert-butoxy-6-cyano-7-oxabicyclo[2.2.1]hept-2-ene, 5-cyano-6-chloro-7-oxabicyclo[2.2.1]hept-2-ene, 5-cyano-6-bromo-7-oxabicyclo[2.2.1]hept-2-ene, 5-cyano-6-methyl-7-oxabicyclo[2.2.1]hept-2-ene, 5-cyanomethyl-6-methyl-7-oxabicyclo[2.2.1]hept-2-ene, 5-cyanoethyl-6-methyl-7-oxabicyclo[2.2.1]hept-2-ene, 5-cyanopropyl-6-methyl-7-oxabicyclo[2.2.1]hept-2-ene, 5-cyanobutyl-6-methyl-7-oxabicyclo[2.2.1]hept-2-ene, 5-cyano-6-ethyl-7-oxabicyclo[2.2.1]hept-2-ene, 5-cyanomethyl-6-ethyl-7-oxabicyclo[2.2.1]hept-2-ene, 5-cyanoethyl-6-ethyl-7-oxabicyclo[2.2.1]hept-2-ene, 5-cyanopropyl-6-ethyl-7-oxabicyclo[2.2.1]hept-2-ene, 5-cyanobutyl-6-ethyl-7-oxabicyclo[2.2.1]hept-2-ene, 5-(g-butyrolactonyl-2'-oxycarbonyl)-7-oxabicyclo[2.2.1]hept-2-ene, 5,6-di(g-butyrolactonyl-2'-oxycarbonyl)-7-oxabicyclo[2.2.1]hept-2-ene, 5-(γ-valerolactonyl-2'-oxycarbonyl)-7-oxabicyclo[2.2.1]hept-2-ene, 5-((2'-dihydrofuranone-5'-yl)methoxycarbonyl)-7-oxabicyclo[2.2.1]hept-2-ene, 5-(δ-valerolactonyl-2'-oxycarbonyl)-7-oxabicyclo[2.2.1]hept-2-ene, 5-(γ-butyrolactonyl-2'-oxycarbonyl)-6-methoxycarbonyl-7-oxabicyclo[2.2.1]hept-2-ene, 5-(γ-valerolactonyl-2'-oxycarbonyl)-6-methoxycarbonyl-7-oxabicyclo[2.2.1]hept-2-ene, 5-((2'-dihydrofuranone-5'-yl)methoxycarbonyl)-6-methoxycarbonyl-7-oxabicyclo[2.2.1]hept-2-ene, 5-(γ-valerolactonyl-2'-oxycarbonyl)-6-methoxycarbonyl-7-oxabicyclo[2.2.1]hept-2-ene, 5-(γ-butyrolactonyl-2'-oxycarbonyl)-6-ethoxycarbonyl-7-oxabicyclo[2.2.1]hept-2-ene, 5-tert-butoxycarbonyl-6-(γ-butyrolactonyl-2'-oxycarbonyl)-7-oxabicyclo[2.2.1]hept-2-ene, 5-(tetrahydropyran-2'-yl)oxycarbonyl-6-(γ-butyrolactonyl-2'-oxycarbonyl)-7-oxabicyclo[2.2.1]hept-2-ene, 5-(γ-butyrolactonyl-2'-oxycarbonyl)-6-methoxy-7-oxabicyclo[2.2.1]hept-2-ene, 5-(γ-valerolactonyl-2'-oxycarbonyl)-6-methoxy-7-oxabicyclo[2.2.1]hept-2-ene, 5-((2'-dihydrofuranone-5'-yl)methoxycarbonyl)-6-methoxy-7-oxabicyclo[2.2.1]hept-2-ene, 5-(δ-valerolactonyl-2'-oxycarbonyl)-6-methoxy-7-oxabicyclo[2.2.1]hept-2-ene, 5-(γ-butyrolactonyl-2'-oxycarbonyl)-6-ethoxy-7-oxabicyclo[2.2.1]hept-2-ene, 5-tert-butoxy-6-(γ-butyrolactonyl-2'-oxycarbonyl)-7-oxabicyclo[2.2.1]hept-2-ene, 5-(γ-butyrolactonyl-2'-oxycarbonyl)-6-chloro-7-oxabicyclo[2.2.1]hept-2-ene, 5-(γ-butyrolactonyl-2'-oxycarbonyl)-6-bromo-7-oxabicyclo[2.2.1]hept-2-ene, 5-(γ-butyrolactonyl-2'-oxycarbonyl)-6-methyl-7-oxabicyclo[2.2.1]hept-2-ene, 5-(γ-valerolactonyl-2'-oxycarbonyl)-6-methyl-7-oxabicyclo[2.2.1]hept-2-ene, 5-((2'-dihydrofuranone-5'-yl)methoxycarbonyl)-6-methyl-7-oxabicyclo[2.2.1]hept-2-ene and 5-(δ-valerolactonyl-2'-oxycarbonyl)-6-methyl-7-oxabicyclo[2.2.1]hept-2-ene; 7-thiabicycloheptenes wherein oxa(—O—) of 7-oxabicycloheptenes is replaced with thia(—S—); 7-azabicycloheptenes or 7-methyl-7- azabicycloheptenes wherein oxa(—O—) of 7-oxabicycloheptenes is replaced with aza(—NH—) or methylaza(—N(methyl)-); 7-phosphabicycloheptenes or 7-methyl-7-phosphabicycloheptenes wherein oxa(—O—) of 7-oxabicycloheptenes is replaced with phospha(—PH—) or methylphospha(—P(methyl)-); bicycloheptenes or 7-methylbicycloheptenes wherein oxa(—O—) of 7-oxabicycloheptenes is replaced with methylene(—CH$_2$—) or methylmethylene (—CH(methyl)-).

Specific examples further include 11-oxatetracyclododecenes such as 8-cyano-11-oxatetracyclo[4.4.0.1$^{2,5}$.1$^{7,10}$]-3-dodecene, 8,9-dicyano-11-oxatetracyclo[4.4.0.1$^{2,5}$.1$^{7,10}$]-3-dodecene, 8-cyanomethyl-11-oxatetracyclo[4.4.0.1$^{2,5}$.1$^{7,10}$]-3-dodecene, 8-cyanoethyl-11-oxatetracyclo[4.4.0.1$^{2,5}$.1$^{7,10}$]-3-dodecene, 8-cyano-9-methoxycarbonyl-11-oxatetracyclo[4.4.0.1$^{2,5}$.1$^{7,10}$]-3-dodecene, 8-cyano-9-ethoxycarbonyl-11-oxatetracyclo[4.4.0.1$^{2,5}$.1$^{7,10}$]-3-dodecene, 8-tert-butoxycarbonyl-9-cyano-11-oxatetracyclo[4.4.0.1$^{2,5}$.1$^{7,10}$]-3-dodecene, 8-(tetrahydropyran-2'-yl)oxycarbonyl-9-cyano-11-oxatetracyclo[4.4.0.1$^{2,5}$.1$^{7,10}$]-3-dodecene, 8-cyano-9-methoxy-11-oxatetracyclo[4.4.0.1$^{2,5}$.1$^{7,10}$]-3-dodecene, 8-cyano-9-ethoxy-11-oxatetracyclo[4.4.0.1$^{2,5}$.1$^{7,10}$]-3-dodecene, 8-tert-butoxy-9-cyano-11-oxatetracyclo[4.4.0.1$^{2,5}$.1$^{7,10}$]-3-dodecene, 8-cyano-9-chloro-11-oxatetracyclo[4.4.0.1$^{2,5}$.1$^{7,10}$]-3-dodecene, 8-cyano-9-bromo-11-oxatetracyclo[4.4.0.1$^{2,5}$.1$^{7,10}$]-3-dodecene, 8-cyano-9-methyl-11-oxatetracyclo[4.4.0.1$^{2,5}$.1$^{7,10}$]-3-dodecene, 8-cyanomethyl-9-methyl-11-oxatetracyclo[4.4.0.1$^{2,5}$.1$^{7,10}$]-3-dodecene, 8-cyanoethyl-9-methyl-11-oxatetracyclo[4.4.0.1$^{2,5}$.1$^{7,10}$]-3-dodecene, 8-cyanopropyl-9-methyl-11-oxatetracyclo[4.4.0.1$^{2,5}$.1$^{7,10}$]-3-dodecene, 8-cyanobutyl-9-methyl-11-oxatetracyclo[4.4.0.1$^{2,5}$.1$^{7,10}$]-3-dodecene, 8-cyano-9-ethyl-11-oxatetracyclo[4.4.0.1$^{2,5}$.1$^{7,10}$]-3-dodecene, 8-cyanomethyl-9-ethyl-11-oxatetracyclo[4.4.0.1$^{2,5}$.1$^{7,10}$]-3-dodecene, 8-cyanoethyl-9-ethyl-11-oxatetracyclo[4.4.0.1$^{2,5}$.1$^{7,10}$]-3-dodecene, 8-cyanopropyl-9-ethyl-11-oxatetracyclo[4.4.0.1$^{2,5}$.1$^{7,10}$]-3-dodecene, 8-cyanobutyl-9-ethyl-11-oxatetracyclo[4.4.0.1$^{2,5}$.1$^{7,10}$]-3-dodecene, 8-(γ-butyrolactonyl-2'-oxycarbonyl)-11-oxatetracyclo[4.4.0.1$^{2,5}$.1$^{7,10}$]-3-dodecene, 8,9-di(γ-butyrolactonyl-2'-oxycarbonyl)-11-oxatetracyclo[4.4.0.1$^{2,5}$.1$^{7,10}$]-3-dodecene, 8-(γ-valerolactonyl-2'-oxycarbonyl)-11-oxatetracyclo[4.4.0.1$^{2,5}$.1$^{7,10}$]-3-dodecene, 8-((2'-dihydrofuranone-5'-yl)methoxycarbonyl)-11-oxatetracyclo[4.4.0.1$^{2,5}$.1$^{7,10}$]-3-dodecene, 8-(δ-valerolactonyl-2'-oxycarbonyl)-11-oxatetracyclo[4.4.0.1$^{2,5}$.1$^{7,10}$]-3-dodecene, 8-(γ-butyrolactonyl-2'-oxycarbonyl)-9-methoxycarbonyl-11-oxatetracyclo[4.4.0.1$^{2,5}$.1$^{7,10}$]-3-dodecene, 8-(γ-valerolactonyl-2'-oxycarbonyl)-9-methoxycarbonyl-11-oxatetracyclo[4.4.0.1$^{2,5}$.1$^{7,10}$]-3-dodecene, 8-((2'-dihydrofuranone-5'-yl)methoxycarbonyl)-9-methoxycarbonyl-11-oxatetracyclo[4.4.0.1$^{2,5}$.1$^{7,10}$]-3-dodecene, 8-(γ-valerolactonyl-2'-oxycarbonyl)-9-methoxycarbonyl-11-oxatetracyclo[4.4.0.1$^{2,5}$.1$^{7,10}$]-3-dodecene, 8-(g-butyroactonyl-2'-oxycarbonyl)-9-ethoxycarbonyl-11-oxatetracyclo[4.4.0.1$^{2,5}$.1$^{7,10}$]-3-dodecene, 8-tert-butoxycarbonyl-9-(γ-butyrolactonyl-2'-oxycarbonyl)-11-oxatetracyclo[4.4.0.1$^{2,5}$.1$^{7,10}$]-3-dodecene, 8-(tetrahydropyran-2'-yl)oxycarbonyl-9-(γ-butyrolactonyl-2'-oxycarbonyl)-11-oxatetracyclo[4.4.0.1$^{2,5}$.1$^{7,10}$]-3-dodecene, 8-(γ-butyrolactonyl-2'-oxycarbonyl)-9-methoxy-11-oxatetracyclo[4.4.0.1$^{2,5}$.1$^{7,10}$]-3-dodecene, 8-(γ-valerolactonyl-2'-oxycarbonyl)-9-methoxy-11-oxatetracyclo[4.4.0.1$^{2,5}$.1$^{7,10}$]-3-dodecene, 8-((2'-dihydrofaranone-5'-yl)methoxycarbonyl)-9-methoxy-11-oxatetracyclo[4.4.0.1$^{2,5}$.1$^{7,10}$]-3-dodecene, 8-(γ-valerolactonyl-2'-oxycarbonyl)-9-methoxy-11-oxatetracyclo[4.4.0.1$^{2,5}$.1$^{7,10}$]-3-dodecene, 8-(γ-butyrolactonyl-2'-oxycarbonyl)-9-ethoxy-11-oxatetracyclo[4.4.0.1$^{2,5}$.1$^{7,10}$]-3-dodecene, 8-tert-butoxy-9-(γ-butyrolactonyl-2'-oxycarbonyl)-11-oxatetracyclo[4.4.0.1$^{2,5}$.1$^{7,10}$]-3-dodecene, 8-(γ-butyrolactonyl-2'-oxycarbonyl)-9-chloro-11-oxatetracyclo[4.4.0.1$^{2,5}$.1$^{7,10}$]-3-dodocene, 8-(γ-butyrolactonyl-2'-oxycarbonyl)-9-bromo-11-oxatetracyclo[4.4.0.1$^{2,5}$.1$^{7,10}$]-3-dodecene, 8-(γ-butyrolactonyl-2'-oxycarbonyl)-9-methyl-11-oxatetracyclo[4.4.0.1$^{2,5}$.1$^{7,10}$]-3-dodecene, 8-(γ-valerolactonyl-2'-oxycarbonyl)-9-methyl-11-oxatetracyclo[4.4.0.1$^{2,5}$.1$^{7,10}$]-3-dodecene, 8-((2'-dihydrofuranone-5'-yl)methoxycarbonyl)-9-methyl-11-oxatetracyclo[4.4.0.1$^{2,5}$.1$^{7,10}$]-3-dodecene and 8-(δ-valerolactonyl-2'-oxycarbonyl)-9-methyl-11-oxatetracyclo[4.4.0.1$^{2,5}$.7,10]-3-dodecene; 11-thiatetracyclododecenes wherein oxa(—O—)of 11-oxatetracyclododecenes is replaced with thia(—S—); 11-azatetracyclododecenes or 11-methyl-11-azatetracyclododecenes wherein oxa(—O—) of 11-oxatetracyclododecenes is replaced with aza(—NH—) or methylaza(—N(methyl)-); 11-phosphatetracyclododecenes or 11-methyl-11-phosphatetracyclododecenes wherein oxa(—O—) of 11-oxatetracyclododecenes is replaced with phospha(—PH—) or methylphospha(—P(methyl)-); tetracyclododecenes or 11-methyltetracyclododecenes wherein oxa(—O—)of 11-oxatetracyclododecenes is replaced with methylene(—CH$_2$—) or methylmethylene(—CH(methyl)-).

Specific examples further include 15-oxahexacycloheptadecenes such as 11-cyano-15-oxahexacyclo[6.6.1.1$^{3,6}$.0$^{2,7}$.0$^{9,14}$]-4-heptadecene, 11,12-dicyano-15-oxahexacyclo[6.6.1.1$^{3,6}$.0$^{2,7}$.0$^{9,14}$]-4-heptadecene, 11-cyanomethyl-15-oxahexacyclo[6.6.1.1$^{3,6}$.0$^{2,7}$.0$^{9,14}$]-4-heptadecene, 11-cyanoethyl-15-oxahexacyclo[6.6.1.1$^{3,6}$.0$^{2,7}$.0$^{9,14}$]-4-heptadecene, 11-cyano-12-methoxycarbonyl-15-oxahexacyclo[6.6.1.1$^{3,6}$.0$^{2,7}$.0$^{9,14}$]-4-heptadecene, 11-cyano-12-ethoxycarbonyl-15-oxahexacyclo[6.6.1.1$^{3,6}$.0$^{2,7}$.0$^{9,14}$]-4-heptadecene, 11-tert-butoxycarbonyl-12-cyano-15-oxahexacyclo[6.6.1.1$^{3,6}$.0$^{2,7}$.0$^{9,14}$]-4-heptadecene, 11-(tetrahydropyran-2'-yl)oxycarbonyl-12-cyano-15-oxahexacyclo[6.6.1.1$^{3,6}$.0$^{2,7}$.0$^{9,14}$]-4-heptadecene, 11-cyano-12-methoxy-15-oxahexacyclo[6.6.1.1$^{3,6}$.0$^{2,7}$.0$^{9,14}$]-4-heptadecene, 11-cyano-12-ethoxy-15-oxahexacyclo[6.6.1.1$^{3,6}$.0$^{2,7}$.0$^{9,14}$]-4-heptadecene, 11-tert-butoxy-12-cyano-15-oxahexacyclo[6.6.1.1$^{3,6}$.0$^{2,7}$.0$^{9,14}$]-4-heptadecene, 11-cyano-12-chloro-15-oxahexacyclo[6.6.1.1$^{3,6}$.0$^{2,7}$.0$^{9,14}$]-4-heptadecene, 11-cyano-12-bromo-15-oxahexacyclo[6.6.1.1$^{3,6}$.0$^{2,7}$.0$^{9,14}$]-4-heptadecene, 11-cyano-12-methyl-15-oxahexacyclo[6.6.1.1$^{3,6}$.0$^{2,7}$.0$^{9,14}$]-4-heptadecene, 11-cyanomethyl-12-methyl-15-oxahexacyclo[6.6.1.1$^{3,6}$.0$^{2,7}$.0$^{9,14}$]-4-heptadecene, 11-cyanoethyl-12-methyl-15-oxahexacyclo[6.6.1.1$^{3,6}$.0$^{2,7}$.0$^{9,14}$]-4-heptadecene, 11-cyanopropyl-12-methyl-15-oxahexacyclo[6.6.1.1$^{3,6}$.0$^{2,7}$.0$^{9,14}$]-4-heptadecene, 11-cyanobutyl-12-methyl-15-oxahexacyclo[6.6.1.1$^{3,6}$.0$^{2,7}$.0$^{9,14}$]-4-heptadecene, 11-cyano-12-ethyl-15-oxahexacyclo[6.6.1.1$^{3,6}$.0$^{2,7}$.0$^{9,14}$]-4-heptadecene, 11-cyanomethyl-12-ethyl-15-oxahexacyclo[6.6.1.1$^{3,6}$.0$^{2,7}$.0$^{9,14}$]-4-heptadecene, 11-cyanoethyl-12-ethyl-15-oxahexacyclo[6.6.1.1$^{3,6}$.0$^{2,7}$.0$^{9,14}$]-4-heptadecene, 11-cyanopropyl-12-ethyl-15-oxahexacyclo[6.6.1.1$^{3,6}$.0$^{2,7}$.0$^{9,14}$]-4-heptadecene, 11-cyanobutyl-12-ethyl-15-oxahexacyclo[6.6.1.1$^{3,6}$.0$^{2,7.09,14}$]-4-heptadecene, 11-(γ-butyrolactonyl-2'-oxycarbonyl)-15-oxahexacyclo[6.6.1.1$^{3,6}$.0$^{2,7}$.0$^{9,14}$]-4-heptadecene, 11,12-di(g-butyrolactonyl-2'-oxycarbonyl)-15-oxahexacyclo[6.6.1.1$^{3,6}$.0$^{2,7}$.0$^{9,14}$]-4-heptadecene, 11-(δ-valerolactonyl-2'-oxycarbonyl)-15- oxahexacyclo[6.6.1.1$^{3,6}$.0$^{2,7}$.0$^{9,14}$]-4-heptadecene, 11-((2'-dihydrofuranone-5'-yl)methoxycarbonyl)-15-oxahexacyclo[6.6.1.1$^{3,6}$.0$^{2,7}$.0$^{9,14}$]-4-heptadecene, 11-(δ-valerolactonyl-2'-oxycarbonyl)-15-oxahexacyclo[6.6.1.1$^{3,6}$.0$^{2,7}$.0$^{9,14}$]-4-heptadecene, 11-(γ-butyrolactonyl-2'-oxycarbonyl)-12-methoxycarbonyl-15-oxahexacyclo[6.6.1.1$^{3,6}$.0$^{2,7}$.0$^{9,14}$]-4-heptadecene, 11-(δ-valerolactonyl-2'-oxycarbonyl)-12-methoxycarbonyl-15-oxahexacyclo[6.6.1.1$^{3,6}$.0$^{2,7}$.0$^{9,14}$]-4-heptadecene, 11-((2'-dihydrofaranone-5'-yl)methoxycarbonyl)-12-methoxycarbonyl-15-oxahexacyclo[6.6.1.1$^{3,6}$.0$^{2,7}$.0$^{9,14}$]-4-heptadecene, 11-(δ-[valerolactonyl]-2'-oxycarbonyl)-12-methoxycarbonyl-15-oxahexacyclo[6.6.1.1$^{3,6}$.0$^{2,7}$.0$^{9,14}$]-4-heptadecene, 11-(γ-butyrolactonyl-2'-oxycarbonyl)-12-ethoxycarbonyl-15-oxahexacyclo[6.6.1.1$^{3,6}$.0$^{2,7}$.0$^{9,14}$]-4-heptadecene, 11-tert-butoxycarbonyl-12-(g-butyrolactonyl-2'-oxycarbonyl)-15-oxahexacyclo[6.6.1.1$^{3,6}$.0$^{2,7}$.0$^{9,14}$]-4-heptadecene, 11-(tetrahydropyran-2'-yl)oxycarbonyl-12-(δ-butyrolactonyl-2'-oxycarbonyl)-15-oxahexacyclo[6.6.1.1$^{3,6}$.0$^{2,7}$.0$^{9,14}$]-4-heptadecene, 11-(γ-butyrolactonyl-2'-oxycarbonyl)-12-methoxy-15-oxahexacyclo[6.6.1.1$^{3,6}$.0$^{2,7}$.0$^{9,14}$]-4-heptadecene, 11-(γ-valerolactonyl-2'-oxycarbonyl)-12-methoxy-15-oxahexacyclo[6.6.1.1$^{3,6}$.0$^{2,7}$.0$^{9,14}$]-4-heptadecene, 11-((2'-dihydrofuranone-5'-yl)methoxycarbonyl)-12-methoxy-15-oxahexacyclo[6.6.1.1$^{3,6}$.0$^{2,7}$.0$^{9,14}$]-4-heptadecene, 11-(δ-valerolactonyl-2'-oxycarbonyl)-12-methoxy-15-oxahexacyclo[6.6.1.1$^{3,6}$.0$^{2,7}$.0$^{9,14}$]-4-heptadecene, 11-(γ-butyrolactonyl-2'-oxycarbonyl)-12-ethoxy-15-oxahexacyclo[6.6.1.1$^{3,6}$.0$^{2,7}$.0$^{9,14}$]-4-heptadecene, 11-tert-butoxy-12-(γ-butyrolactonyl-2'-oxycarbonyl)-15-oxahexacyclo[6.6.1.1$^{3,6}$.0$^{2,7}$.0$^{9,14}$]-4-heptadecene, 11-(γ-butyrolactonyl-2'-oxycarbonyl)-12-chloro-15-oxahexacyclo[6.6.1.1$^{3,6}$.0$^{2,7}$.0$^{9,14}$]-4-heptadecene, 11-(γ-butyrolactonyl-2'-oxycarbonyl)-12-bromo-15-oxahexacyclo[6.6.1.1$^{3,6}$.0$^{2,7}$.0$^{9,14}$]-4-heptadecene, 11-(γ-butyrolactonyl-2'-oxycarbonyl)-12-methyl-15-oxahexacyclo[6.6.1.1$^{3,6}$.0$^{2,7}$.0$^{9,14}$]-4-heptadecene, 11-(γ-valerolactonyl-2'-oxycarbonyl)-12-methyl-15-oxahexacyclo[6.6.1.1$^{3,6}$.0$^{2,7}$.0$^{9,14}$]-4-heptadecene, 11-((2'-dihydrofuranone-5'-yl)methoxycarbonyl)-12-methyl-15-oxahexacyclo[6.6.1.1$^{3,6}$.0$^{2,7}$.0$^{9,14}$]-4-heptadecene and 11-(δ-valerolactonyl-2'-oxycarbonyl)-12-methyl-15-oxahexacyclo[6.6.1.1$^{3,6}$.0$^{2,7}$.0$^{9,14}$]-4-heptadecene; 15-thiahexacycloheptadecenes wherein ox(—O—) of 15-oxahexacycloheptadecenes is replaced with thia(—S—); 15-azahexacycloheptadecenes or 15-methyl-15-azahexacycloheptadecenes wherein ox(—O—) of 15-oxahexacycloheptadecenes is replaced with aza (—NH—) or methylaza(—N(methyl)-); 15-phosphahexacycloheptadecenes or 15-methyl-15-phosphahexacycloheptadecenes wherein ox(—O—) of 15-oxahexacycloheptadecenes is replaced with phospha(—PH—) or methylphospha(—P(methyl)-); hexacycloheptadecenes or 15-methylhexacycloheptadecenes wherein ox(—O—) of 15-oxahexacycloheptadecenes is replaced with methylene(—CH$_2$—) or methylmethylene(—CH(methyl)-).

Specific examples further include 19-oxaoctacyclodocosenes such as 14-cyano-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-dicyano-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyanomethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyanoethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyano-15-methoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyano-15-ethoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyl-15-cyano-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyl-15-cyano-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyano-15-methoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyano-15-ethoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxy-15-cyano-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyano-15-chloro-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyano-15-bromo-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyano-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyanomethyl-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyanoethyl-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyanopropyl-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyanobutyl-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyano-15-ethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyanomethyl-15-ethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-cyanoethyl-15-ethyl-19-oxaoctacyclo[8.8.0.1$^{2,9}$.1$^{4,7}$.1$^{11,18}$.1$^{13,16}$.0$^{3,8}$.0$^{12,17}$-5-docosene, 14-cyanopropyl-15-ethyl-19-oxaoctacyclo[8.8.0.1$^{2,9}$.1$^{4,7}$.1$^{11,1813,16}$.0$^{3,8}$.0$^{12,17}$]-5-docosene, 14-cyanobutyl-15-ethyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-butyrolactonyl-2'-oxycarbonyl)-19-oxaoctacyclo[8.8.0.1$^{2,9}$.1$^{4,7}$.1$^{11,18}$.1$^{13,16}$.0$^{3,8}$.0$^{12,17}$]-5-docosene, 14,15-di(γ-butyrolactonyl-2'-oxycarbonyl)-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-valerolactonyl-2'-oxycarbonyl)-19-oxaoctacyclo-[8.8.0.1$^{2,9}$.1$^{4,7}$.1$^{11,18}$.1$^{13,16}$.0$^{3,8}$.0$^{12,17}$]-5-docosene, 14-((2'-dihydrofuranone-5'-yl)methoxycarbonyl)-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(δ-valerolactonyl-2'-oxycarbonyl)-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-butyrolactonyl-2'-oxycarbonyl)-15-methoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-valerolactonyl-2'-oxycarbonyl)-15-methoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-((2'-dihydrofaranone-5'-yl)methoxycarbonyl)-15-methoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-valerolactonyl-2'-oxycarbonyl)-15-methoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-butyrolactonyl-2'-oxycarbonyl)-15-ethoxycarbonyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxycarbonyl-15-(γ-butyrolactonyl-2'-oxycarbonyl)-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(tetrahydropyran-2'-yl)oxycarbonyl-15-(γ-butyrolactonyl-2'-oxycarbonyl)-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-butyrolactonyl-2'-oxycarbonyl)-15-methoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-valerolactonyl-2'-oxycarbonyl)-15-methoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-((2'-dihydrofuranone-5'-yl)methoxycarbonyl)-15-methoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-valerolactonyl-2'-oxycarbonyl)-15-methoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(δ-butyrolactonyl-2'-oxycarbonyl)-15-ethoxy-19-oxaoctacyclo[8.8.0.1$^{2,9}$.1$^{4,7}$.1$^{11,18}$.1$^{13,16}$.0$^{3,8}$.0$^{12,17}$]-5-docosene, 14-tert-butoxy-15-(γ-butyrolactonyl- 2'-oxycarbonyl)-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-butyrolactonyl-2'-oxycarbonyl)-15-chloro-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-butyrolactonyl-2'-oxycarbonyl)-15-bromo-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-butyrolactonyl-2'-oxycarbonyl)-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-(γ-valerolactonyl-2'-oxycarbonyl)-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene, 14-((2'-dihydrofuranone-5'-yl)methoxycarbonyl)-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene and 14-(δ-valerolactonyl-2'-oxycarbonyl)-15-methyl-19-oxaoctacyclo[8.8.0.1$^{2,9}$.1$^{4,7}$.1$^{11,18}$.1$^{13,16}$.0$^{3,8}$.0$^{12,17}$]-5-docosene; 19-thiaoctacyclodocosenes wherein oxa(—O—) of 19-oxaoctacyclodocosenes is replaced with thia(—S—); 19-azaoctacyclodocosenes or 19-methyl-19-azaoctacyclodocosenes wherein oxa(—O—) of 19-oxaoctacyclodocosenes is replaced with aza(—NH—) or methylaza(—N(methyl)-); 19-phosphaoctacyclodocosenes or 19-methyl-19-phosphaoctacyclodocosene wherein oxa(—O—) of 19-oxaoctacyclodocosenes is replaced with phospha(—PH—) or methylphospha(—P(methyl)-); octacyclodocosenes or 19-methyloctacyclodocosenes wherein oxa(—O—) of 19-oxaoctacyclodocosenes is replaced with methylene(—CH$_2$—) or methylmethylene(—CH(methyl)-).

In the present invention, at least one cyclic olefinic monomer represented by the general formula (4), or at least two cyclic olefinic monomers represented by the general formulas (4) and (5), or at least three cyclic olefinic monomers represented by the general formulas (4), (5) and (6) is/are polymerized by using a living ring-opening metathesis catalyst. Furthermore, the monomer of the general formula (4), the monomers of the general formulas (4) and (5), or the monomers of the general formulas (4), (5) and (6) may be polymerized with a bicycloheptene derivative such as bicyclo[2.2.1]hept-2-ene, 5-methylbicyclo[2.2.1]hept-2-ene, 5-ethylbicyclo[2.2.1]hept-2-ene, 5-chlorobicyclo[2.2.1]hept-2-ene, 5-bromobicyclo[2.2.1]hept-2-ene or 5-methyl-6-methylbicyclo[2.2.1]hept-2-ene; a tetracyclododecene derivative such as tetracyclo[4.4.0.1$^{2,5}$.1$^{7,10}$]-3-dodecene, 8-methyltetracyclo[4.4.0.1$^{2,5}$.1$^{7,10}$]-3-dodecene, 8-ethyltetracyclo[4.4.0.1$^{2,5}$.1$^{7,10}$]-3-dodecene, 8-chlorotetracyclo[4.4.0.1$^{2,5}$.1$^{7,10}$]-3-dodecene, 8-bromotetracyclo[4.4.0.1$^{2,5}$.1$^{7,10}$]-3-dodecene or 8-methyl-9-methyltetracyclo[4.4.0.1$^{2,5}$.1$^{7,10}$]-3-dodecene; a hexacycloheptadecene derivative such as hexacyclo[6.6.1.1$^{3,6}$.1$^{10,13}$.0$^{2,7}$.0$^{9,14}$]-4-heptadecene, 11-methylhexacyclo[6.6.1.1$^{3,6}$.1$^{10,13}$.0$^{2,7}$.0$^{9,14}$]-4-heptadecene or 11-ethylhexacyclo[6.6.1.1$^{3,6}$.1$^{10,13}$.0$^{2,7}$.0$^{9,14}$]-4-heptadecene; an octacyclodocosene derivative such as octacyclo[8.8.0.1$^{2,9}$.1$^{4,7}$.1$^{11,18}$.1$^{13,16}$.0$^{3,8}$.0$^{12,17}$]-5docosene, 14-methyloctacyclo[8.8.0.1$^{2,9,4,7}$.1$^{11,18}$.1$^{13,16}$.0$^{3,8}$.0$^{12,17}$]-5-docosene or 14-ethyloctacyclo[8.8.0.1$^{2,9}$.1$^{4,7}$.1$^{11,18}$.1$^{13,16}$.0$^{3,8}$.0$^{12,17}$]-5-docosene; or a cycloolefin such as cyclobutene, cyclopentene, cycloheptene or cyclooctene.

The polymerization catalyst used in the present invention may be any catalyst capable of conducting living ring-opening metathesis polymerization, and specific examples of the ring-opening metathesis catalyst include tungsten alkylidene catalyst such as W(N-2,6-Pr$^i_2$C$_6$H$_3$)(CHBu$^t$)(OBu$^t$)$_2$, W(N-2,6-Pr$^i_2$C$_6$H$_3$)(CHBu$^t$)(OCMe$_2$CF$_3$)$_2$, W(N-2,6-Pr$^i_2$C$_6$H$_3$)(CHBu$^t$)(OCMe$_2$(CF$_3$)$_2$)$_2$, W(N-2,6-Pr$^i_2$C$_6$H$_3$)(CHCMe$_2$PH)(OBu$^t$)$_2$, W(N-2,6-Pr$^i_2$C$_6$H$_3$)(CHCMe$_2$PH)(OCMe$_2$CF$_3$)$_2$ or W(N-2,6-Pr$^i_2$C$_6$H$_3$)(CHCMe$_2$PH)(OCMe$_2$(CF$_3$)$_2$)$_2$ (wherein Pr$^i$ represents an iso-propyl group, Bu$^t$ represents a tert-butyl group, Me represents a methyl group, and Ph represents a phenyl group); tungsten alkylidene catalyst such as W(N-2,6-Me$_2$C$_6$H$_3$)(CHCHCMePH)(OBu$^t$)$_2$(PMe$_3$), W(N-2,6-Me$_2$C$_6$H$_3$)(CHCHCMe$_2$)(OBu$^t$)$_2$(PMe$_3$), W(N-2,6-Me$_2$C$_6$H$_3$)(CHCHCPH$_2$)(OBu$^t$)$_2$(PMe$_3$), W(N-2,6-Me$_2$C$_6$H$_3$)(CHCHCMePH)(OCMe$_2$(CF$_3$))$_2$(PMe$_3$), W(N-2,6-Me$_2$C$_6$H$_3$)(CHCHCMe$_2$)(OCMe$_2$(CF$_3$))$_2$(PMe$_3$), W(N-2,6-Me$_2$C$_6$H$_3$)(CHCHCPH$_2$)(OCMe$_2$(CF$_3$))$_2$(PMe$_3$), W(N-2,6-Me$_2$C$_6$H$_3$)(CHCHCMe$_2$)(OCMe(CF$_3$)$_2$)$_2$(PMe$_3$), W(N-2,6-Me$_2$C$_6$H$_3$)(CHCHCMe$_2$)(OCMe(CF$_3$)$_2$)$_2$(PMe$_3$), W(N-2,6-Me$_2$C$_6$H$_3$)(CHCHCPH$_2$)(OCMe(CF$_3$)$_2$)$_2$(PMe$_3$), W(N-2,6-Pr$^i_2$C$_6$H$_3$)(CHCHCMePH)(OCMe$_2$(CF$_3$))$_2$(PMe$_3$), W(N-2,6-Pr$^i_2$C$_6$H$_3$)(CHCHCMePH)(OCMe(CF$_3$)$_2$)$_2$(PMe$_3$) or W(N-2,6-Pr$^i_2$C$_6$H$_3$)(CHCHCMePH)(OPH)$_2$(PMe$_3$) (wherein Pr$^i$ represents an iso-propyl group, Bu$^t$ represents a tert-butyl group, Me represents a methyl group, and Ph represents a phenyl group); molybdenum alkylidenecaatlyst such as Mo(N-2,6-Pr$^i_2$C$_6$H$_3$)(CHBu$^t$)(OBu$^t$)$_2$, Mo(N-2,6-Pr$^i_2$C$_6$H$_3$)(CHBu$^t$)(OCMe$_2$CF$_3$)$_2$, Mo(N-2,6-Pr$^i_2$C$_6$H$_3$)(CHBu$^t$)(OCMe(CF$_3$)$_2$)$_2$, Mo(N-2,6-Pr$^i_2$C$_6$H$_3$)(CHCMe$_2$PH)(OBu$^t$)$_2$, Mo(N-2,6-Pr$^i_2$C$_6$H$_3$)(CHCMe$_2$PH)(OCMe$_2$CF$_3$)$_2$ or Mo(N-2,6-Pr$^i_2$C$_6$H$_3$)(CHCMe$_2$PH)(OCMe(CF$_3$)$_2$)$_2$ (wherein Pr$^i$ represents an iso-propyl group, Bu$^t$ represents a tert-butyl group, Me represents a methyl group, and Ph represents a phenyl group); rhenium alkylidene catalyst such as Re(CBu$^t$)(CHBu$^t$)(O-2,6-Pr$^i_2$C$_6$H$_3$)$_2$, Re(CBu$^t$)(CHBu$^t$)(O-2-Bu$^t$C$_6$H4)$_2$, Re(CBu$^t$)(CHBu$^t$)(OCMe$_2$CF$_3$)$_2$, Re(CBu$^t$)(CHBu$^t$)(OCMe(CF$_3$)$_2$)$_2$ or Re(CBu$^t$)(CHBu$^t$)(O-2,6-Me$_2$C$_6$H$_3$)$_2$ (wherein Bu$^t$ represents a tert-butyl group); tantalum alkylidene catalyst such as Ta[C(Me)C(Me)CHMe$_3$](O-2,6-Pr$^i_2$C$_6$H$_3$)$_3$Py or Ta[C(Ph)C(Ph)CHMe$_3$](O-2,6-Pr$^i_2$C$_6$H$_3$)$_3$Py (wherein Pr$^i$ represents an iso-propyl group, Me represents a methyl group, Ph represents a phenyl group, and Py represents a pyridine group); ruthenium alkylidene catalyst such as Ru(CHCHCPh$_2$)(PPh$_3$)$_2$Cl$_2$, Ru(CHCHCPh$_2$)(P(C$_6$H$_{11}$)$_3$)$_2$Cl$_2$ (wherein Ph represents a phenyl group) and titanacyclobutane catalyst. The above ring-opening metathesis catalysts may be used alone, or two or more kinds of them may be used in combination.

In addition to the above catalysts, there can also be used living ring-opening metathesis catalysts composed of a combination of an organic transition metal complex and Lewis acid as a cocatalyst, for example, ring-opening metathesis catalysts composed of a complex of a transition metal such as molybdenum and tungste with halogen, and a cocatalyst such as organoaluminum compound, organotin compound or organometallic compound of lithium, sodium, magnesium, zinc, cadmium, boron, etc.

Specific examples of the organic transition metal halogen complex include catalyst composed of a combination of a tungsten halogen complex such as W(N-2,6-Pr$^i_2$C$_6$H$_3$)(thf)(OBut)$_2$Cl$_2$, W(N-2,6-Pr$^i_2$C$_6$H$_3$)(thf)(OCMe$_2$CF$_3$)$_2$Cl$_2$, W(N-2,6-Pr$^i_2$C$_6$H$_3$)(thf)(OCMe$_2$(CF$_3$)$_2$)$_2$Cl$_2$, W(N-2,6-Pr$^i_2$C$_6$H$_3$)(thf)(OBu$^t$)$_2$Cl$_2$, W(N-2,6-Pr$^i_2$C$_6$H$_3$)(thf)(OCMe$_2$CF$_3$)$_2$Cl$_2$ or W(N-2,6-Pr$^i_2$C$_6$H$_3$)(thf)(OCMe$_2$(CF$_3$)$_2$)$_2$Cl$_2$ (wherein Pr$^i$ represents an iso-propyl group, Bu$^t$ represents a tert-butyl group, Me represents a methyl group, Ph represents a phenyl group, and thf represents tetrahydrofuran) and the following organometallic compound as the cocatalyst, or catalyst composed of a combination of a molybdenum halogen complex such as Mo(N-2,6-Pr$^i_2$C$_6$H$_3$)(thf)(OBu$^t$)$_2$Cl$_2$, Mo(N-2,6-Pr$^i_2$C$_6$H$_3$)(thf)(OCMe$_2$CF$_3$)$_2$Cl$_2$, Mo(N-2,6-Pr$^i_2$C$_6$H$_3$)(thf)(OCMe(CF3)$_2$)$_2$Cl$_2$, Mo(N-2,6-Pr$^i_2$C$_6$H$_3$)(thf)(OBu$^t$)$_2$Cl$_2$, Mo(N-2,6-Pr$^i_2$C$_6$H$_3$)(thf)(OCMe$_2$CF$_3$)$_2$Cl$_2$ or Mo(N-2,6-Pr$^i_2$C$_6$H$_3$)(thf)(OCMe(CF$_3$)$_2$)$_2$Cl$_2$ (wherein Pr$^i$ represents an isopropyl group, Bu$^t$ represents a tert-butyl group, Me represents a methyl group, Ph represents a phenyl group, and thf represents tetrahydrofuran) and the following organometallic compound as the cocatalyst.

Specific examples of the organometallic compound as the cocatalyst include organoaluminum compounds such as trimethylaluminum, triethylaluminum, triisobutylaluminum, trihexylaluminum, trioctylaluminum, triphenylaluminum, tribenzylaluminum, diethylaluminum monochloride, di-n-butylaluminum, diethylaluminum monobromide, diethylaluminum monoiodide, diethylaluminum monohydride, ethylaluminum sesquichloride and ethylaluminum dichloride; organotin compounds such as tetramethyltin, diethyldimethyltin, tetraethyltin, dibutyldiethyltin, tetrabutyltin, tetraoctyltin, trioctyltin fluoride, trioctyltin chloride, trioctyltin bromide, trioctyltin iodide, dibutyltin difluoride, dibutyltin dichloride, dibutyltin dibromide, dibutyltin diiodide, butyltin trifluoride, butyltin trichloride, butyltin tribromide and butyltin triiodide; organolithium compounds such as n-butyllithium; organosodium compounds such as n-pentylsodium; organomagnesium compounds such as methylmagnesium iodide, ethylmagnesium bromide, methylmagnesium bromide, n-propylmagnesium bromide, t-butylmagnesium chloride and allylmagnesium chloride; organozinc compounds such as diethylzinc; organocadmium compounds such as diethylcadmium; organoboron compounds such as trimethylboron, triethylboron and tri-n-butylboron.

In the living ring-opening metathesis polymerization of the present invention, a molar ratio of the cyclic olefinic monomer to the ring-opening metathesis catalyst is from 2 to 10,000, and preferably from 10 to 5,000, in the case of the transition metal alkylidene catalyst of tungsten, molybdenum, rhenium, tantalum, ruthenium, etc. or titana-cyclobutane catalyst. In the case of the ring-opening metathesis catalyst composed of the organic transition metal halogen complex and organometallic compound, the molar ratio of the cyclic olefinic monomer to the organic transition metal halogen complex is from 2 to 10,000, and preferably from 10 to 5,000, and the molar ratio of the organometallic compound as the cocatalyst to the organic transition metal halogen complex is from 0.1 to 10, and preferably from 1 to 5.

Although the ring-opening metathesis polymerization of the present invention may be conducted in the presence or absence of a solvent, the solvent to be used includes, for example, ethers such as tetrahydrofuran, diethyl ether, dibutyl ether, dimethoxyethane and dioxane; aromatic hydrocarbons such as benzene, toluene, xylene and ethylbenzene; aliphatic hydrocarbons such as pentane, hexane and heptane; alicyclic hydrocarbons such as cyclopentane, cyclohexane, methylcyclohexane, dimethylcyclohexane and decalin; and halogenated hydrocarbons such as methylene dichloride, dichloroethane, dichloroethylene, tetrachloroethane, chlorobenzene and trichlorobenzene. Two or more kinds of them may also be used in combination.

In the present invention, a chain transfer agent may be used to enhance the catalytic efficiency. Such a chain transfer agent includes, for examle, a-olefins such as ethylene, propylene, butene, pentene, hexene and octene; silicon-containing olefins such as vinyltrimethylsilane, allyltrinethylsilane, allyltriethylsilane and allylisopropylsilane; and non-conjugated dienes such as 1,4-pentadiene, 1,5-hexadiene and 1,6-heptadiene. Furthermore, these olefins or dienes may be used alone, or two or more kinds of them may be used in combination.

The amount pf the chain transfer agent used in combination in the present invention is within a range from 0.001 to 1,000, and preferably from 0.01 to 100, based on the cyclic olefinic monomer. The amount of the chain transfer agent is within a range from 0.1 to 1000 equivalents, and preferably from 1 to 500 equivalents, based on 1 equivalent of the alkylidene in the transition metal alkylidene.

In the ring-opening metathesis polymerization, the concentration of the monomer/ring-opening metathesis catalyst and solvent varies with the reactivity of the monomer and the solubility in the polymerization solvent, but is preferably within a range from 0.1 to 100 mol/L. Usually, a ring-opening metathesis polymer solution can be obtained by reacting at the reaction temperature of −30 to 150° C. for 1 minute to 10 hours and terminating the reaction using a deactivator such as aldehydes (e.g. butylaldehyde), ketones (e.g. acetone) and alcohols (e.g. methanol).

In the present invention, regarding the polymer obtained by the living ring-opening metathesis polymerization, a polymer having a desired molecular weight can be obtained by controlling the molar ratio between the monomer and catalyst because the living ring-opening metathesis polymerization is a living polymerization reaction. It is also possible to obtain a polymer having adesired molecular weight by controlling the molar ratio between the monomer and the chain transfer agent while the living polymerization is maintained by conducting the living ring-opening metathesis polymerization in the presence of an olefin or diene as the chain transfer agent. The number-average molecular weight of the polymer obtained by the living polymerization is from 500 to 100,000, preferably from 1,000 to 50,000, and particularly preferably from 3,000 to 20,000 as polystyrene standard. In addition, a ratio of the weight-average molecular weight, Mw, to the number-average molecular weight, Mn, that is Mw/Mn varies slightly depending on the properties of the monomer and chain transfer agent, but is controlled within a narrow molecular weight distribution of 1.0 to 2.0. The range of the molecular weight distribution does not vary even after the ring-opening metathesis polymer has been hydrogenated in the presence of the hydrogenation catalyst, or after it has been hydrolyzed. The molecular weight in this range and the narrow molecular weight distribution are important for forming a uniformly smooth coating film in the step of dissolving a resist material in a solvent and coating the solution onto a silicon wafer using a spin coater. Accordingly, it is very important to conduct living polymerization as polymerization for deciding the molecular weight and molecular weightdistribution as the resist material so that the polymer, produced by hydrogenating an olefin as a principal chain portion of the polymer and hydrolyzing a functional group, exhibits a function of the resist material wherein the solubility in a polar solvent, adhesion to the silicon wafer surface and coatability to the surface are enhanced.

In the hydrogenation of the olefin in the principal chain portion of the ring-opening metathesis polymer of the present invention, a known hydrogenation catalyst can be used. The ultraviolet (UV) maximum absorption range can be shifted by hydrogenating the olefin of the principal chain portion of the ring-opening metathesis polymer. Particularly, in order to enhance the UV transmittance in the wavelength region of an ArF excimer laser, i.e., at 193 nm as high as possible, this hydrogenation is indespensable. Specific examples of the heterogeneous hydrogenation catalyst include supported type metal catalysts obtained by supporting a metal such as palladium, platinum, nickel, rhodium or ruthenium on a carrier such as carbon, silica, alumina, titania, magnesia, diatomaceous earth or synthetic zeolite. The homogeneous catalyst includes, for example, known hydrogenated catalysts such as nickel naphthenate/ triethylaluminum, nickel acetylacetonate/ triisobutylaluminum, cobalt octenoate/n-butyllithium, titanocene dichloride/diethylaluminum chloride, rhodium acetate, dichlorobis(triphenylphosphine)palladium, chlorotris(triphenylphosphine)rhodium and dihydridetetrakis(triphenylphosphine)ruthenium. Furthermore, the hydrogenation can also be conducted in the presence of hydrogen by using a hydrogenation catalyst composed of an organometallic complex represented by the following general formula (7):

$$MH_kQ_hT_pZ_q \qquad (7)$$

(wherein M represents ruthenium, rhodium, osmium, iridium, palladium, platinum or nickel; H represents hydrogen; Q represents halogen; T represents CO, NO, toluene, acetonitrile or tetrahydrofuran; Z represents $PR'^1R'^2R'^3$ (P represents phosphorous, and $R'^1$, $R'^2$ and $R'^3$ are same or different and respectively represent a straight, branched or cyclic alkyl, alkenyl, aryl, alkoxy or allyloxy, or a halogen atom); k is 0 or 1; h is an integer of 1 to 3; p is 0 or 1; and q is an integer of 2 to 4) and an amine compound as a homogeneous catalyst.

In the general formula (7), the halogen atom represented by Q includes, for example, chlorine atom, fluorine atom, bromine atom and iodine atom. Furthermore, specific examples of the organophosphorous compound represented by Z include trimethylphosphine, triethylphosphine, triisopropylphosphine, tri-n-propylphosphine, tri-tert-butylphosphine, triisobutylphosphine, tri-n-butylphosphine, tricyclohexylphosphine, triphenylphosphine, methyldiphenylphosphine, dimethylphenylphosphine, tri-o-tolylphosphine, tri-m-tolylphosphine, tri-p-tolylphosphine, diethylphenylphosphine, dichloro(ethyl)phosphine, dichloro(phenyl)phosphine, chlorodiphenylphosphine, trimethylphosphite, triisopropylphosphite and triphenylphosphite.

Specific examples of the organometallic complex represented by the general formula (7) include dichlorobis(triphenylphosphine)nickel, dichlorobis(triphenylphosphine)palladium, dichlorobis(triphenylphosphine)platinum, chlorotris(triphenylphosphine)rhodium, dichlorotris(triphenylphosphine)osmium, dichlorohydridebis(triphenylphosphine)iridium, dichlorotris(triphenylphosphine)ruthenium, dichlorotetrakis(triphenylphosphine)ruthenium, trichloronitrosylbis(triphenylphosphine)ruthenium, dichlorobis(acetonitrile)bis(triphenylphosphine)ruthenium, dichlorobis(tetrahydrofuran)bis(triphenylphosphine)ruthenium, chlorohydride(toluene)tris(triphenylphosphine)ruthenium, chlorohydridecarbonyltris(triphenylphosphine)ruthenium, chlorohydridecarbonyltris(diethylphenylphosphine)rutheniumn, chlorohydridenitrosyltris(triphenylphosphine)ruthenium, dichlorotris(trimethylphosphine)ruthenium, dichlorotris(triethylphosphine)ruthenium, dichlorotris(tricyclohexylphosphine)ruthenium, dichlorotris(triphenylphosphine)ruthenium, dichlorotris(trimethyldiphenylphosphine)ruthenium, dichlorotris(tridimethylphenylphosphine)ruthenium, dichlorotris(tri-o-tolylphosphine)ruthenium, dichlorotris(dichloro(ethyl)phosphine)ruthenium, dichlorotris(dichloro(phenyl)phosphine)ruthenium, dichlorotris(trimethylphosphite)ruthenium and dichlorotris(triphenylphosphite)ruthenium.

Specific examples of the amine compound include primary amines such as methylamine, ethylamine, aniline, ethylenediamine and 1,3-diaminocyclobutane; secondary amines such as dimethylamine, methylisopropylamine and N-methylaniline; and tertiary amines such as trimethylamine, triethylamine, triphenylamine, N,N-dimethylaniline, pyridine and γ-picoline. Among them, the tertiary amine is preferably used. When using triethylamine, the hydrogenation rate is markedly improved.

Two or more kinds of these organometallic complexes and amine compounds can be used in combination in any proportion.

When using a known hydrogenation catalyst for hydrogenating the ring-opening metathesis polymer in the present invention, the amount of the known hydrogenation catalyst is from 5 to 50,000 ppm, and preferably from 100 to 1,000 ppm, based on the ring-opening metathesis polymer. When using a hydrogenation catalyst composed of the organometallic complex represented by the general formula (7) and amine compound, the amount of the organometallic complex represented by the general formula (7) is from 5 to 50,000 ppm, preferably from 100 to 10,000 ppm, and particularly preferably from 50 to 1,000 ppm, based on the ring-opening metathesis polymer. The amount of the amine compound is from 0.1 to 1,000 equivalents, preferably from 0.5 to 500 equivalent, and particularly preferably from 1 to 100 equivalents, based on the organometallic complex represented by the general formula (7) used in combination.

As the hydrogenation catalyst composed of the organometallic complex represented by the general formula (7) and the amine compound, those prepared by previously contacting the organometallic complex with the amine compound. The organometallic complex and the amine compound may be separately added to the reaction system, directly, without previously contacting the organometallic complex with the amine compound.

The solvent used in the hydrogenation of the ring-opening metathesis polymer may be any one, which is capable to dissolve the ring-opening metathesis polymer and is not hydrogenated itself, and examples thereof include ethers such as tetrahydrofuran, diethyl ether, dibutyl ether and dimethoxyethane; aromatic hydrocarbons such as benzene, toluene, xylene and ethylbenzene; aliphatic hydrocarbons such as pentane, hexane and heptane, alicyclic hydrocarbons such as cyclopentane, cyclohexane, methylcyclohexane, dimethylcyclohexane and decalin; and halogenated hydrocarbons such as methylene dichloride, dichloroethane, dichloroethylene, tetrachloroethane, chlorobenzene and trichlorobenzene. Two or more kinds of them may be used in combination.

The hydrogenation of the ring-opening metathesis polymer is usually conducted under a hydrogen pressure within a range from a normal pressure to 30 MPa, preferably from 0.5 to 20 MPa, and particularly preferably from 2 to 15 MPa. The reaction temperature is usually from 0 to 300° C., preferably from room temperature to 250° C., and particularly preferably from 50 to 200° C.

The production of the hydrogenated ring-opening metathesis polymer in the present invention can be conducted by isolating the ring-opening metathesis polymer from the ring-opening metathesis polymer solution and dissolving it again in a solvent. It is also possible to employ a method of conducting the hydrogenation by adding the hydrogenation catalyst composed of the above organometallic complex and the amine compound without isolating the ring-opening metathesis polymer.

After the completion of the ring-opening metathesis polymerization or hydrogenation, the ring-opening metathesis catalyst or hydrogenation catalyst remained in the polymer solution can be removed by a known method. The method includes, for example, filtration, adsorption method by adsorption agent, a method of adding an organic acid such as lactic acid, a poor solvent and water to a solution of a good solvent and extracting and removing the catalyst with maintaining this system at a normal or fixed temperature, and a method of contacting a solution of a good solvent or a polymer slurry with a basic compound and an acidic compound and washing to remove the catalyst.

The method of recovering a hydrogenated polymer from the hydrogenated ring-opening metathesis polymer solution is not specifically limited, and a known method can be used. The method includes, for example, a method of discharging a reaction solution in a poor solvent under stirring to solidify a hydrogenated polymer and recovering the hydrogenated polymer by filtration, centrifugation or decantation, steam-stripping method of bubbling steam in a reaction solution to precipitate a hydrogenated polymer, and method of directly removing a solvent from a reaction solution by heating.

Using the hydrogenation method in the present invention, the hydrogenation rate of not less than 90% can be easily attained and the rate can be increased to not less than 95%, further to not less than 99%. The hydrogenated ring-opening metathesis polymer thus obtained is not easily oxidized to obtain a variable hydrogenated ring-opening metathesis polymer.

In the present invention, (1) after hydrogenating the ring-opening metathesis polymer, a substituent containing an acid cleavable group may be further introduced into a functional group of the hydrogenated polymer, (2) after hydrogenating the ring-opening metathesis polymer, a functional group may be converted into carboxylic acid or alcohol by partial hydrolysis, or (3) after the convertion into carboxylic acid or alcohol, the carboxylic acid or alcohol may be further converted into a new substituent containing an acid cleavable group. That is, the carboxylic acid or alcohol formed by hydrolysis can be converted into an ester or ether with a new substituent containing an acid cleavable group.

The functional group of the hydrogenated ring-opening metathesis polymer to be hydrolyzed includes, for example, alkoxycarbonyl, alkoxycarbonyloxy, alkoxycarbonylalkyl, alkoxycarbonyloxyalkyl, alkylcarbonyloxy, alkylsulfonyloxy, arylsulfonyloxy, alkoxy, alkoxyalkyl and carboxylic anhydride. This hydrolysis may be any of acidic hydrolysis to be conducted in the presence of an acidic catalyst such as sulfuric acid, hydrochloric acid, nitric acid, toluenesulfonic acid, trifluoroacetic acid or acetic acid, alkaline hydrolysis to be conducted in the presence of an alkaline catalyst such as sodium hydroxide, potassium hydroxide or barium hydroxide, and neutral hydrolysis using sodium acetate, lithium iodide, etc. in place of the acidic or alkaline catalyst. In addition, carboxylic anhydride may be converted into carboxylic acid and an ester by hydrolyzing with an alcohol.

In the hydrolysis reaction in the present invention, an aqueous solvent or an organic solvent may be used. Particularly, the organic solvent used includes, for example, alcohols such as methanol and ethanol; ethers such as tetrahydrofuran, diethyl ether, dibutyl ether, dimethoxyethane and dioxane; aromatic hydrocarbons such as benzene, toluene, xylene, and ethylbenzene; aliphatic hydrocarbons such as pentane, hexane, heptane and cyclohexane; carboxylic acids such as acetic acid; nitro compounds such as nitromethane; pyridines such as pyridine and lutidine; and formamides such as dimethylformamide. These organic solvents may be used in combination with water and alcohols, or used alone. Furthermore, two or more kinds of them may also be used. The reaction temperature is usually at 0 to 300° C., and preferably within a range from room temperature to 250° C.

After the completion of the acidic or alkaline hydrolysis, the resultant may be neutralized with an alkali or acid. After the completion of the hydrolysis, a method of recovering a polymer from a solution or slurry of the hydrogenated ring-opening metathesis polymer is not specifically limited, and a known method can be used. In the case of the solution, the method includes, for example, method of discharging a reaction solution in a poor solvent under stirring to precipitate a hydrogenated polymer and recovering by filtration, centrifugation or decantation process, steam-stripping method of bubbling steam in a reaction solution to precipitate the polymer, and method of directly removing a solvent from a reaction solution by heating. In the case of the slurry, the method includes, for example, method of recovering as it is by filtration, centrifugation or decantation process.

As a method of esterifying or etherifying a carboxylic acid or alcohol, a conventional method can be applied. The method of esterifying the carboxylic acid includes, for example, esterification by the dehydrocondensation reaction with alcohols in the presence of a mineral acid, organic acid or Lewis acid, esterification by using an ortho-alkylating agent, esterification by addition of olefins in the presence of an acid, esterification by the condensation reaction with a halide using an organobasic compound, and alkoxyalkyl esterification by addition of alkyl vinyl ethers. The method further includes method of converting a carboxylic acid into an acid halide by using thionyl chloride and then esterifying the acid halide by contacting with alcohol, and method of esterifying a metal salt of the carboxylic acid. The method of esterifying an alcohol includes, for example, esterification by the dehydrocondensation reaction with a carboxylic acid in the presence of a mineral acid, organic acid or Lewis acid, esterification by using an acid anhydride, and esterification by the reaction with an acid halide.

The method of etherifying an alcohol includes, for example, etherification by condensation with a halide in the presence of a basic compound, methyl-etherification by using dimethylsulfuric acid in the presence of a basic compound, etherification by the dehydrocondensation reaction with alcohol in the presence of a mineral acid, organic acid or Lewis acid, etherification by using a diazo compound, etherification by addition of olefins in the presence of an acid catalyst, α-chloroetherification by addition to a carbonyl compound in the presence of hydrogen chloride, and alkoxyalkyl etherification by addition of alkyl vinyl ethers. The method further includes a method of forming a metal alkoxide from an alcohol, separating the metal alkoxide and etherifying it by contacting with a halide.

In the above esterifications or etherifications, esterification or etherification by addition of alkyl vinyl ethers is preferably used because the reaction conditions are comparatively mild and no by-product is formed and, furthermore, a catalyst used is easily removed. The alkyl vinyl ethers to be used include, for example, alkoxy-substituted, non-substituted and cyclic alkyl vinyl ethers, such as methyl vinyl ether, ethyl vinyl ether, n-propyl vinyl ether, isopropyl vinyl ether, n-butyl vinyl ether, sec-butyl vinyl ether, tert-butyl vinyl ether, iso-octyl vinyl ether, decyl vinyl ether, dodecyl vinyl ether, cyclohexyl vinyl ether, 2-ethylhexyl vinyl ether, tert-pentyl vinyl ether, octadecyl vinyl ether, cesyl vinyl ether, 2-methoxyethyl vinyl ether, vinyl-2-(2-ethoxyethoxy)ethyl ether, ethylene glycol butyl vinyl ether, tert-amyl vinyl ether, 2,3-dihydrofuran, 3,4-dihydro-2H-pyran and 1,4-dioxene. Among them, ethyl vinyl ether, n-propylvinyl ether, isopropyl vinyl ether, n-butyl vinyl ether, 2,3-dihydrofuran and 3,4-dihydro-2H-pyran are preferably used.

The amount of these alkyl vinyl ethers is usually not more than 10 mol. and preferably from 0.1 to 5 mol. per mol of the carboxylic acid or alcohol of the hydrogenated ring-opening metathesis polymer. The esterification or etherification reaction using alkyl vinyl ethers can also be conducted in the absence of a catalyst, but can be efficiently conducted by using an acid catalyst. The acid catalyst includes, for example, hydrogen halides such as hydrogen chloride gas; mineral acids such as sulfuric acid, phosphoric acid, hydrochloric acid and hydrobromic acid; solid acids such as heteropoly acid and Nafion$^R$; and organic acids such as p-toluenesulfonic acid, trifluoroacetic acid, propionic acid, malonic acid, oxalic acid, pyridine chlorosulfonate, pyridine trifluoroacetate, pyridine sulfate and pyridine p-toluenesulfonate. Among them, hydrogen chloride gas, hydrochloric acid, trifluoroacetic acid, pyridine trifluoroacetate, pyridine p-toluenesulfonate and pyridine sulfate are preferably used. These acid catalysts can be used alone or in combination thereof, simultaneously or successively. The amount of these acid catalysts is usually not more than 2 mol. preferably from 0.00001 to 0.2 mol, and more preferably from 0.001 to 0.05 mol, per mol of the carboxylic acid or alcohol of the hydrogenated ring-opening metathesis polymer.

In the present invention, the solvent used in the above methods is not specifically limited as far as the solvent does not inhibit the reaction. Specific examples thereof include water; aliphatic hydrocarbons such as pentane, hexane, heptane and cyclohexane; aromatic hydrocarbons such as benzene, toluene, ethylbenzene and cumene; halogen compounds such as dichloromethane, chloroform, chlorobenzene and dichlorobenzene; ethers such as diethyl ether, tetrahydrofuran, 1,4-dioxane, ethylene glycol dimethyl ether and ethylene glycol diethyl ether; ketones such as acetone, ethyl methyl ketone, 2-heptanone, cyclohexanone and acetophene; nitrites such as acetonitrile and propionitrile; and esters such as ethyl acetate. These solvents may be used alone, or two or more of them may be used in combination. By using these solvents, the reaction may be carried out in a homogeneous solution or heterogeneous suspension.

The embodiment of the reaction in the method of the present invention is not specifically limited, and may be any embodiment as far as it is a method of effectively carrying out esterification or etherification, and may be any embodiment wherein the reaction is conducted in the presence of an inert gas (e.g. nitrogen) or air under a reduce pressure, normal pressure or a fixed pressure in a batch-wise, semibatch-wise or continuous manner. The reaction temperature and time vary with the mode of the esterification or etherification, but the reaction temperature is usually from −50 to 200° C., and preferably from 0 to 150° C., while the reaction time is usually within 100 hours, and preferably from 5 minutes to 48 hours.

The method of recovering a polymer from a solution or slurry of a ring-opening metathesis polymer, wherein the carboxylic acid or alcohol moiety is converted into an ester or ether by using a new substituent containing an acid cleavable group, is not specifically limited, and a known method can be used. In the case of the solution, the method includes, for example, a method of discharging a reaction solution in a poor solvent under stirring to precipitate a hydrogenated polymer and recovering by filtration, centrifugation or decantation process, a steam-stripping method of bubbling steam in a reaction solution to precipitate a polymer, and a method of directly removing solvent from the reaction solution by heating. In the case of the slurry, the method includes, for example, a method of recovering as it is by filtration, centrifugation or decantation process.

In the present invention, the molar ratio of the structural unit (A) represented by the general formula (1) to the structural unit (B) represented by the general formula (2), that is (A)/(B) is from 1/99 to 99/1, while the molar ratio of the structural unit (B) represented by the general formula (2) to the structural unit (C) represented by the general formula (3), that is (B)/(C) is from 30/70 to 100/0. The structural unit (A) contains an acid cleavable group generated from a photosensitive agent on light exposure, and is required to make a resist pattern by developing with an aqueous alkaline solution after light exposure, while is required to develop the adhesion with a substrate to be treated, such as silicon substrate. When the molar ratio (A)/(B) is less than 1/99, the development tends to become insufficient. On the other hand, when it exceeds 99/1, the adhesion with the substrate to be treated tends to be not obtained. The structural unit (C) contains cyano or lactonyloxycarbonyl, and can improve the adhesion with the substrate to be treated, such as silicon substrate and improve the solubility in solvent. The fact that the molar ratio of the structural unit (B) represented by the general formula (2) to the structural unit (C) represented by the general formula (3), that is (B)/(C) is within a range from 30/70 to 100/0 is important to improve a wetting tension at the development by an aqueous alkaline solution after light exposure, thereby to solve a developing mask. The fact that the amount of these structural units is within this range is very important as a resist material, which is suited for preparing a resist composition and is used as a resist material coated on a substrate to be treated, such as silicon substrate, after dissolving in a polar solvent such as 2-heptanone, together with a photosensitive agent having high polarity. That is, the enhanced solubility in polar solvent or dissolution rate of the hydrogenated ring-opening metathesis polymer at the time of preparing the resist composition causes to form a uniformly smooth coating film.

Particularly, the hydrogenated ring-opening metathesis polymer, wherein at least one of $X^1$, $X^2$ and $X^3$ is composed of a structural unit (A) represented by the general formula (1) in which $X^1$ is selected from —O—, —S—, —NR$^5$— or —PR$^5$— (R$^5$ represents hydrogen or an alkyl group having 1 to 20 carbon atoms), a structural unit (B) represented by the general formula (2) in which $X^2$ is selected from —O—, —S—, —NR$^{10}$— or —PR$^{10}$— (R$^{10}$ represents hydrogen or an alkyl group having 1 to 20 carbon atoms) or a structural unit (C) represented by the general formula (3) in which $X^3$ is selected from —O—, —S—, —NR$^{15}$— or —PR$^{15}$— (R$^{15}$ represents hydrogen or an alkyl group having 1 to 20 carbon atoms), has the effective improvements of characteristics in the adhesion to a substrate to be treated, such as silicon substrate, a wetting tension at the development by an aqueous alkaline solution, and solubility in polar organic solvent such as ketones and alcohols used in the step of coating on a silicon wafer of a resist material. The affinity for water is also improved and the developing characteristic to a releasant (or developer) such as aqueous alkaline solution after light exposure is also improved.

As described above, a hydrogenated ring-opening metathesis polymer comprising at least a structural unit (A) represented by the general formula (1), a structural unit (B) represented by the general formula (2) and a structural unit (C) represented by the general formula (3), wherein a constituent molar ratio (A)/(B) is from 1/99 to 99/1 and a constituent molar ratio (B)/(C) is from 30/70 to 100/0 and, furthermore, a ratio of a weight-average molecular weight Mw to a number-average molecular weight Mn, that is Mw/Mn is from 1.0 to 2.0 in the present invention, is useful as a base polymer for photoresist. For example, it is used as a positive resist composition, together with a photoacid generator and a solvent. The photoacid generator refers to a substance which generates Brønsted acid or Lewis acid when exposed to active radiation from excimer lasers. Furthermore, it is possible to add dissolution inhibitors, surfactants, storage stabilizers, sensitizers and striation inhibitors in the resist composition. A resist film can be formed by coating this resist composition on the surface of a substrate such as silicon wafer using a conventional method such as spin coating, and then removing the solvent by drying. Light exposure for formation of a pattern is conducted by irradiating the resist film with radiation such as far ultraviolet rays, KrF excimer laser, ArF excimer laser or electron beams. The sensitivity is further enhanced by subjecting to a heat treatment (baking after light exposure). Then, the exposed portion is washed out with a developer such as aqueous alkaline solution to obtain a relief pattern. The relief pattern formed by using the hydrogenated ring-opening metathesis polymer of the present invention has extremely good resolution and contrast. It is also possible to etch the substrate by using the pattern formed described as a mask.

The following examples further illustrate the present invention in detail but are not to be construed to limit the scope thereof.

Values of physical properties of the polymer obtained in the examples were measured by the following procedure:

Average molecular weight: Measured by GPC the obtained cyclic olefinic ring-opening metathesis polymer, the hydrogenated polymer or the hydrolyzed hydrogenated polymer dissolved in tetrahydrofuran, the molecular weight was calibrated by polystyrene standard at room temperature at a flow rate of 1.0 ml/min, using 830-RI and UVIDEC-100-VI manufactured by JASCO Corporation as a detector and Shodex k-805, 804, 803 and 802.5 as columns.

Hydrogenation rate: After powder of the hydrogenated cyclic olefinic ring-opening metathesis polymer was dissolved in deuterated chloroform, the reduction degree of a peak attributable to a carbon-carbon double bond of a principal chain at $\delta$=4.5–6.0 ppm due to the hydrogenation was calculated by using 90 MHz or 400 MHz-$^1$H-NMR.

The proportion of carboxylic acid contained in the polymer was measured by neutralization titration using Bromothymol Blue as an indicator. Alternatively, the proportion of a cyano group of the structural unit (C) contained in the polymer was calculated by measuring the nitrogen content using a CHN analyzer PE2400II manufactured by Perkin Elmer Co. Alternatively, the infrared absorption spectrum was measured by using Shimadzu FTIR-8100M and the composition ratio of the structural unit (A) to the structural unit (B) or the structural unit (C) was calculated from a carbonyl stretching vibration in 1760–1700 cm$^{-1}$ of ester and a carbonyl stretching vibration in 1740–1780 cm$^{-1}$ of carboxylic acid or a stretching vibration in 3700–3200 cm$^{-1}$ of hydroxy and a stretching vibration in 2200–2300 cm$^{-1}$ of nitrile, and characteristic absorption of $^1$H-NMR spectrum.

UV absorption spectrum was measured by using Shimadzu UV-3100 after coating on a quartz glass plate in a film thickness of 1.0 μm using a spin coater at 3000 rpm.

The adhesion strength to a silicon wafer substrate was determined in the following procedure. That is, after coating on a substrate using a spin coater in the same manner as described above, the resulting polymer film was baked at 120° C. for 10 minutes. After a scratch mark was formed in a lattice pattern according to the test procedure of JIS D0202 and the film was peeled off using an adhesive cellophane tape, the peeled state was visually observed. Judgment was conducted in accordance with the following criteria:

A: peeling of less than 5%,
B: peeling of 5–20%,
C: peeling of 20–50%,
D: peeling of not less than 50%.

EXAMPLE 1

In a 500 ml autoclave equipped with a magnetic stirring device, 5-tert-butoxycarbonyl-7-oxabicyclo[2.2.1]hept-2-ene (3.77 g, 19.2 mmol) and 8-tert-butoxycarbonyltetracyclo[4.4.0.1$^{2,5}$.1$^{7,10}$]-3-dodecene (5.00 g, 19.2 mmol) as cyclic olefinic monomers were dissolved in tetrahydrofuran (300 ml) (hereinafter referred to as THF) and stirred under a nitrogen atmosphere. Then, W(N-2,6-Me$_2$C$_6$H$_3$)(CHCHCMe$_2$)(OBu$^t$)$_2$(PMe$_3$) (326 mg, 0.55 mmol) as a ring-opening metathesis polymerization catalyst was added and the mixture was reacted at room temperature for 1 hour. Thereafter, butylaldehyde (198 mg, 3.85 mmol) was added and stirred for 30 minutes to stop the reaction.

Trimethylenediamine (570 mg, 7.70 mmol) was added to this ring-opening metathesis polymer solution and, after stirring under a hydrogen partial pressure of 0.49 MPa at 80° C. for 1 hour, the resultant was added to methanol (2000 ml) to precipitate the polymer, which was filtered, washed with methanol, dried in a vacuum to obtain 8.60 g of a powder of the polymer.

In a 2000 ml autoclave, 8.60 g of this polymer was dissolved in THF (800 ml) and a previously prepared solution of dichlorotetrakis(triphenylphosphine)ruthenium (5.0 mg, 0.004 mmol) and triethylamine (2.1 mg, 0.020 mmol) in THF (80 ml) as a hydrogenation catalyst was added. After the hydrogenation was conducted under a hydrogen pressure of 8.1 MPa at 165° C. for 5 hours, the temperature was returned to room temperature and then a hydrogen gas was released. This hydrogenated polymer solution was added to methanol to precipitate a hydrogenated ring-opening metathesis polymer, which was separated by filtration and dried in a vacuum to obtain 8.65 g of the hydrogenated polymer as a white powder. The hydrogenation rate of the resulting hydrogenated ring-opening metathesis polymer calculated from $^1$H-NMR was 100% because a peak attributable to a proton of an olefin of a principal chain was not observed. The number-average molecular weight Mn measured by GPC was 16,200 and Mw/Mn was 1.04.

In a 1000 ml flask, 8.50 g of the obtained hydrogenated polymer was added to 753 ml of benzene and 1.3 ml of trifluoroacetic acid and stirred at 70° C. for 1 hour and, after distilling off the solvent, the residue was further dissolved in THF and added to methanol. Then, the precipitate was filtered and dried in a vacuum to obtain 8.2 g of a partially hydrolyzed hydrogenated polymer as a white powder. The composition ratio of the structural unit (A)/(B) of the resulting polymer was 90/10 and the number-average molecular weight Mn measured by GPC was 16,000 and, furthermore, Mw/Mn was 1.06.

Comparative Example 1

A ring-opening metathesis polymer hydrolyzed partially in the same manner as in Example 1 was obtained without conducting the hydrogenation of the ring-opening metathesis polymer synthesized in the same manner as in Example 1. The composition ratio of the structural unit (A)/(B) of the resulting polymer was 90/10 and the number-average molecular weight Mn measured by GPC was 14,800 and, furthermore, Mw/Mn was 1.05.

Comparative Example 2

In the same manner as in Example 1, the hydrogenation of the ring-opening metathesis polymer synthesized in the same manner as in Example 1 was conducted. Thereafter, partial hydrolysis of Example 1 was not conducted. As a result, a hydrogenated ring-opening metathesis polymer, wherein the hydrogenation rate is 100%, the composition ratio of the structural unit (A)/(B) is 100/0, the number-average molecular weight Mn measured by GPC is 15,700 and Mw/Mn is 1.04, was obtained.

Comparative Example 3

In the same manner as in Example 1, except for ousing 5-tert-butoxycarbonylcyclo[2.2.1]hept-2-ene (3.12 g, 19.2 mmol) in place of 5-tert-butoxycarbonyl-7-oxabicyclo [2.2.1]hept-2-ene (3.77 g, 19.2 mmol), the hydrogenation of the ring-opening metathesis polymer synthesized in the same manner as in Example 1 was conducted. Thereafter, partial hydrolysis was conducted in the same manner as in Example 1. As a result, a hydrogenated ring-opening metathesis polymer, wherein the hydrogenation rate is 100%, the composition ratio of the structural unit (A)/(B) is 90/10, the number-average molecular weight Mn measured by GPC is 16,100 and Mw/Mn is 1.05, was obtained.

EXAMPLE 2

In a 500 ml autoclave equipped with a magnetic stirring device, 5-tert-butoxycarbonyl-7-oxabicyclo[2.2.1]hept-2-ene(3.40 g, 17.3 mmol), 7-oxabicyclo[2.2.1]hept-5-ene-2,3-dicarboxylic anhydride (0.33 g, 1.96 mmol) and 8-tert-butoxycarbonyltetracyclo[4.4.0.1$^{2,5}$.1$^{7,10}$]-3-dodecene (5.00 g, 19.2 mmol) as cyclic olefinic monomers were dissolved in THF (300 ml) and stirred under a nitrogen atmosphere. Then, W(N-2,6-Me$_2$C$_6$H$_3$)(CHCHCMe$_2$)(OBu$^t$)$_2$(PMe3) (326 mg, 0.55 mmol) as a ring-opening metathesis polymerization catalyst was added and the mixture was reacted at room temperature for 1 hour. Thereafter, butylaldehyde (198 mg, 3.85 mmol) was added and stirred for 30 minutes to stop the reaction.

Trimethylenediamine (570 mg, 7.70 mmol) was added to this polymer solution and, after stirring under a hydrogen partial pressure of 0.49 MPa at 80° C. for 1 hour, the resultant was added to methanol (2000 ml) to precipitate the polymer, which was filtered, washed with methanol, dried in a vacuum to obtain 8.40 g of the polymer as a powder.

In a 2000 ml autoclave, 8.40 g of this polymer was dissolved in THF (800 ml) and a previously prepared solution of dichlorotetrakis(triphenylphosphine)ruthenium (5.0 mg, 0.004 mmol) and triethylamine (2.1 mg, 0.020 mmol) in THF (80 ml) as a hydrogenation catalyst was added. After the hydrogenation was conducted under a hydrogen pressure of 8.1 MPa at 165° C. for 5 hours, the temperature was returned to room temperature and then a hydrogen gas was released. This hydrogenated polymer solution was added to methanol to precipitate a hydrogenated ring-opening metathesis polymer, which was separated by filtration and dried in a vacuum to obtain a white powder of the hydrogenated polymer. The hydrogenation rate of the resulting hydrogenated ring-opening metathesis polymer calculated from $^1$H-NMR was 100% because a peak attributable to a proton of an olefin of a principal chain was not observed. The number-average molecular weight Mn measured by GPC was 15,000 and Mw/Mn was 1.10.

In a 1000 ml flask, 8.35 g of the obtained hydrogenated polymer was added to 753 ml of benzene and 1.3 ml of trifluoroacetic acid and stirred at 70° C. for 0.5 hours and, after distilling off the solvent, the residue was further dissolved in THF and added to methanol. Then, the precipitate was filtered and dried in a vacuum to obtain 7.9 g of a partially hydrolyzed hydrogenated polymer as a white powder. The composition ratio of the structural unit (A)/(B) of the resulting polymer was 85/15 and the number-average molecular weight Mn measured by GPC was 15,400 and, furthermore, Mw/Mn was 1.13.

EXAMPLE 3

In a 500 ml autoclave equipped with a magnetic stirring device, 5-tert-butoxycarbonyl-7-oxabicyclo[2.2.1]hept-2-ene (7.53 g, 38.4 mmol) as a cyclic olefinic monomer was dissolved in THF (300 ml) and stirred under a nitrogen atmosphere. Then, Mo(N-2,6-Pr$^i_2$C$_6$H$_3$)(CHCMe$_2$)(OBu$^t$)$_2$ (375 mg, 0.77 mmol) as a ring-opening metathesis polymerization catalyst was added and the mixture was reacted at room temperature for 1 hour. Thereafter, butylaldehyde (278 mg, 3.85 nmnol) was added and stirred for 30 minutes to stop the reaction.

Trimethylenediamine (570 mg, 7.70 mmol) was added to this ring-opening metathesis polymer solution and, after stirring under a hydrogen partial pressure of 0.49 MPa at 80° C. for 1 hour, the resultant was added to the mixture (2000 ml) of water and methanol to precipitate the polymer, which was filtered, washed with methanol, dried in a vacuum to obtain 7.40 g of the ring-opening metathesis polymer as a powder.

In a 2000 ml autoclave, 7.53 g of this ring-opening metathesis polymer was dissolved in THF (800 ml) and a previously prepared solution of dichlorotetrakis (triphenylphosphine)ruthenium (5.0 mg, 0.004 mmol) and triethylamine (2.1 mg, 0.020 mmol) in THF (80 ml) as a hydrogenation catalyst was added. After the hydrogenation was conducted under a hydrogen pressure of 8.1 MPa at 165° C. for 5 hours, the temperature was returned to room temperature and then a hydrogen gas was released. This hydrogenated polymer solution was added to methanol to precipitate a hydrogenated ring-opening metathesis polymer, which was separated by filtration and dried in a vacuum to obtain a white powder of the hydrogenated polymer. The hydrogenation rate of the resulting hydrogenated ring-opening metathesis polymer calculated from $^1$H-NMR was 100% because a peak attributable to a proton of an olefin of a principal chain was not observed. The number-average molecular Win weight Mn measured by GPC was 9,900 and Mw/Mn was 1.04.

In a 1000 ml flask, 7.31 g of the obtained hydrogenated polymer was added to 753 ml of benzene and 1.3 ml of trifluoroacetic acid and stirred at 70° C. for 3 hours and, after distilling off the solvent, the residue was further dissolved in THF and added to methanol. Then, the precipitate was filtered and dried in a vacuum to obtain 6.89 g of a partially hydrolyzed hydrogenated ring-opening metathesis polymer as a white powder. The composition ratio of the structural unit (A)/(B) of the resulting polymer was 69/31 and the number-average molecular weight Mn measured by GPC was 8,900 and, furthermore, Mw/Mn was 1.06.

EXAMPLE 4

In a 500 ml autoclave equipped with a magnetic stirring device, 5-tert-butoxycarbonyl-7-oxabicyclo[2.2.1]hept-2- ene (2.85 g, 14.5 mmol), 5-methoxycarbonyl-7-oxabicyclo[2.2.1]hept-5-ene (2.24 g, 14.5 mmol), 8-tert-butoxycarbonyltetracyclo[4.4.0.1$^{2,5}$.1$^{7,10}$]-3-dodecene (3.78 g, 14.5 mmol) and 8-methoxycarbonyltetracyclo[4.4.0.1$^{2,5}$.1$^{7,10}$]-3-dodecene (3.16 g, 14.5 mmol) as cyclic olefinic monomers were dissolved in THF (400 ml) and stirred under a nitrogen atmosphere. Furthermore, 1,5-hexadiene (1.0 g, 12 mmol) was added and, after heating to 80° C., W(N-2,6-Me$_2$C$_6$H$_3$)(CHCHC(Me)Ph)(OBu$^t$)$_2$(PMe$_3$) (52 mg, 0.08 mmol) was added and the mixture was reacted for 3 hours. Thereafter, butylaldehyde (40 mg, 0.7 mmol) was added and stirred for 30 minutes to stop the reaction.

Trimethylenediamine (90 mg, 1.22 mmol) was added to this ring-opening metathesis polymer solution and, after stirring under a hydrogen partial pressure of 0.49 MPa at 80° C. for 1 hour, the resultant was added to methanol (2000 ml) to precipitate the polymer, which was filtered, washed with methanol, dried in a vacuum to obtain 10.9 g of the polymer as a powder.

In a 2000 ml autoclave, 10.0 g of this polymer was dissolved in THF (800 ml) and a white powder of the hydrogenated polymer was obtained in the same manner as in Example 1. The hydrogenation rate of the resulting hydrogenated ring-opening metathesis polymer calculated from $^1$H-NMR was 100% because a peak attributable to a proton of an olefin of a principal chain was not observed. The number-average molecular weight Mn measured by GPC was 13,200 and Mw/Mn was 1.46.

In a 1000 ml flask, 9.0 g of the obtained hydrogenated polymer was added to 400 ml of an aqueous 5% solution of potassium hydroxide in methanol and stirred at 70° C. for 1 hour, and then the solution was neutralized by adding to 1000 ml of an aqueous 2% hydrochloric acid. The precipitate was filtered, washed with water and dried in a vacuum to obtain 8.2 g of a partially hydrolyzed hydrogenated ring-opening metathesis polymer as a white powder. The composition ratio (molar ratio) of the structural unit (A)/(B) of the resulting polymer was 54/46 and the number-average molecular weight Mn measured by GPC was 12,700 and, furthermore, Mw/Mn was 1.48.

EXAMPLE 5

In the same manner as in Example 4, except for replacing the four kinds of cyclic olefinic monomers with 5-tert-butoxycarbonyl-6-methoxycarbonyl-7-oxabicyclo[2.2.1]hept-2-ene (7.12 g, 28 mmol) and 8-tert-butoxycarbonyltetracyclo[4.4.0.1$^{2,5}$.1$^{7,10}$]-3-dodecene (7.29 g, 28 mmol) in Example 4, 13.1 g of a ring-opening metathesis polymer was obtained.

In a 2000 ml autoclave, 10.0 g of this polymer was dissolved in THF (800 ml) and a white powder of the hydrogenated polymer was obtained in the same manner as in Example 4. Its hydrogenation rate was 100%. The number-average molecular weight Mn measured by GPC was 16,800 and Mw/Mn was 1.42.

In the same manner as in Example 4, 10.0 g of the obtained hydrogenated polymer was hydrolyzed to obtain 9.12 g of a partially hydrolyzed hydrogenated ring-opening metathesis polymer as a white powder. The composition ratio (molar ratio) of the structural unit (A)/(B) of the resulting polymer was 58/42 and the number-average molecular weight Mn measured by GPC was 16,200 and, furthermore, Mw/Mn was 1.42.

EXAMPLE 6

In the same manner as in Example 5, except for replacing 5-tert-butoxycarbonyl-6-methoxycarbonyl-7-oxabicyclo[2.2.1]hept-2-ene and 8-tert-butoxycarbonyltetracyclo[4.4.0.1$^{2,5}$.1$^{7,10}$]-3-dodecene with 5,6-di-tert-butoxycarbonyl-7-oxabicyclo[2.2.1]hept-2-ene (5.46 g, 18.4 mmol) and 8-tert-butoxycarbonyl-9-methoxycarbonyltetracyclo[4.4.0.1$^{2,5}$.1$^{7,10}$]-3-dodecene (8.9 g, 28 mmol) as cyclic olefinic monomers in Example 5, 12.2 g of a ring-opening metathesis polymer was obtained.

In a 2000 ml autoclave, 10.0 g of this polymer was dissolved in THF (800 ml) and a white powder of the hydrogenated polymer was obtained in the same manner as in Example 5. Its hydrogenation rate was 100%. The number-average molecular weight Mn measured by GPC was 18,500 and Mw/Mn was 1.45.

In the same manner as in Example 5, 9.8 g of the obtained hydrogenated polymer was hydrolyzed to obtain a partially hydrolyzed hydrogenated ring-opening metathesis polymer as a white powder. The composition ratio (molar ratio) of the structural unit (A)/(B) of the resulting polymer was 52/48 and the number-average molecular weight Mn measured by GPC was 18,000 and, furthermore, Mw/Mn was 1.44.

EXAMPLE 7

In a 500 ml autoclave equipped with a magnetic stirring device, 5-(tetrahydropyran-2'-yl)oxycarbonyl-7-oxabicyclo[2.2.1]hept-2-ene (5.38 g, 24 mmol) and 8-(tetrahydropyran-2-yl)oxycarbonyltetracyclo-[4.4.0.1$^{2,5}$.1$^{7,10}$]-3-dodecene (6.92 g, 24 mmol) as cyclic olefinic monomers were dissolved in THF (400 ml) and stirred under a nitrogen atmosphere. Furthermore, 1,5-hexadiene (2.0 g, 24.0 mmol) was added and, after heating to 80° C., W(N-2,6-Me$_2$C$_6$H$_3$)(CHCHC(Me)Ph)(OBu$^t$)$_2$(PMe$_3$) (52 mg, 0.08 mmol) was added and the mixture was reacted for 3 hours. Thereafter, butylaldehyde (40 mg, 0.7 mmol) was added and stirred for 30 minutes to stop the reaction.

Trimethylenediamine (90 mg, 1.22 mmol) was added to this ring-opening metathesis polymer solution and, after stirring under a hydrogen partial pressure of 0.49 MPa at 80° C. for 1 hour, the resultant was added to methanol (2000 ml) to precipitate the polymer, which was filtered, washed with methanol, dried in a vacuum to obtain 10.9 g of the polymer as a powder.

In a 2000 ml autoclave, 10.0 g of this polymer was dissolved in THF (800 ml) and a previously prepared solution of chlorohydride carbonyltris(triphenylphosphine)ruthenium (3.8 mg, 0.004 mmol) and triethylamine (2.1 mg, 0.020 mmol) in THF (80 ml) as a hydrogenation catalyst was added. After the hydrogenation was conducted under a hydrogen pressure of 8.1 MPa at 155° C. for 7 hours, the temperature was returned to room temperature and then a hydrogen gas was released. This hydrogenated polymer solution was added to methanol to precipitate the hydrogenated polymer, which was separated by filtration and dried in a vacuum to obtain a white powder of the polymer. The hydrogenation rate of the resulting hydrogenated polymer calculated from $^1$H-NMR was 100% because a peak attributable to a proton of an olefin of a principal chain was not observed. The number-average molecular weight Mn measured by GPC was 12,900 and Mw/Mn was 1.54.

In a 1000 ml flask, 9.8 g of the obtained hydrogenated polymer was added to 20 ml of a 0.1N hydrogen chloride-containing methanol solution and 400 ml of 1,4-dioxane. After stirring at room temperature for 20 minutes, the mixture was filtered, washed with methanol and dried in a vacuum to obtain 9.3 g of a partially hydrolyzed hydrogenated polymer as a white powder. The composition ratio (molar ratio) of the structural unit (A)/(B) of the resulting polymer was 70/30 and the number-average molecular weight Mn measured by GPC was 11,600 and, furthermore, Mw/Mn was 1.54.

Comparative Example 4

In the same manner as in Example 7, the hydrogenation of the ring-opening metathesis polymer synthesized in the same manner as in Example 7 was conducted. Thereafter, partial hydrolysis of Example 7 was not conducted. As a result, a hydrogenated ring-opening metathesis polymer, wherein the hydrogenation rate is 100%, the composition ratio of the structural unit (A)/(B) is 100/0, the number-average molecular weight Mn measured by GPC is 13,500 and Mw/Mn is 1.49, was obtained.

Comparative Example 5

In the same manner as in Example 7, except for using 5-(tetrahydropyran-2'-yl)oxycarbonylbicyclo[2.2.1]hept-2-ene (5.33 g, 24 mmol) in place of 5-(tetrahydropyran-2'-yl) oxycarbonyl-7-oxabicyclo[2.2.1]hept-2-ene (5.38 g, 24 mmol), the hydrogenation of the ring-opening metathesis polymer synthesized in the same manner as in Example 7 was conducted. Thereafter, partial hydrolysis was conducted in the same manner as in Example 7. As a result, a hydrogenated ring-opening metathesis polymer, wherein the hydrogenation rate is 100%, the composition ratio of the structural unit (A)/(B) is 70/30, the number-average molecular weight,Mn measured by GPC is 12,100 and Mw/Mn is 1.50, was obtained.

UV transmittance and adhesion strength of the polymers obtained in the above Examples and Comparative Examples are shown in Table 1.

TABLE 1

Evaluation of UV transmittance and adhesion strength

|  | UV transmittance (%) at 193 nm | Adhesion strength |
| --- | --- | --- |
| Example 1 | 90 | B |
| Comparative Example 1 | 4 | C |
| Comparative Example 2 | 93 | D |
| Comparative Example 3 | 90 | D |
| Example 2 | 90 | B |
| Example 3 | 88 | A |
| Example 4 | 85 | A |
| Example 5 | 82 | A |
| Example 6 | 78 | A |
| Example 7 | 86 | A |
| Comparative Example 4 | 89 | D |
| Comparative Example 5 | 87 | C |

EXAMPLE 8

In a 500 ml autoclave equipped with a magnetic stirring device, 5-tert-butoxycarbonyl-7-oxabicyclo[2.2.1]hept-2-ene (9.64 g, 49.2 mmol) and 5-cyanobicyclo[2.2.1]hept-2-ene (3.90 g, 32.8 mmol) as cyclic olefinic monomers were dissolved in THF (300 ml) and stirred under a nitrogen atmosphere. Then, W(N-2,6-Me$_2$C$_6$H$_3$)(CHCHCMe$_2$) (OBu$^t$)$_2$(PMe$_3$) (0.695 g, 1.17 mmol) as a ring-opening metathesis polymerization catalyst was added and the mixture was reacted at room temperature for 1 hour. Thereafter, butylaldehyde (420 mg, 5.85 mmol) was added and stirred for 30 minutes to stop the reaction.

Trimethylenediamine (1.30 g, 17.6 mmol) was added to this ring-opening metathesis polymer solution and, after stirring under a hydrogen partial pressure of 0.49 MPa at 80° C. for 1 hour, the resultant was added to methanol (2000 ml) to precipitate the polymer, which was filtered, washed with methanol, dried in a vacuum to obtain 13.35 g of the polymer as a powder.

In a 2000 ml autoclave, 10.0 g of this ring-opening metathesis polymer was dissolved in THF (800 ml) and a previously prepared solution of dichlorotetrakis (triphenylphosphine)ruthenium (5.0 mg, 0.004 mmol) and triethylamine (2.1 mg, 0.020 mmol) in THF (80 ml) as a hydrogenation catalyst was added. After the hydrogenation was conducted under a hydrogen pressure of 8.1 MPa at 165° C. for 5 hours, the temperature was returned to room temperature and then a hydrogen gas was released. This hydrogenated polymer solution was added to methanol to precipitate a hydrogenated ring-opening metathesis polymer, which was separated by filtration and dried in a vacuum to obtain 9.96 g of the hydrogenated polymer as a white powder. The hydrogenation rate of the resulting hydrogenated polymer calculated from $^1$H-NMR was 100% because a peak attributable to a proton of an olefin of a principal chain was not observed. The number-average molecular weight Mn measured by GPC was 11,700 and Mw/Mn was 1.00.

In a 1000 ml flask, 8.0 g of the obtained hydrogenated polymer was added to 800 ml of benzene and 6.85 ml of trifluoroacetic acid and stirred at 70° C. for 3 hours and, after adding to methanol, the precipitate was filtered and dried. Furthermore, the resultant was dissolved in THF and the solution was added to methanol. Then, the precipitate was filtered and dried in a vacuum to obtain 7.7 g of a partially hydrolyzed hydrogenated ring-opening metathesis polymer as a white powder. The composition ratio (molar ratio) of the structural unit (A)/(B)/(C) of the resulting polymer was 39/21/40 and the number-average molecular weight Mn measured by GPC was 10,900 and, furthermore, Mw/Mn was 1.02.

EXAMPLE 9

In a 500 ml autoclave equipped with a magnetic stirring device, 5-tert-butoxycarbonyl-7-oxabicyclo[2.2.1]hept-2-ene (5.42 g, 27.6 mmol), 5-cyanobicyclo[2.2.1]hept-2-ene (0.36 g, 3.0 mmol) and 8-tert-butoxycarbonyltetracyclo [4.4.0. 1$^{2,5}$.1$^{7,10}$]-3-dodecene (7.19 g, 27.6 mmol) as cyclic olefinic monomers were dissolved in THF (400 ml) and stirred under a nitrogen atmosphere. Then, W(N-2,6-Me$_2$C$_6$H$_3$)(CHCHCMe$_2$)(OBu$^t$)$_2$(PMe$_3$) (493 mg, 0.83 mmol) as a ring-opening metathesis polymerization catalyst was added and the mixture was reacted at room temperature for 1 hour. Thereafter, butylaldehyde (293 mg, 5.7 mmol) was added and stirred for 30 minutes to terminate the reaction.

Trimethylenediamine (570 mg, 7.70 mmol) was added to this ring-opening metathesis polymer solution and, after stirring under a hydrogen partial pressure of 0.49 MPa at 80° C. for 1 hour, the resultant was added to methanol (2000 ml) to precipitate the polymer, which was filtered, washed with methanol, dried in a vacuum to obtain 12.7 g of the polymer as a powder.

In a 2000 ml autoclave, 10.0 g of this ring-opening metathesis polymer powder was dissolved in THF (800 ml) and a white powder of the hydrogenated polymer was obtained in the same manner as in Example 1. Its hydrogenation rate was 100%. The number-average molecular weight Mn measured by GPC was 16,200 and Mw/Mn was 1.08.

In a 1000 ml flask, 9.80 g of the obtained hydrogenated polymer was added to 753 ml of benzene and 1.3 ml of trifluoroacetic acid and stirred at 70° C. for 1 hour and, after distilling off the solvent, the residue was further dissolved in THF and added to methanol. Then, the precipitate was filtered and dried in a vacuum to obtain 9.15 g of a partially hydrolyzed hydrogenated polymer as a white powder. The composition ratio (molar ratio) of the structural unit (A)/(B)/(C) of the resulting polymer was 85/10/5 and the number-average molecular weight Mn measured by GPC was 15,400 and, furthermore, Mw/Mn was 1.09.

Comparative Example 6

In the same manner as in Example 9, except that the amount of 0.36 g (3.0 mmol) of 5-cyanobicyclo[2.2.1]hept-2-ene was replaced with 1.56 g (13.0 mmol) and the amount of 7.19 g (27.6 mmol) of 8-tert-butoxycarbonyltetracyclo[4.4.0.1$^{2,5}$.1$^{7,10}$]-3-dodecene was replaced with 4.69 g (17.6 mmol), the hydrogenation of the ring-opening metathesis polymer synthesized in the same manner as in Example 9 was conducted. Thereafter, partial hydrolysis of Example 9 was not conducted. As a result, a hydrogenated ring-opening metathesis polymer, wherein the hydrogenation rate is 100%, the composition ratio of the structural unit (A)/(B)/(C) is 78/0/22, the number-average molecular weight Mn measured by GPC is 14,100 and Mw/Mn is 1.09, was obtained.

EXAMPLE 10

In the same manner as in Example 9, except for replacing 5-cyanobicyclo[2.2.1]hept-2-ene (0.36 g, 3.0 mmol) as a cyclic olefinic monomer with 5-(γ-butyrolactonyl-2'-oxycarbonyl)bicyclo[2.2.1]hept-2-ene (1.79 g, 8.0 mmol) in Example 9, 13.8 g of a ring-opening metathesis polymer was obtained.

In a 2000 ml autoclave, 10.0 g of this polymer was dissolved in THF (800 ml) and a white powder of a hydrogenated polymer was obtained in the same manner as in Example 9. The hydrogenation rate of the resulting hydrogenated polymer calculated from $^1$H-NMR was 100% because a peak attributable to a proton of an olefin of a principal chain was not observed. The number-average molecular weight Mn measured by GPC was 16,600 and Mw/Mn was 1.07.

In the same manner as in Example 9, 9.7 g of the hydrogenated ring-opening metathesis polymer was conducted to hydrolysis to obtain 8.8 g of a partially hydrolyzed hydrogenated ring-opening metathesis polymer as a white powder. The composition ratio (molar ratio) of the structural unit (A)/(B)/(C) of the resulting polymer was 75/12/13 and the number-average molecular weight Mn measured by GPC was 15,600 and, furthermore, Mw/Mn was 1.08.

Comparative Example 7

In the same manner as in Example 10, except that the amount of 1.79 g (8.0 mmol) of 5-(γ-butyrolactonyl-2'-oxycarbonyl)bicyclo[2.2.1]hept-2-ene was replaced with 3.96 g (18.0 mmol) and the amount of 7.19 g (27.6 mmol) of 8-tert-butoxycarbonyltetracyclo[4.4.0.1$^{2,5}$.1$^{7,10}$]-3-dodecene with 4.69 g (17.6 mmol), the hydrogenation of the polymer synthesized in the same manner as in Example 10 was conducted. Thereafter, the obtained hydrogenated polymer was added to 1.3 ml trifluoroacetic acid in benzene and stirred at 70° C. for 0.5 hours and, after distilling off the solvent, the residue was further dissolved in THF and added to methanol. Then, the precipitate was filtered and dried in a vacuum to obtain a partially hydrolyzed hydrogenated ring-opening metathesis polymer having a hydrogenation rate of 100% as a white powder. The composition ratio of the structural unit (A)/(B)/(C) of the resulting polymer was 67/5/28 and the number-average molecular weight Mn measured by GPC was 14,100 and, furthermore, Mw/Mn was 1.09.

EXAMPLE 11

In the same manner as in Example 10, except for replacing 5-(g-butyrolactonyl-2'-oxycarbonyl)bicyclo[2.2.1]hept-2-ene as a cyclic olefinic monomer with valerolactonyl-2'-oxycarbonyl)-7-oxabicyclo[2.2.1]hept-2-ene (1.90 g, 8.0 mmol) in Example 10, 13.7 g of a ring-opening metathesis polymer was obtained.

In a 2000 ml autoclave, 10.0 g of this ring-opening metathesis polymer was dissolved in THF (800 ml) and a white powder of the hydrogenated polymer was obtained in the same manner as in Example 10. Its hydrogenation rate was 100%. The number-average molecular weight Mn measured by GPC was 17,000 and Mw/Mn was 1.08.

In the same manner as in Example 10, 9.0 g of a partially hydrolyzed hydrogenated ring-opening metathesis polymer as a white powder was obtained from 9.80 g of the resulting hydrogenated ring-opening metathesis polymer. The composition ratio (molar ratio) of the structural unit (A)/(B)/(C) of the resulting polymer was 73/15/12 and the number-average molecular weight Mn measured by GPC was 16,300 and, furthermore, Mw/Mn was 1.08.

EXAMPLE 12

In a 500 ml autoclave equipped with a magnetic stirring device, 5-methoxycarbonyl-7-oxabicyclo[2.2.1]hept-2-ene (2.78 g, 22.8 mmol), 5-cyanobicyclo[2.2.1]hept-2-ene (0.67 g, 3.0 mmol), 7-oxabicyclo[2.2.1]hept-5-ene-2,3-dicarboxylic anhydride (0.80 g, 4.8 mmol) and 8-tert-butoxycarbonyltetracyclo[4.4.0.1$^{2,5}$.1$^{7,10}$]-3-dodecene (7.19 g, 27.6 mmol) as cyclic olefinic monomers were dissolved in THF (400 ml) and stirred under a nitrogen atmosphere. Then, W(N-2,6-Me$_2$C$_6$H$_3$)(CHCHC(Me)Ph)(OBu$^t$)$_2$(PMe$_3$) (545 mg, 0.83 mmol) as a ring-opening metathesis polymerization catalyst was added and the mixture was reacted at room temperature for 1 hour. Thereafter, butylaldehyde (293 mg, 5.7 mmol) was added and stirred for 30 minutes to stop the reaction.

Trimethylenediamine (570 mg, 7.70 mmol) was added to this ring-opening metathesis polymer solution and, after stirring under a hydrogen partial pressure of 0.49 MPa at 80° C. for 1 hour, the resultant was added to methanol (2000 ml) to precipitate the polymer, which was filtered, washed with methanol, dried in a vacuum to obtain 10.95 g of the polymer as a powder.

In a 2000 ml autoclave, 10.0 g of this ring-opening metathesis polymer powder was dissolved in THF (800 ml) and a white powder of the hydrogenated polymer was obtained in the same manner as in Example 1. Its hydrogenation rate was 100%. The number-average molecular weight Mn measured by GPC was 14,500 and Mw/Mn was 1.12.

In the same manner as in Example 1, 9.3 g of a partially hydrolyzed hydrogenated ring-opening metathesis polymer as a white powder was obtained from 9.7 g of the resulting hydrogenated ring-opening metathesis polymer. The composition ratio (molar ratio) of the structural unit (A)/(B)/(C) of the resulting polymer was 88/7/5 and the number-average molecular weight Mn measured by GPC was 13,000 and, furthermore, Mw/Mn was 1.13.

EXAMPLE 13

In a 500 ml autoclave equipped with a magnetic stirring device, 5-tert-butoxycarbonyl-7-oxabicyclo[2.2.1]hept-2-ene (5.49 g, 29 mmol) and 8-tert-butoxycarbonyltetracyclo [4.4.0.1$^{2,5}$,1$^{7,10}$]-3-dodecene (7.55 g, 29 mmol) as cyclic olefinic monomers were dissolved in THF (400 ml) and stirred under a nitrogen atmosphere. Furthermore, 1,5-hexadiene (2.0 g, 24 mmol) was added and, after heating to 80° C., W(N-2,6-Me$_2$C$_6$H$_3$)(CHCHC(Me)Ph)(OBu$^t$)$_2$ (PMe$_3$) (52 mg, 0.08 mmol) was added and the mixture was reacted for 3 hours. Thereafter, butylaldehyde (40 mg, 0.7 mmol) was added and stirred for 30 minutes to terminate the reaction.

Trimethylenediamine (570 mg, 7.7 mmol) was added to this polymer solution and, after stirring under a hydrogen partial pressure of 0.49 MPa at 80° C. for 1 hour, the resultant was added to methanol (2000 ml) to precipitate the polymer, which was filtered, washed with methanol, dried in a vacuum to obtain 11.7 g of the polymer as a powder.

In a 2000 ml autoclave, 10.0 g of this ring-opening metathesis polymer was dissolved in THF (800 ml) and a previously prepared solution of dichlorotetrakis (triphenylphosphine)ruthenium (5.0 mg, 0.004 mmol) and triethylamine (2.1 mg, 0.020 mmol) in THF (80 ml) as a hydrogenation catalyst was added. After the hydrogenation was conducted under a hydrogen pressure of 8.1 MPa at 165° C. for 5 hours, the temperature was returned to room temperature and then a hydrogen gas was released. This hydrogenated polymer solution was added to methanol to precipitate a hydrogenated ring-opening metathesis polymer, which was separated by filtration and dried in a vacuum to obtain 10.1 g of the hydrogenated polymer as a white powder. Its hydrogenation rate was 100%. The number-average molecular weight Mn measured by GPC was 13,700 and Mw/Mn was 1.42.

In a 1000 ml flask, 9.8 g of the obtained hydrogenated polymer was added to 700 ml of toluene and 15 ml of trifluoroacetic acid and stirred at 70° C. for 1 hour and, after distilling off the solvent, the residue was further dissolved in THF and added to methanol. Then, the precipitate was filtered and dried in a vacuum to obtain 7.32 g of a partially hydrolyzed hydrogenated ring-opening metathesis polymer as a yellowish white powder. The composition ratio of the structural unit (A)/(B) of the resulting polymer was 13/87. The resulting polymer was dissolved in 25 ml of THF and 3.28 g of 3,4-dihydro-2H-pyran and.0.1 g of pyridine p-toluenesulfonate were added and, after stirring at room temperature for 20 hours, the mixture was added to methanol (2000 ml). Then, the precipitate was filtered, washed with methanol and dried in a vacuum to obtain 8.39 g of the partially hydrolyzed hydrogenated ring-opening metathesis polymer as a white powder. The composition ratio (molar ratio) of the structural unit (A)/(B) of the resulting polymer was 55/45 and the number-average molecular weight Mn measured by GPC was 12,900 and, furthermore, Mw/Mn was 1.50.

EXAMPLE 14

In the same manner as in Example 13, except for replacing 5-tert-butoxycarbonyl-7-oxabicyclo[2.2.1]hept-2-ene and 8-tert-butoxycarbonyltetracyclo[4.4.0.1$^{2,5}$.1$^{7,10}$]-3-dodecene with 5-methoxycarbonyl-7-oxabicyclo[2.2.1] hept-2-ene (4.41 g, 29 mmol) and 8-tert-butoxycarbonyl-9-tetracyclo-[4.4.0.1$^{2,5}$.1$^{7,10}$]-3-dodecene (9.23 g, 29 mmol) in Example 13, 12.54 g of a ring-opening metathesis polymer powder was obtained.

In a 2000 ml autoclave, 10.0 g of this polymer was dissolved in THF (800 ml) and 9.95 g of a white powder of a hydrogenated polymer was obtained in the same manner as in Example 13. The hydrogenation rate of the resulting hydrogenated ring-opening metathesis polymer calculated from $^1$H-NMR was 100% because a peak attributable to a proton of an olefin of a principal chain was not observed. The number-average molecular weight Mn measured by GPC was 14,600 and Mw/Mn was 1.53.

In a 1000 ml flask, 9.7 g of the obtained hydrogenated polymer was added to 500 ml of an aqueous 5% solution of potassium hydroxide in methanol and stirred at 70° C. for 1 hour, and then the solution was neutralized by adding in 1000 ml of an aqueous 3% hydrochloric acid. The precipitate was filtered, washed with water and dried in a vacuum to obtain a partially hydrolyzed hydrogenated ring-opening metathesis polymer as a white powder. The composition ratio (molar ratio) of the structural unit (A)/(B) of the resulting polymer was 55/45. The obtained resulmer was dissolved in 25 ml of THF and 3.28 g of 3,4-dihydro-2H-pyran and 0.1 g of pyridine p-toluenesulfonate were added and, after stirring at room temperature for 20 hours, the mixture was added to methanol (2000 ml). Then, the precipitate was filtered, washed with methanol and dried in a vacuum to obtain a white powder of the partially hydrolyzed hydrogenated ring-opening metathesis polymer. The composition ratio (molar ratio) of the structural unit (A)/(B) of the resulting polymer was 68/32 and the number-average molecular weight Mn measured by GPC was 14,900 and, furthermore, Mw/Mn was 1.53.

TABLE 2

Evaluation of UV transmittance and adhesion strength

| | UV transmittance (%) at 193 nm | Adhesion strength |
|---|---|---|
| Example 8 | 83 | A |
| Example 9 | 85 | B |
| Comparative Example 6 | 90 | D |
| Example 10 | 80 | A |
| Comparative Example 7 | 75 | C |
| Example 11 | 79 | A |
| Example 12 | 90 | B |
| Example 13 | 84 | A |
| Example 14 | 80 | A |

Reference Example 1

A positive photoresist solution was prepared by dissolving 10 g of the hydrogenated ring-opening metathesis polymer obtained in Example 1 and 0.2 g of bis(p-tert-butylphenyl)iodoniumtrifluoromethane sulfonate in 70 g of propylene glycol monomethyl ether acetate and filtering the mixture with a 0.1 μm microfilter.

Then, this photoresist solution was coated on a silicon wafer by using a spin coater and dried on a hot plate at 120° C. for 90 seconds to form a positive photoresist film having a film thickness of 0.5 μm. The photoresist film was selectively irradiated with ArF excimer laser (193 nm) using an ArF stepper (manufactured by Nikon Co.), heat-treated at 110° C. for 90 seconds, developed with an aqueous 2.38 wt % tetramethylammonium hydroxide solution for 60 seconds, washed with distilled water for 30 seconds and then dried to obtain a resist pattern profile.

The exposure time wherein 0.25 μm of line and space are formed by such an operation with the ratio of 1:1 was measured as a sensitivity in a unit of mJ/cm² (energy quantity), which was 15 mJ/cm².

Furthermore, a sectional shape of the resist pattern (0.25 μm) thus formed was observed by SEM (Scanning Electron Microscopy) micrograph. As a result, it was a rectangular resist pattern perpendicular to the substrate. By such an operation, a resist pattern was resolved up to 0.20 μm and collapse of pattern did not occur.

Then, using a mixed gas of oxygen and tetrafluoromethane as an etching gas, a dry etching treatment was conducted by an etching system OAPM-406 [manufactured by Tokyo Ohka Kogyo Co.] and the dry etching property was evaluated by a film loss per unit time. As a result, it was 0.90 as compared with 1.0 in the case of polyhydroxystyrene.

What is claimed is:

1. A hydrogenated ring-opening metathesis polymer comprising at least a structural unit (A) represented by the following general formula (1):

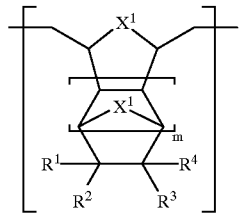

(1)

wherein at least one of $R^1$ to $R^4$ is a substituent containing an acid cleavable group, and others are selected from hydrogen, an alkyl group having 1 to 20 carbon atoms, a halogen, a halogenated alkyl group having 1 to 20 carbon atoms, an alkoxy group having 1 to 20 carbon atoms, an alkoxyalkyl group having 2 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, an arylsulfonyloxy group having 6 to 20 carbon atoms, a carboxy group, a hydroxy group, a carboxyalkyl group having 2 to 20 carbon atoms, or a hydroxyaklyl group having 1 to 20 carbon atoms; $X^1$ is selected from —O—, —S—, —NR⁵— or —PR⁵— ($R^5$ represents hydrogen or an alkyl group having 1 to 20 carbon atoms) and may be the same or different; and m represents 0 or an integer of 1 to 3; a structural unit (B) represented by the following general formula (2):

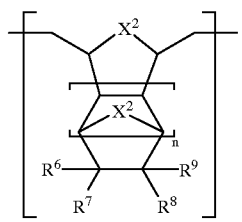

(2)

wherein at least one of $R^6$ to $R^9$ is a substituent containing carboxy or hydroxy, and others are selected from hydrogen, an alkoxy group having 1 to 20 carbon atoms, an alkoxyalkyl group having 2 to 20 carbon atoms, an alkyl group having 1 to 20 carbon atoms, a halogen, a halogenated alkyl group having 1 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, or an arylsulfonyloxy group having 6 to 20 carbon atoms; $X^2$ is selected from —O—, —S—, —NR¹⁰— or —PR¹⁰— ($R^{10}$ represents hydrogen or an alkyl group having 1 to 20 carbon atoms) and may be the same or different; and n represents 0 or an integer of 1 to 3; and a structural unit (C) represented by the following general formula (3):

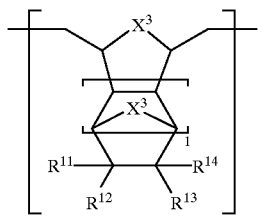

(3)

wherein at least one of $R^{11}$ to $R^{14}$ is a substituent containing cyano or lactonyloxycarbonyl, and others are selected from hydrogen, a carboxy group, a hydroxy group, a carboxyalkyl group having 2 to 20 carbon atoms, a hydroxyalkyl group having 1 to 20 carbon atoms, an alkoxycarbonyl group having 2 to 20 carbon atoms, an alkoxycarbonylalkyl group having 3 to 20 carbon atoms, an alkoxy group having 1 to 20 carbon atoms, an alkoxyalkyl group having 2 to 20 carbon atoms, an alkyl group having 1 to 20 carbon atoms, a halogen, or a halogenated alkyl group having 1 to 20 carbon atoms; $X^3$ is selected from —O—, —S—, —NR¹⁵— or —PR¹⁵— ($R^{15}$ represents hydrogen or an alkyl group having 1 to 20 carbon atoms) and may be the same or different; and l represents 0 or an integer of 1 to 3, wherein a constituent molar ratio of the structural unit (A)/(B) is from 1/99 to 99/1 and a constituent molar ratio of the structural unit (B)/(C) is from 30/70 to 100/0 and, furthermore, a ratio of a weight-average molecular weight Mw to a number-average molecular weight Mn, that is Mw/Mn is from 1.0 to 2.0.

2. The hydrogenated ring-opening metathesis polymer according to claim 1, wherein the constituent molar ratio of the structural unit (B) represented by the general formula (2) to the structural unit (C) represented by the general formula (3), that is (B)/(C) is from 100/0.

3. The hydrogenated ring-opening metathesis polymer according to claim 1, wherein the structural unit (A) represented by the general formula (1) is composed of two or more kinds and/or the structural unit (B) represented by the general formula (2) is composed of two or more kinds and/or the structural unit (C) represented by the general formula (3) is composed of two or more kinds.

4. The hydrogenated ring-opening metathesis polymer according to claim 1, wherein the substituent containing an acid cleavable group selected as at least one of $R^1$ to $R^4$ of the general formula (1) is tert-butoxycarbonyl or tetrahydropyran-2-yloxycarbonyl.

5. The hydrogenated ring-opening metathesis polymer according to claim 1, wherein the substituent containing lactonyloxycarbonyl selected as at least one of $R^{11}$ to $R^{14}$ of the general formula (3) is γ-butyrolactonyl-2-oxycarbonyl or δ-valerolactonyl-2-oxycarbonyl.

6. The hydrogenated ring-opening metathesis polymer according to claim 1, wherein the number-average molecular weight as polystyrene standard measured by GPC is from 500 to 100,000.

7. A polymer for photoresist, comprising the hydrogenated ring-opening metathesis polymer of claim 1.

8. A polymer for photoresist, comprising the hydrogenated ring-opening metathesis polymer of claim 2.

9. A polymer for photoresist, comprising the hydrogenated ring-opening metathesis polymer of claim 3.

10. A polymer for photoresist, comprising the hydrogenated ring-opening metathesis polymer of claim 5.

11. A polymer for photoresist, comprising the hydrogenated ring-opening metathesis polymer of claim 6.

12. A polymer for photoresist, comprising the hydrogenated ring-opening metathesis polymer of claim 7.

13. A method of producing the hydrogenated ring-opening metathesis polymer of claim 1, which comprises polymerizing at least one cyclic olefinic monomer represented by the general formula (4), or at least two cyclic olefinic monomers represented by the general formulas (4) and (5), or at least three cyclic olefinic monomers represented by the general formulas (4), (5) and (6) using a living ring-opening metathesis catalyst, and hydrogenating the polymer in the presence of a hydrogenation catalyst:

General formula (4) being:

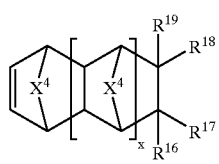

(4)

wherein at least one of $R^{16}$ to $R^{19}$ is a substituent containing an acid cleavable group, and others are selected from hydrogen, an alkyl group having 1 to 20 carbon atoms, a halogen, a halogenated alkyl group having 1 to 20 carbon atoms, an alkoxy group having 1 to 20 carbon atoms, an alkoxyalkyl group having 2 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, or an arylsulfonyloxy group having 6 to 20 carbon atoms; $X^4$ is selected from —O—, —S—, —NR$^{20}$— or —PR$^{20}$— (R$^{20}$ represents hydrogen or an alkyl group having 1 to 20 carbon atoms) and may be the same or different; and x represents 0 or an integer of 1 to 3;

General formula (5) being:

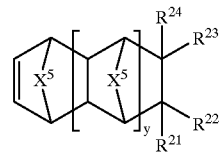

(5)

wherein at least one of $R^{21}$ to $R^{24}$ is a carboxy group, a hydroxy group, a carboxyalkyl group having 2 to 20 carbon atoms, a hydroxyalkyl group having 1 to 20 carbon atoms, an alkoxy group having 1 to 20 carbon atoms, an alkoxyalkyl group having 2 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, an arylsulfonyloxy group having 6 to 20 carbon atoms, or a carboxylic anhydride formed from $R^{21}$ and $R^{23}$ of $R^{21}$ to $R^{24}$, and others are selected from hydrogen, an alkyl group having 1 to 20 carbon atoms, a halogen or a halogenated alkyl group having 1 to 20 carbon atoms; $X^5$ is selected from —O—, —S—, —NR$^{25}$— or —PR$^{25}$— (R$^{25}$ represents hydrogen or an alkyl group having 1 to 20 carbon atoms) and may be the same or different; and y represents 0 or an integer of 1 to 3; and General formula (6) being:

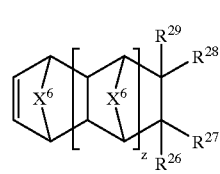

(6)

wherein at least one of $R^{26}$ to $R^{29}$ is a substituent containing cyano or lactonyloxycarbonyl, and others are selected from hydrogen, an alkoxycarbonyl group having 2 to 20 carbon atoms, an alkoxycarbonylalkyl group having 3 to 20 carbon atoms, an alkoxy group having 1 to 20 carbon atoms, an alkoxyalkyl group having 2 to 20 carbon atoms, an alkyl group having 1 to 20 carbon atoms, a halogen, or a halogenated alkyl group having 1 to 20 carbon atoms; $X^6$ is selected from —O—, —S—, —NR$^{30}$— or —PR$^{30}$— (R$^{30}$ represents hydrogen or an alkyl group having 1 to 20 carbon atoms) and may be the same or different; and z represents 0 or an integer of 1 to 3.

14. The method of producing a hydrogenated ring-opening metathesis polymer according to claim 13, wherein the substituent is further converted into a new substituent containing an acid cleavable group after hydrogenation.

15. The method of producing a hydrogenated ring-opening metathesis polymer according to claim 13, wherein hydrolysis is further conducted after hydrogenation.

16. The method of producing a hydrogenated ring-opening metathesis polymer according to claim 13, wherein hydrolysis is conducted after hydrogenation and the substituent is further converted into a new substituent containing an acid cleavable group after hydrogenation.

17. The method of producing a hydrogenated ring-opening metathesis polymer according to claim 13, wherein at least one cyclic olefinic monomer represented by the general formula (4), or at least two cyclic olefinic monomers represented by the general formulas (4) and (5), or at least three cyclic olefinic monomers represented by the general formulas (4), (5) and (6) is/are polymerized by using a living ring-opening metathesis catalyst in the presence of an olefin or diene.

18. The method of producing a hydrogenated ring-opening metathesis polymer according to claim 14, wherein at least one cyclic olefinic monomer represented by the general formula (4), or at least two cyclic olefinic monomers represented by the general formulas (4) and (5), or at least three cyclic olefinic monomers represented by the general formulas (4), (5) and (6) is/are polymerized by using a living ring-opening metathesis catalyst in the presence of an olefin or diene.

19. The method of producing a hydrogenated ring-opening metathesis polymer according to claim 15, wherein at least one cyclic olefinic monomer represented by the general formula (4), or at least two cyclic olefinic monomers represented by the general formulas (4) and (5), or at least three cyclic olefinic monomers represented by the general formulas (4), (5) and (6) is/are polymerized by using a living ring-opening metathesis catalyst in the presence of an olefin or diene.

20. The method of producing a hydrogenated ring-opening metathesis polymer according to claim 16, wherein at least one cyclic olefinic monomer represented by the general formula (4), or at least two cyclic olefinic monomers represented by the general formulas (4) and (5), or at least three cyclic olefinic monomers represented by the general formulas (4), (5) and (6) is/are polymerized by using a living ring-opening metathesis catalyst in the presence of an olefin or diene.

21. A hydrogenated ring-opening metathesis polymer comprising at least a structural unit (A) represented by the following general formula (1):

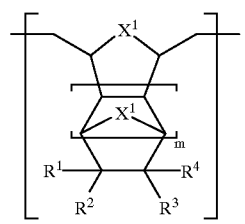

(1)

wherein at least one of $R^1$ to $R^4$ is a substituent containing an acid cleavable group, and others are selected from hydrogen, an alkyl group having 1 to 20 carbon atoms, a halogen, a halogenated alkyl group having 1 to 20 carbon atoms, an alkoxy group having 1 to 20 carbon atoms, an alkoxyalkyl group having 2 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, an arylsulfonyloxy group having 6 to 20 carbon atoms, a carboxy group, a hydroxy group, a carboxyalkyl group having 2 to 20 carbon atoms, or a hydroxyalkyl group having 1 to 20 carbon atoms; and m represents 0 or an integer of 1 to 3; a structural unit (3) represented by the following general formula (2):

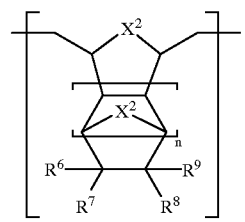

(2)

wherein at least one of $R^6$ to $R^9$ is a substituent containing carboxy or hydroxy, and others are selected from hydrogen, an alkoxy group having 1 to 20 carbon atoms, an alkoxyalkyl group having 2 to 20 carbon atoms, an alkyl group having 1 to 20 carbon atoms, a halogen, a halogenated alkyl group having 1 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, or an arylsulfonyloxy group having 6 to 20 carbon atoms; and n represents 0 or an integer of 1 to 3; and a structural unit (C) represented by the following general formula (3):

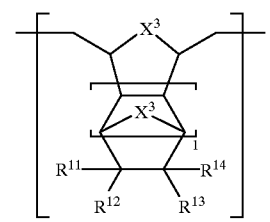

(3)

wherein at least one of $R^{11}$ to $R^{14}$ is a substituent containing cyano or lactonyloxycarbonyl, and others are selected from hydrogen, a carboxy group, a hydroxy group, a carboxyalkyl group having 2 to 20 carbon atoms, a hydroxyalkyl group having 1 to 20 carbon atoms, an alkoxycarbonyl group having 2 to 20 carbon atoms, an alkoxycarbonylalkyl group having 3 to 20 carbon atoms, an alkoxy group having 1 to 20 carbon atoms, an alkoxyalkyl group having 2 to 20 carbon atoms, an alkyl group having 1 to 20 carbon atoms, a halogen, or a halogenated alkyl group having 1 to 20 carbon atoms; and l represents 0 or an integer of 1 to 3, wherein a constituent molar ratio of the structural unit (A)/(B) is from 1/99 to 99/1 and a constituent molar ratio of the structural unit (B)/(C) is from 30/70 to 100/0 and, furthermore, a ratio of a weight-average molecular weight Mw to a number-average molecular weight Mn, that is Mw/Mn is from 1.0 to 2.0 provided that at least one of $X^1$ of the structural unit (A) represented by the general formula (1), $X^2$ of the structural unit (B) represented by the general formula (2) and $X^3$ of the structural unit (C) represented by the general formula (3), is —O— and the others are —CH$_2$—.

22. A method of producing a hydrogenated ring-opening metathesis polymer comprising at least a structural unit (A) represented by the following general formula (1):

(1)

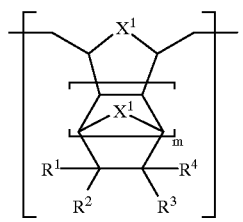

wherein at least one of $R^1$ to $R^4$ is a substituent containing an acid cleavable group, and others are selected from hydrogen, an alkyl group having 1 to 20 carbon atoms, a halogen, a halogenated alkyl group having 1 to 20 carbon atoms, an alkoxy group having 1 to 20 carbon atoms, an alkoxyalkyl group having 2 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, an arylsulfonyloxy group having 6 to 20 carbon atoms, a carboxy group, a hydroxy group, a carboxyalkyl group having 2 to 20 carbon atoms, or a hydroxyalkyl group having 1 to 20 carbon atoms; and m represents 0 or an integer of 1 to 3; a structural unit (B) represented by the following general formula (2):

(2)

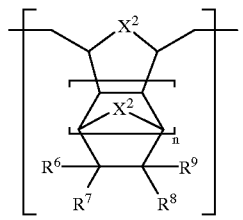

wherein at least one of $R^6$ to $R^9$ is a substituent containing carboxy or hydroxy, and others are selected from hydrogen, an alkoxy group having 1 to 20 carbon atoms, an alkoxyalkyl group having 2 to 20 carbon atoms, an alkyl group having 1 to 20 carbon atoms, a halogen, a halogenated alkyl group having 1 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, or an arylsulfonyloxy group having 6 to 20 carbon atoms; and n represents 0 or an integer of 1 to 3; and a structural unit (C) represented by the following general formula (3):

(3)

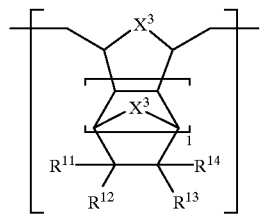

wherein at least one of $R^{11}$ to $R^{14}$ is a substituent containing cyano or lactonyloxycarbonyl, and others are selected from hydrogen, a carboxy group, a hydroxy group, a carboxyalkyl group having 2 to 20 carbon atoms, a hydroxyalkyl group having 1 to 20 carbon atoms, an alkoxycarbonyl group having 2 to 20 carbon atoms, an alkoxycarbonylalkyl group having 3 to 20 carbon atoms, an alkoxy group having 1 to 20 carbon atoms, an alkoxyalkyl group having 2 to 20 carbon atoms, an alkyl group having 1 to 20 carbon atoms, a halogen, or a halogenated alkyl group having 1 to 20 carbon atoms; and 1 represents 0 or an integer of 1 to 3, wherein a constituent molar ratio of the structural unit (A)/(B) is from 1/99 to 99/1 and a constituent molar ratio of the structural unit (B)/(C) is from 30/70 to 100/0 and, furthermore, a ratio of a weight-average molecular weight Mw to a number-average molecular weight Mn, that is Mw/Mn is from 1.0 to 2.0 provided that at least one of $X^1$ of the structural unit (A) represented by the general formula (1), $X^2$ of the structural unit (B) represented by the general formula (2) and $X^3$ of the structural unit (C) represented by the general formula (3), is —O— and the others are —CH$_2$—;

said method comprising polymerizing at least one cyclic olefinic monomer represented by the general formula (4), or at least two cyclic olefinic monomers represented by the general formula (4) and (5), or at least three cyclic olefinic monomers represented by the general formulas (4), (5) and (6) using a living ring-opening metathesis catalyst, and hydrogenating the polymer in the presence of a hydrogenation catalyst:

General formula (4) being:

(4)

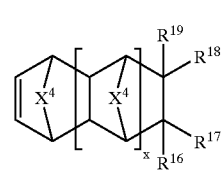

wherein at least one of $R^{16}$ to $R^{19}$ is a substituent containing an acid cleavable group, and others are selected from hydrogen, an alkyl group having 1 to 20 carbon atoms, a halogen, a halogenated alkyl group having 1 to 20 carbon atoms, an alkoxy group having 1 to 20 carbon atoms, an alkoxyalkyl group having 2 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, or an arylsulfonyloxy group having 6 to 20 carbon atoms; and x represents 0 or an integer of 1 to 3;

General formula (5) being:

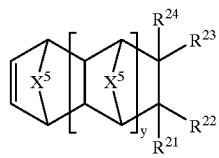

(5)

wherein at least one of $R^{21}$ to $R^{24}$ is a carboxy group, a hydroxy group, a carboxyalkyl group having 2 to 20 carbon atoms, a hydroxyalkyl group having 1 to 20 carbon atoms, an alkoxy group having 1 to 20 carbon atoms, an alkoxyalkyl group having 2 to 20 carbon atoms, an alkylcarbonyloxy group having 2 to 20 carbon atoms, an arylcarbonyloxy group having 7 to 20 carbon atoms, an alkylsulfonyloxy group having 1 to 20 carbon atoms, an arylsulfonyloxy group having 6 to 20 carbon atoms, or a carboxylic anhydride formed from $R^{21}$ and $R^{23}$ of $R^{21}$ to $R^{24}$, and others are selected from hydrogen, an alkyl group having 1 to 20 carbon atoms, a halogen or a halogenated alkyl group having 1 to 20 carbon atoms; and y represents 0 or an integer of 1 to 3; and General formula (6) being:

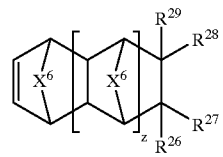

(6)

wherein at least one of $R^{26}$ to $R^{29}$ is a substituent containing cyano or lactonyloxycarbonyl, and others are selected from hydrogen, an alkoxycarbonyl group having 2 to 20 carbon atoms, an alkoxycarbonylalkyl group having 3 to 20 carbon atoms, an alkoxy group having 1 to 20 carbon atoms, an alkoxyalkyl group having 2 to 20 carbon atoms, an alkyl group having 1 to 20 carbon atoms, a halogen, or a halogenated alkyl group having 1 to 20 carbon atoms; and z represents 0 or an integer of 1 to 3 wherein at least one of $X^4$ of the general formula (4), $X^5$ of the general formula (5) and $X^6$ of the general formula (6), is —O— and the others are —$CH_2$—.

* * * * *

UNITED STATES PATENT AND TRADEMARK OFFICE
CERTIFICATE OF CORRECTION

PATENT NO. : 6,372,854 B1  Page 1 of 1
DATED : April 16, 2002
INVENTOR(S) : Tadahiro Sunaga et al.

It is certified that error appears in the above-identified patent and that said Letters Patent is hereby corrected as shown below:

<u>Column 49,</u>
Line 61, please delete "hydroxyaklyl", and insert therefor -- hydroxyalkyl --.

<u>Column 53,</u>
Line 66, please delete "(3)", and insert therefor -- (B) --.

Signed and Sealed this

Eleventh Day of March, 2003

JAMES E. ROGAN
*Director of the United States Patent and Trademark Office*